US006088469A

United States Patent [19]

Fukumura et al.

[11] Patent Number: 6,088,469

[45] Date of Patent: Jul. 11, 2000

[54] IDENTIFYING APPARATUS AND METHOD, POSITION DETECTING APPARATUS AND METHOD, ROBOT APPARATUS AND COLOR EXTRACTING APPARATUS

[75] Inventors: Naohiro Fukumura; Osamu Hanagata; Kotaro Sabe, all of Tokyo; Makoto Inoue, Kanagawa, all of Japan

[73] Assignee: Sony Corporation, Tokyo, Japan

[21] Appl. No.: 08/938,078

[22] Filed: Sep. 26, 1997

[30] Foreign Application Priority Data

Sep. 30, 1996 [JP] Japan .................................... 8-280041

[51] Int. Cl.[7] ........................................................ G06K 9/00

[52] U.S. Cl. ............................................ 382/103; 382/165

[58] Field of Search .................................... 382/103, 104, 382/106, 165, 154, 291; 348/118, 140, 170

[56] References Cited

U.S. PATENT DOCUMENTS 5,633,952 5/1997 Outa et al. .............................. 382/165

5,638,116 6/1997 Shimoura et al. ...................... 348/118

*Primary Examiner*—Phuoc Tran

*Attorney, Agent, or Firm*—Limbach & Limbach, LLP

[57] ABSTRACT

An identifying apparatus and method and a robot apparatus capable of reliably identifying other moving objects or other objects, a position detecting apparatus and method and a robot apparatus capable of accurately detecting the position of a moving object or itself within a region, and a color extracting apparatus capable of accurately extracting a desired color are difficult to be realized. Objects are provided with identifiers having different color patterns such that the color patterns are detected and identified through image processing. Also, the objects of interest are given color patterns different from each other, such that the position of the object can be detected by identifying the color pattern through image processing. Further, a plurality of wall surfaces having different colors are provided along the periphery of the region, such that the position of an object is detected on the basis of the colors of the wall surfaces through image processing. Further, a luminance level and color difference levels are sequentially detected for each of pixels to extract a color by determining whether or not the color difference levels are within a predetermined range.

23 Claims, 31 Drawing Sheets

IDENTIFYING APPARATUS AND METHOD, POSITION DETECTING APPARATUS AND METHOD, ROBOT APPARATUS AND COLOR EXTRACTING APPARATUS

BACKGROUND OF THE INVENTION

1. Field of the Invention

The present invention relates to an identifying apparatus and method, an identifying system and method, a position detecting apparatus and method, a robot apparatus, and a color extracting apparatus, and more particularly, is suitably applied to an autonomous mobile robot.

2. Description of the Related Art

In recent years, the studies of autonomous mobile robots have been advanced as one of mobile robots. The autonomous mobile robot is capable of sequentially fetching information on surrounding environments to determine its actions by itself based on the fetched information.

The following three methods can be thought as methods for a mobile robot as mentioned above to identify other mobile robots (for example, a first machine, a second machine, . . . , and so on). A first method causes respective robots to generate a special signal for identification in the form of radio waves, infrared rays, sonic waves, or the like. A second method paints respective robots in different colors from each other such that the robots are identified based on the colors. A third method adds symbols, bar codes, or the like for identification on surfaces of the respective robots.

The first method, however, requires a special apparatus for transmitting and receiving signals. Besides, regulations stipulated by rules on radio waves and influences to other apparatuses located nearby may not permit desired signals to be transmitted.

The second method may not cause any problem if only a small number of robots are identified because a number of readily identifiable colors may be provided for the number of robots. However, for identifying a large number of robots, the second method must identify subtle differences in color so that the second method requires complicated image processing and is more susceptible to illumination conditions and so on.

In addition, the third method may not observe the signals or the like due to directions and postures of the robot.

On the other hand, the following three methods can be thought as methods of enabling a mobile robot to detect its position within a movable region. A first method adds indicators, such as a color pattern or a signal, on a floor surface of the movable region such that a robot visually reads these indicators. A second method installs transmitters for transmitting radio waves, infrared rays, sonic waves, or the like, on the floor surface and corners of the movable region to permit a robot to detect its position based on the signals from the transmitters. A third method previously gives a robot its initial position by any suitable means such that the robot obtains a moving distance and a moving direction from a driving condition of a moving means of the robot (for example, a rotational number of wheels) and integrates the obtained data in order to detect its current position.

The first method can be realized by a first proposal where a camera disposed on a robot occasionally shoots the floor surface or by a second proposal where a separate camera is provided for monitoring the floor surface.

However, if the first method is to be realized by the first proposal, the robot cannot sufficiently look out its surroundings during directing downward to detect its position. This may cause the robot to collide with another moving object such as another robot. On the other hand, if the first method is to be realized by the second proposal, the provision of a separate camera for monitoring the floor surface causes an increased manufacturing costs an increased weight of the robot, and a more complicated configuration of the robot.

In the second method, if a transmitter is installed on the floor surface within the movable region of a robot, the transmitter itself would be an obstacle to activities of the robot.

Further, in the third method, a limited measuring accuracy in the moving distance and the moving direction of a robot may result in a larger error in a measurement of a current position of the robot. Particularly, if a robot moves over a long distance while frequently changing directions, accumulated errors will become larger and larger, thus it is difficult to correctly detect a current position.

SUMMARY OF THE INVENTION

In view of the foregoing, an object of this invention is to provide an identifying apparatus, an identifying system and method, and a robot apparatus which are capable of reliably identifying a moving object or another object in a simple configuration, a position detecting apparatus and method, and a robot apparatus which are capable of accurately detecting a position of a moving object or its position within a region, and a color extracting apparatus which is capable of accurately extracting a desired color.

The foregoing object and other objects of the invention have been achieved by the provision of an identifying apparatus which comprises shooting means for shooting identifiers, which are disposed on respective moving objects, having color patterns different from each other, color pattern detecting means for detecting the color pattern of a shot identifier based on a first image information supplied from the shooting means, and identifying means for identifying a moving object having an identifier shot by the shooting means based on the detection result and previously stored color pattern information on the identifiers of the respective moving objects.

As a result, it is possible to readily and reliably identify each moving object.

Further, in the present invention, an identifying method comprises a first step of providing the respective moving objects with identifiers having color patterns different from each other, a second step of shooting the identifiers of other moving objects by shooting means disposed in each of the moving objects, a third step of detecting the color pattern of the shot identifier based on first image information outputted from the shooting means, and a fourth step of identifying the shot identifier based on the detected color pattern of the identifier and previously stored At color pattern information on the respective identifiers.

As a result, it is possible to readily and reliably identify each moving object.

Further, in the present invention, a robot apparatus comprises shooting means for shooting identifiers, which are disposed on other moving objects, having color patterns different from each other, color pattern detecting means for detecting the color pattern of the shot identifier based on image information supplied from the shooting means, and identifying means for identifying the shot identifier based on the detection result of the color pattern detecting means and previously stored color pattern information on the identifiers of the respective moving objects.

As a result, the robot can readily and reliably identify other objects.

Further, in the present invention, an identifying apparatus comprises shooting means for shooting the entirety of the region, color pattern detecting means for detecting color patterns which are different for each moving object and are respectively given at predetermined positions of the moving objects, and identifying means for identifying the moving objects based on the detection result and previously stored information on the color patterns previously given to the moving objects.

As a result, each moving object can be readily and reliably identified.

Further, in the present invention, an identifying method comprises a first step of placing shooting means for shooting the entirety of the region at a predetermined position and giving different color patterns from each other to the respective moving objects at predetermined positions thereof, a second step of detecting the color pattern of each moving object based on first image information outputted from the shooting means, and a third step of identifying each moving object based on the detection results and previously stored information on the color patterns given to the moving objects.

As a result, each moving object can be readily and reliably identified.

Further, in the present invention, a position detecting apparatus comprises a plurality of wall surfaces having different colors from each other which are disposed along the periphery of the region, shooting means, which is disposed in the moving object, for shooting a corresponding predetermined wall surface, color and relative position detecting means for detecting a color of a wall surface shot by the shooting means and a relative position with respect to the wall surface on the basis of first image information outputted from the shooting means, and position detecting means for detecting a position of the moving object within the region on the basis of the detecting results of the color and relative position detecting means, and the colors of all wall surfaces and map information previously stored.

As a result, the position of each moving object can be readily and reliably detected.

Further, in the present invention, a position detecting apparatus comprises shooting means for shooting a corresponding predetermined wall surface out of a plurality of wall surfaces a having different colors from each other which are disposed along the periphery of the region, color and relative position detecting means for detecting a color of wall surface shot by the shooting means and a relative position with respect to the wall surface on the basis of first image information outputted from the shooting means, and position detecting means for detecting a position of the moving object within the region on the basis of the detection result of the color and relative position detecting means, and the colors of all wall surfaces and map information previously stored.

As a result, the position of each moving object can be readily and reliably detected.

Further, in the present invention, a position detecting method comprises a first step of providing a plurality of wall surfaces painted in different colors from each other, disposed along the periphery of the region, a second step of shooting a wall surface by the shooting means disposed on the moving object and detecting the color of the wall surface shot by the first shooting means and the relative position with respect to the wall surface on the basis of the obtained first image information, and a third step of detecting the position of the moving object within the region on the basis of these detection results, and the colors of all wall surfaces and map information previously stored.

As a result, the position of each moving object can be readily and reliably detected.

Further, in the present invention, a robot apparatus comprises shooting means for shooting a corresponding predetermined wall surface out of a plurality of wall surfaces having different colors from each other, which are disposed along the periphery of the region, color and relative position detecting means for detecting the color of the wall surface shot by the shooting means and a relative position with respect to the wall surface, and position detecting means for detecting the position of moving object within the region on the basis of the detection results of the color and relative position detecting means, and the colors of all wall surfaces and map information previously stored.

As a result, the position of each moving object can be readily and reliably detected.

Furthermore, in the present invention, a color extracting apparatus comprises level detecting means for sequentially detecting a luminance level and color difference levels of each pixel in an image represented by a video signal based on the luminance signal and the color difference signals of the supplied video signal, and determining means for determining whether or not each pixel has a predetermined color, based on the luminance level and the color difference levels of detected pixel and previously stored upper limit values and lower limit values of the color difference levels for each luminance level.

As a result, a pixel having a desired color can be reliably extracted.

The nature, principle and utility of the invention will become more apparent form the following detailed description when read in conjunction with the accompanying drawings in which like parts are designated by like reference numerals or characters.

DETAILED DESCRIPTION OF THE EMBODIMENT

Figure 1:
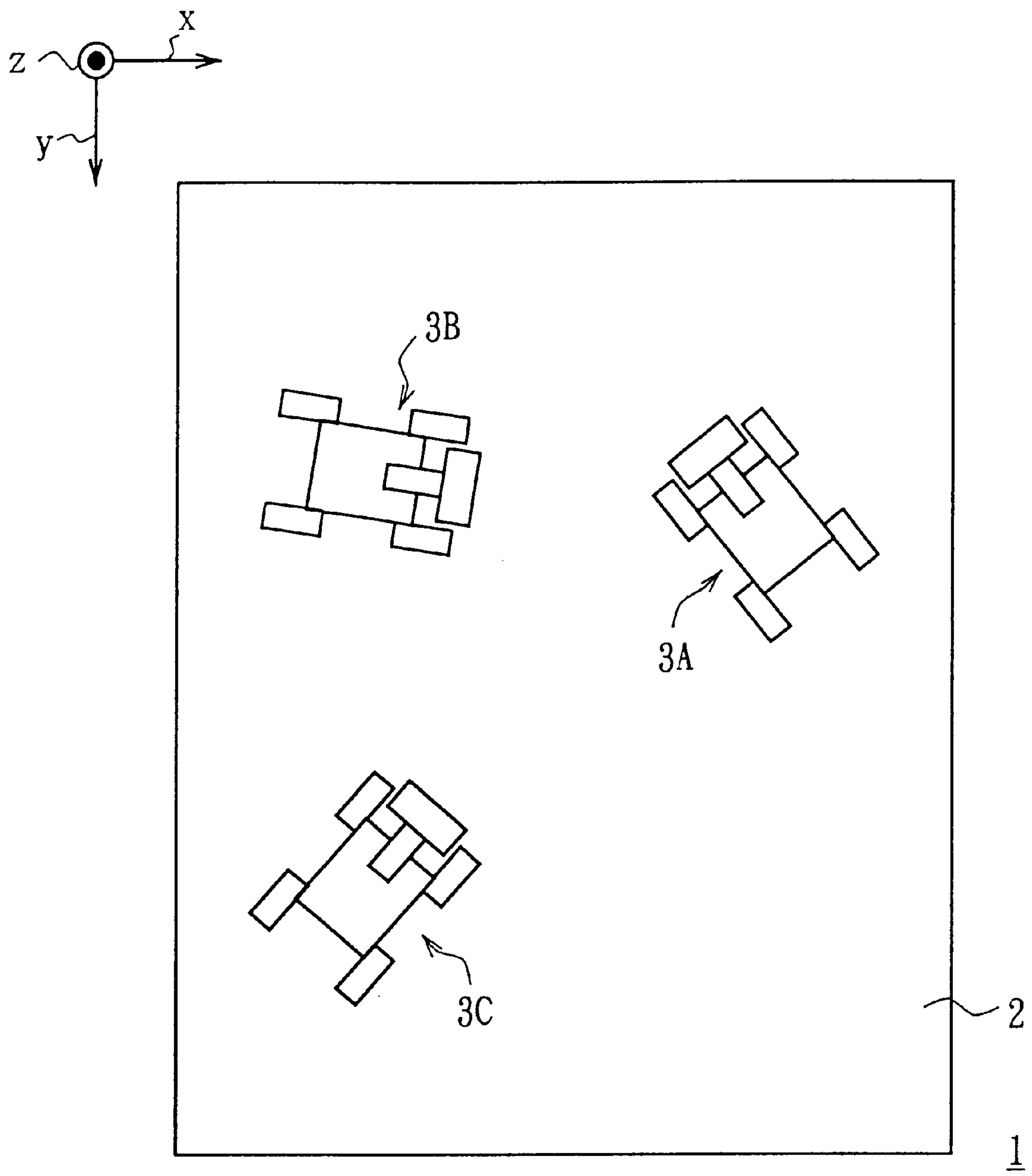
FIG. 1 is a plan view illustrating the whole configuration of an individual identifying system according to a first embodiment.

Preferred embodiments of this invention will be described with reference to the accompanying drawings:

(1FIRST EMBODIMENT (1-1) Whole Configuration of Individual Identifying System According to First Embodiment Referring to FIG. 1, numeral 1 generally illustrates an individual identifying system to which the present invention is applied, wherein a plurality of robots 3A to 3C are located within a predetermined region 2. Note that, in the following description, the region 2 is a flat rectangle, a direction parallel to predetermined one side is defined as an X-direction (indicated by an arrow x); a direction perpendicular to the X-direction as a Y-direction (indicated by an arrow y); and a direction perpendicular to the region 2 as a Z-direction (indicated by an arrow z).

As illustrated in FIG. 2, each of the robots 3A to 3C is constructed in such a manner that a head unit 12 is fitted at an upper front end of a body unit 10 through a neck unit 11, and a front right limb unit 15A, a front left limb unit 15B, a rear right limb unit 15C, and a rear left limb unit 15D are positioned at four corners, i.e., front, rear, left, and right corners on the lower surface of the body unit 10, each composed of a thigh 13 and a leg 14 (hereinafter, these are collectively called the respective limb units 15A to 15D).

The head unit 12 is provided with a camera 16, and a microphone 17 (FIG. 3) is also mounted at a predetermined position of the head unit 12. A plurality of touch sensors 18A to 18Z (FIG. 3) are positioned on the surfaces of the head unit 12, the body unit 10, and the respective limb units 15A to 15D.

Figure 2A:
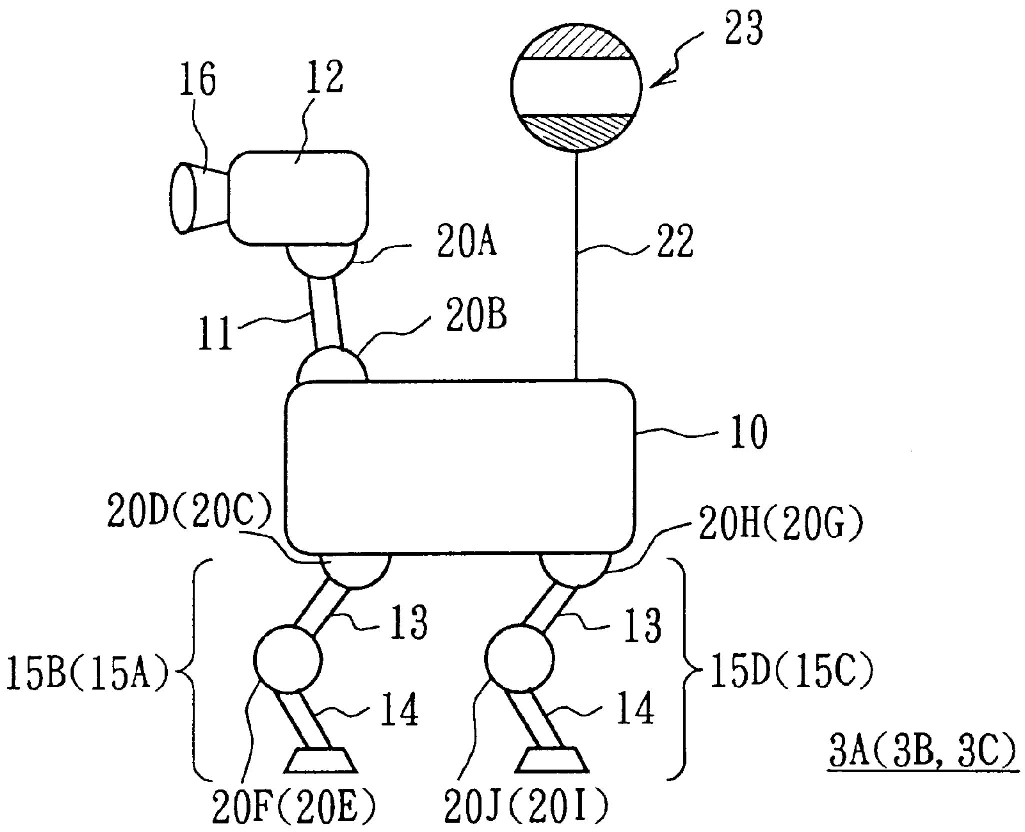
FIGS. 2A and 2B are schematic side views illustrating the structures of a robot and an identifier according to the first embodiment.
Figure 2B:
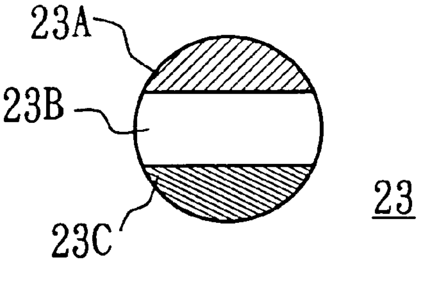
Figure 3:
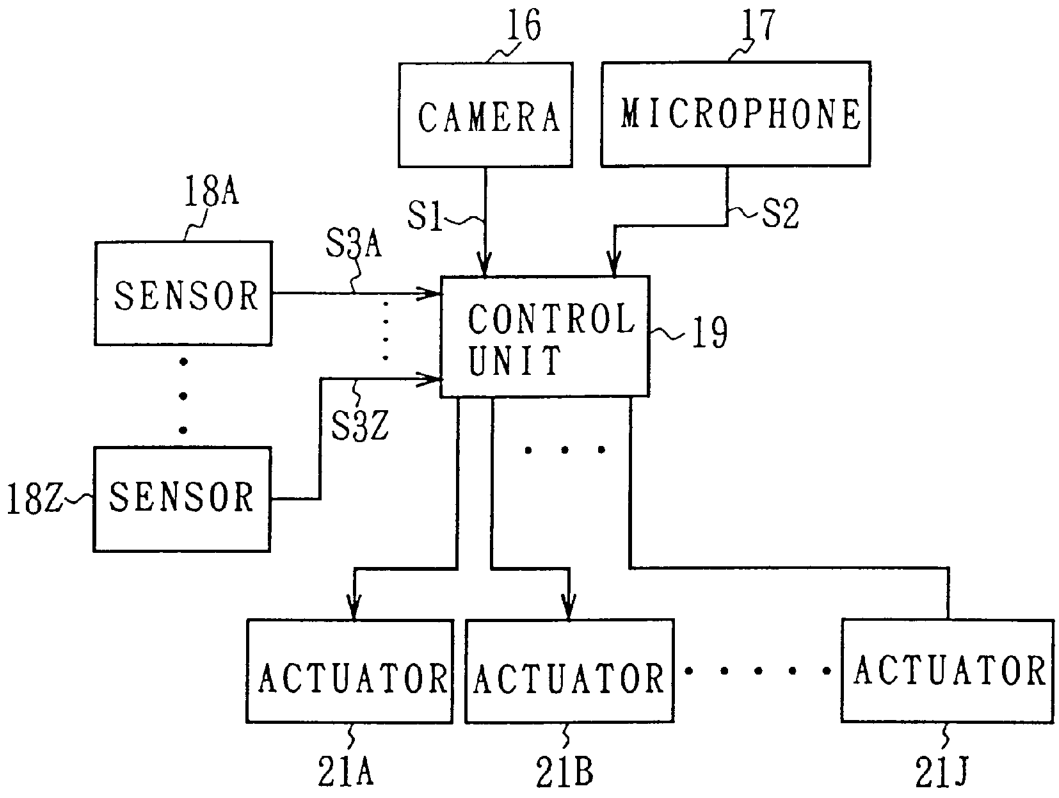
FIG. 3 is a schematic block diagram illustrating the configuration of the robot according to the first embodiment.

The body unit 10 has a control unit 19 (FIG. 3). As illustrated in FIG. 3, the control unit 19 recognizes surrounding environments based on a video signal SI supplied from the camera 16, an audio signal S2 supplied from the microphone 17, and sensor signals S3A to S3Z respectively supplied from the touch sensors 18A to 18Z, and drives actuators 21A to 21J in respective joints 20A to 20J (FIG. 2) which connect the respective component units (the head unit 12, the neck unit 11, the body unit 10, the respective thighs 13, and the respective legs 14), on the basis of recognition results as required.

Thereby, each of the robots 3A to 3C can freely drive the component units under the control of the control unit 19. Besides, the robots 3A to 3C can autonomously act in accordance with surrounding environments.

In the individual identifying system 1 in addition to the aforementioned configuration, as can be seen from FIG. 2A, each of the robots 3A to 3C has a spherical identifier 23 mounted at the upper rear end of the body unit 10 through a supporting rod 22. The spherical identifiers 23 of robots 3A to 3C are respectively painted in different color patterns from each other.

The surface of each identifier 23, as illustrated in FIG. 2B, is painted in predetermined three colors selected from various colors, with the form of stripes extending in a direction perpendicular to a moving direction of the robots 3A to 3C (i.e., in the Z-direction).

Figure 4:
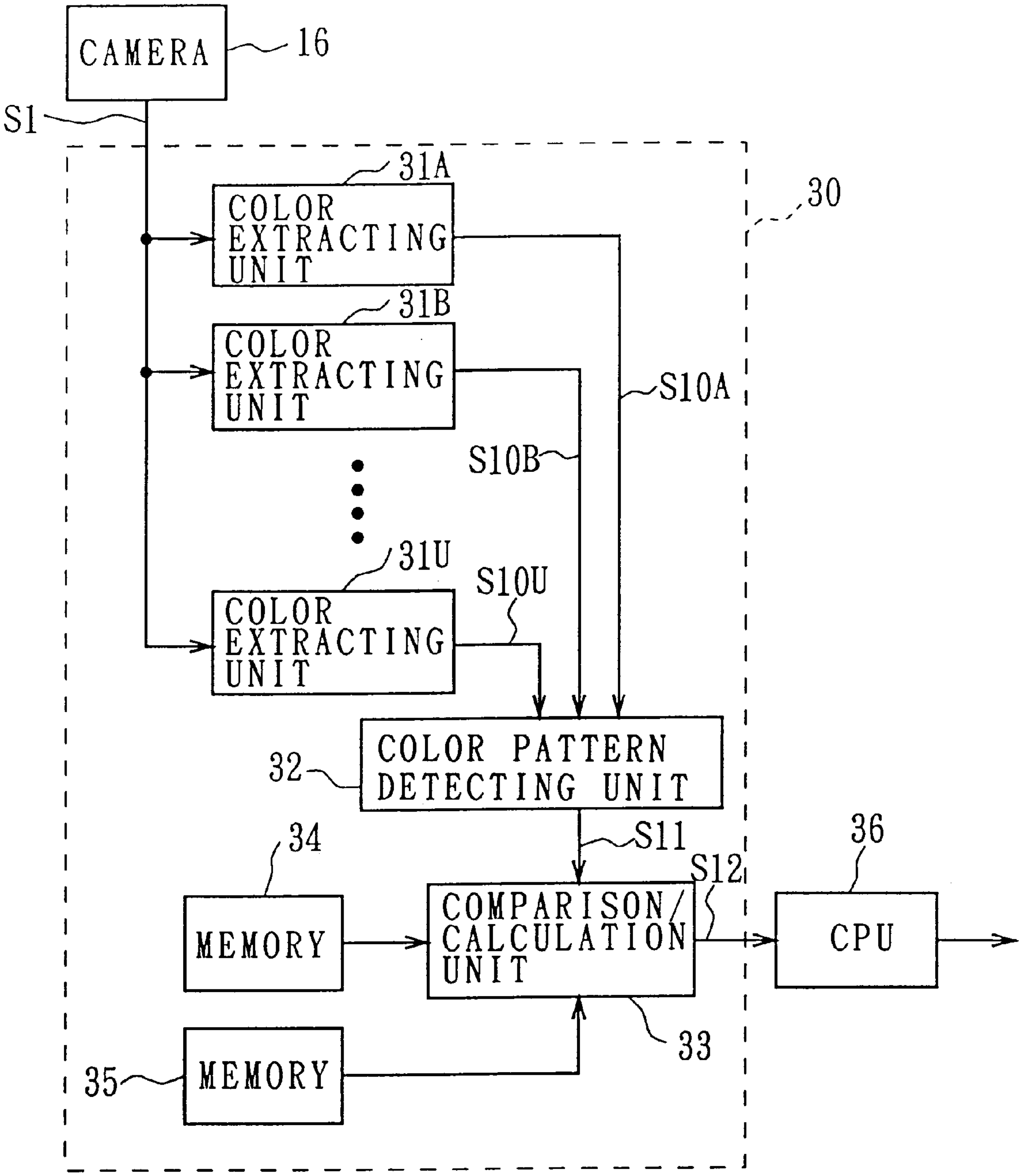
FIG. 4 is a block diagram illustrating the configuration of an individual identifying unit according to the first embodiment.

Also, the control unit 19 (FIG. 3) of each robot 3A to 3C has an individual identifying unit 30 illustrated in FIG. 4 so as to identify each of other robots 3A to 3C which moves within the region 2 on the basis of the identifier 23.

The individual identifying unit 30 comprises color extracting units 31A to 31U of which the number equals to that of the colors for identification (for example, 16), and a video signal S1 supplied from the camera 16 is inputted to the respective color extracting units 31A to 31U.

The respective color extracting units 31A to 31U extract pixels of a predetermined color from an image represented by the video signal S1, and supplies a color pattern detecting unit 32 with color extraction signals S10A to S10U in which portions corresponding to the associated pixel rise to a logical "1" level and portions corresponding to other pixels fall to a logical "0" level. Note that, the respective color extracting units 31A to 31U extract pixels of different colors from each other out of a plurality of colors for identification.

The color pattern detecting unit 32 superimposes the color extraction signals S10A to S10U respectively supplied from the color extracting units 31A to 31U, and scans the resulting image to detect a stripe portion painted in three colors extending in the Z-direction substantially in a circle within the resulting image. Then, the color pattern detecting unit 32 determines that the portion is an identifier 23, and supplies a comparison/calculation unit 33 with an identifier information signal S11 including information on a color pattern of the identifier 23, the position of the identifier 23 within the image, and the diameter of the identifier 23 in units of pixels.

The comparison/calculation unit 33 detects an ID of the identifier 23 (i.e., identification of the robot 3A, 3B or 3C) shot by the camera 16 on the basis of the color pattern of the shot identifier 23 which is obtained based on the supplied identifier information signal S11, and a table on color patterns of respective identifiers 23 and their ID's previously stored in a first memory 34.

The comparison/calculation unit 33 also executes the following expression (1) based on the diameter (Dpic) of the shot identifier 23 within the image in units of pixels, obtained based on the supplied identifier information signal S11, and a reference value previously stored in a second memory 35 (the diameter (Dstd) of the identifier 23 in units of pixels when the camera 16 is positioned one meter away from the identifier 23).

$$L1 = \frac{Dstd}{Dpic}[\mathrm{m}] \qquad (1)$$

Thereby, a distance L1 to the identifier 23 is obtained.

Further, the comparison/calculation unit 33 supplies the highest ranked CPU 36 which governs all actions of the associated robot 3A to 3C with an identifier detection signal S12 comprising information on the ID of the detected identifier 23, the distance L1 to the identifier 23 obtained by the expression (1) and the position of the identifier 23 within the image obtained based on the identifier information signal S11.

Thus, in each robot 3A to 3C, the CPU 36 can recognize the positions of other robots 3A to 3C based on the identifier detection signal S12, so that each robot 3A to 3C can act in accordance with surrounding situations based on the recognition results.

(1-2) Configuration of Color Extracting Unit

Generally, each color of an image based on a video signal can be represented as a point on a UV plane which is defined by an X-axis representing a signal level U of one of two color difference signals. (R-Y, B-Y), i.e., a first color difference signal, included in the video signal and a Y-axis representing a signal level V of the other, i.e., second color difference signal. However, even the Csame color may vary more or less in its position on the UV plane due to illumination conditions and so on.

Figure 5:
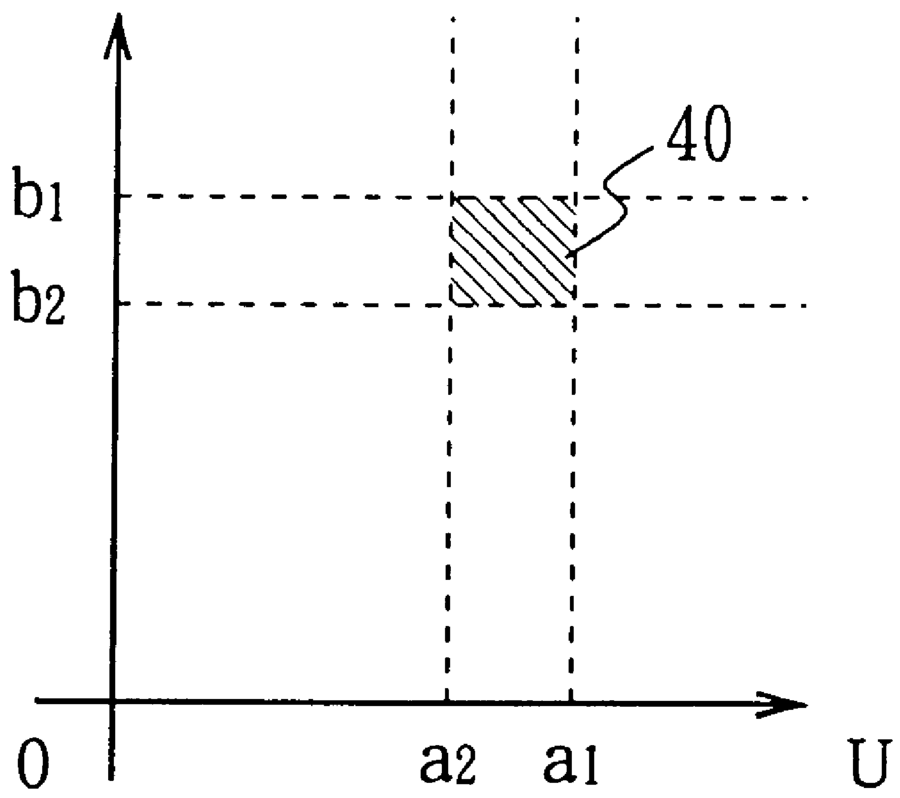
FIG. 5 is a schematic diagram describing the configuration of a color extracting unit.

Then, a rectangular area 40 is assumed in the UV plane as illustrated in FIG. 5. A pixel, having first and second color difference levels U, V existing within the area 40, is determined to have a color to be extracted, and in addition, in order to cope with variations in illumination conditions and so on, the area 40 is moved in response to a luminance level Y of the pixel. Thereby, a pixel having a corresponding color within the image represented by the video signal can be accurately extracted.

For specifying the area 40 in this event, upper limit values a1, b1 and lower limit values a2, b2 of the first and second color difference levels U, V may be determined in accordance with a color to be extracted. Also, for moving the area 40 in response to the luminance level Y, the upper limit values a1, b1 and the lower limit values a2, b2 of the first and second color difference levels U, V are previously and respectively calculated for each luminance level Y to create a table, such that the upper limit values a1, b1 and the lower limit values a2, b2 of the first and second color difference levels U, V may be varied on the basis of the table and a luminance level Y of an actual pixel.

Figure 6:
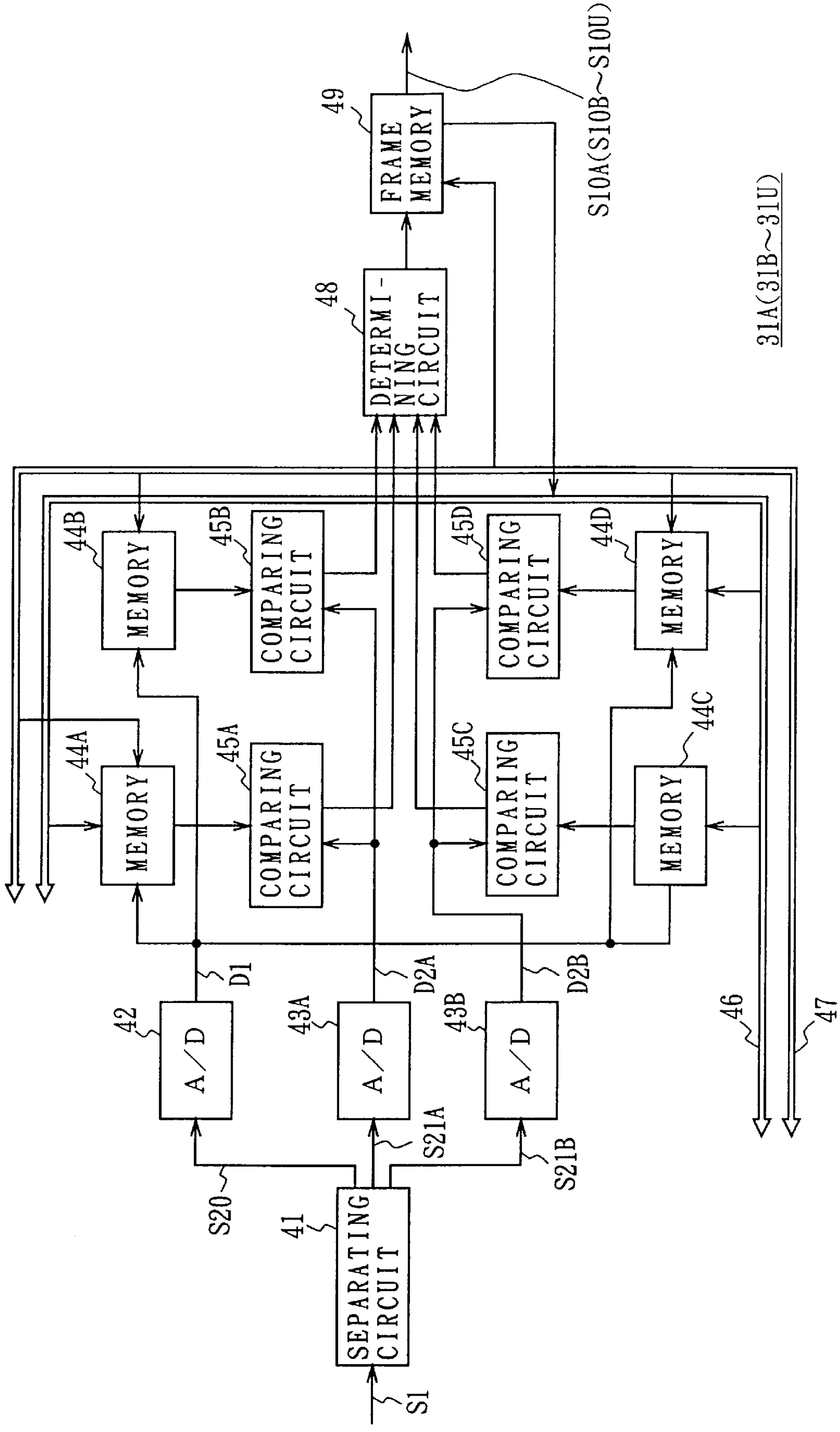
FIG. 6 is a block diagram illustrating the configuration of the color extracting unit.

In view of the aforementioned considerations, the color extracting units 31A to 31U in the individual identifying unit 30 of the respective robots 3A to 3C are each composed as illustrated in FIG. 6.

Specifically, each of the color extracting units 31A to 31U inputs a video signal S1 supplied from the camera 16 to a separating circuit 41 which separates the video signal S1 into a luminance signal S20 and two color difference signals (R-Y, B-Y) S21A, S21B.

In this event, the luminance signal S20 is sampled in an analog/digital converting,circuit 42 at a predetermined first period to be sequentially converted into luminance data D1 corresponding to respective pixels, and then subsequently supplied to first to fourth memories 44A to 44D.

The first color difference signal S21A, one of the two color difference signals S21A, S21B, is sampled in an analog/digital converting circuit 43A at the aforementioned first period to be sequentially converted into first color difference data D2A corresponding to respective pixels, and then supplied to first and second comparing circuits 45A, 45B. The other, i.e., second color difference signal S21, is sampled in an analog/digital converting circuit 43B at the aforementioned first period to be sequentially converted into second color difference data D2B corresponding to respective pixels, and then supplied to third and fourth comparing circuits 45C, 45D.

The first and second memories 44A, 44B store, in the form of table, an upper limit value a1 or a lower limit value a2 of the first color difference data D2A (i.e., the first color difference level U) for each value of the luminance data D1 of each pixel (i.e., the luminance level Y) in correspondence to a color to be extracted by an associated color extracting unit 31A to 31U. The third and fourth memories 44C, 44D store, in the form of table, an upper limit value b1 or a lower limit value b2 of the second color difference data D2B (i.e., the second color difference level V) for each value of the luminance data D1 of each pixel. These upper limit values a1, b1 and lower limit values a2, b2 are set by the aforementioned highest ranked CPU 36 through an address bus 46 and a data bus 47 with the luminance level Y of an associated pixel as an address.

The first to fourth memories 44A to 44D output corresponding set values from the tables previously stored with the values of the luminance data D1 respectively supplied thereto as addresses.

Thus, in the color extracting units 31A to 31U, the upper limit value a1 or the lower limit value a2 of the first color difference level previously set in accordance with the value of the luminance data D1 is outputted for each pixel from the first and second memories 44A, 44B, while the upper limit value b1 and the lower limit value b2 of the second color difference level previously set in accordance with the value of the luminance data D1 is outputted for each pixel from the third and fourth memories 44C, 44D. These values are respectively supplied to the associated first to fourth comparing circuits 45A to 45D.

The first to fourth comparing circuits 45A to 45D sequentially compare outputs of the associated first to third or the fourth memory 44A to 44D with the value of the first or second color difference data D2A, D2B of each pixel sequentially supplied thereto, and sequentially send the respective comparison results to a determining circuit 48.

The determining circuit 48 comprises an AND circuit, and determines whether or not the pixel exists within the area 40 (FIG. 5) defined by the upper limit values a1, b1 or the lower limit values a2, b2 of the first and second color difference levels U, V respectively stored in the first to fourth memories 44A to 44D, based on the outputs of the respective first to fourth comparing circuits 45A to 45D, and stores "1" when within the area 40 or "0" when out of the area 40 in a position corresponding to the pixel in a frame memory 49.

Thus, the frame memory 49 outputs color extraction signals S10A to S10U in which only portions corresponding to pixels of colors to be extracted by the respective color extracting units 31A to 31U rises to a logical "1" level.

In this way, the respective color extracting units 31A to 31U extract pixels of corresponding colors from the image represented by the video signal S1, and send thus produced color extraction signals S10A to S10U to the color pattern detecting unit 32 (FIG. 4) as described above.

(1-3) Operation and Effects of First Embodiment

In the foregoing configuration of the individual identifying system 1, each of the robots 3A to 3C detects a color pattern of an identifier 23 shot by the camera 16, the position of the identifier 23 within an image represented by a video signal S1 supplied from the camera 16, and the diameter of the identifier 23 in units of pixels, by the color extracting units 31A to 31U and the color detecting unit 32 of the individual identifying unit 30. Besides, each of the robots 3A to 3C detects a color pattern of the detected identifier 23 and the ID of the shot identifier 23 (identification of the robot 3A, 3B, or 3C) based on a table on the color patterns and the associated ID's of the respective identifiers 23 stored in the first memory 34, calculates the distance L1 to the identifier 23 based on the diameter of the identifier 23 detected by the color pattern detecting unit 32 in units of pixels and a reference value stored in the second memory 35, and sends the ID of the detected identifier 23, the distance L1 to the identifier 23, and the position of the identifier 23 within the image to the highest ranked CPU 36 for governing all actions of the associated robot 3A to 3C.

Thus, in the individual identifying system 1, the highest ranked CPU's of the respective robots 3A to 3C can accurately recognize the existence of other robots 3A to 3C located around them, the distances L1 to the respective robots 3A to 3C, and the directions in which the respective robots 3A to 3C are found.

Also, in this individual identifying system 1, since the identifiers 23 of the respective robots 3A to 3C may be made by painting, for example, pingpong balls or the like in predetermined colors, the system can be built at extremely low cost.

Further, in the individual identifying system 1, since the respective robots 3A to 3C do not utilize any special signals as means for identifying other robots 3A to 3C, the robots 3A to 3C will never adversely affect other devices located nearby or will not be subjected to regulations stipulated in the radio wave rules.

Further, in the individual identifying system 1, the identifiers 23 are spherical as mentioned above and are painted in a plurality of identifying colors in stripes in the direction perpendicular to the moving direction of the robots 3A to 3C, the identifiers 23 can be viewed in the same shape and in the same color pattern from any direction as long as the region 2 in which the robots 3A to 3C is moving is substantially flat. Thus, the respective robots 3A to 3C can readily and reliably identify other robots 3A to 3C.

Furthermore, in the individual identifying system 1, since the identifiers 23 of the respective robots 3A to 3C are not painted in a single color but in a plurality of colors, a large number of robots 3A to 3C can be identified on the basis of combinations of different colors. In this case, even if only colors having largely different hues from each other, such as the primary colors, are used as the identifying colors, an increased number of combinations can be provided for the identifiers, so that the individual identifying system 1 has the advantage of being less susceptible to illumination conditions and so on as compared with individual identification techniques which rely on subtle difference in color.

According to the aforementioned configuration, the respective robots 3A to 3C are provided with identifiers 23 having different color patterns from each other, and each of the robots 3A to 3C detects a color pattern of an identifier 23 shot by the camera 16, and the position and the diameter of the identifier 23 within an image represented by a video signal S1 supplied from the camera 16, detects the ID of the shot identifier 23 based on the detection results and a table previously stored in the first memory 34 on color patterns of the respective identifiers 23 and associated ID's, and calculates the distance L1 to the identifier 23 based on the diameter of the identifier 23 within the image represented by the detected video signal S1 and a reference value stored in the second memory 35, so that the respective robots 3A to 3C can readily and reliably identify other robots 3A to 3C, thereby making it possible to realize an individual identifying system and a robot capable of reliably recognizing the existence of the robots 3A to 3C in a simple configuration.

Figure 7:
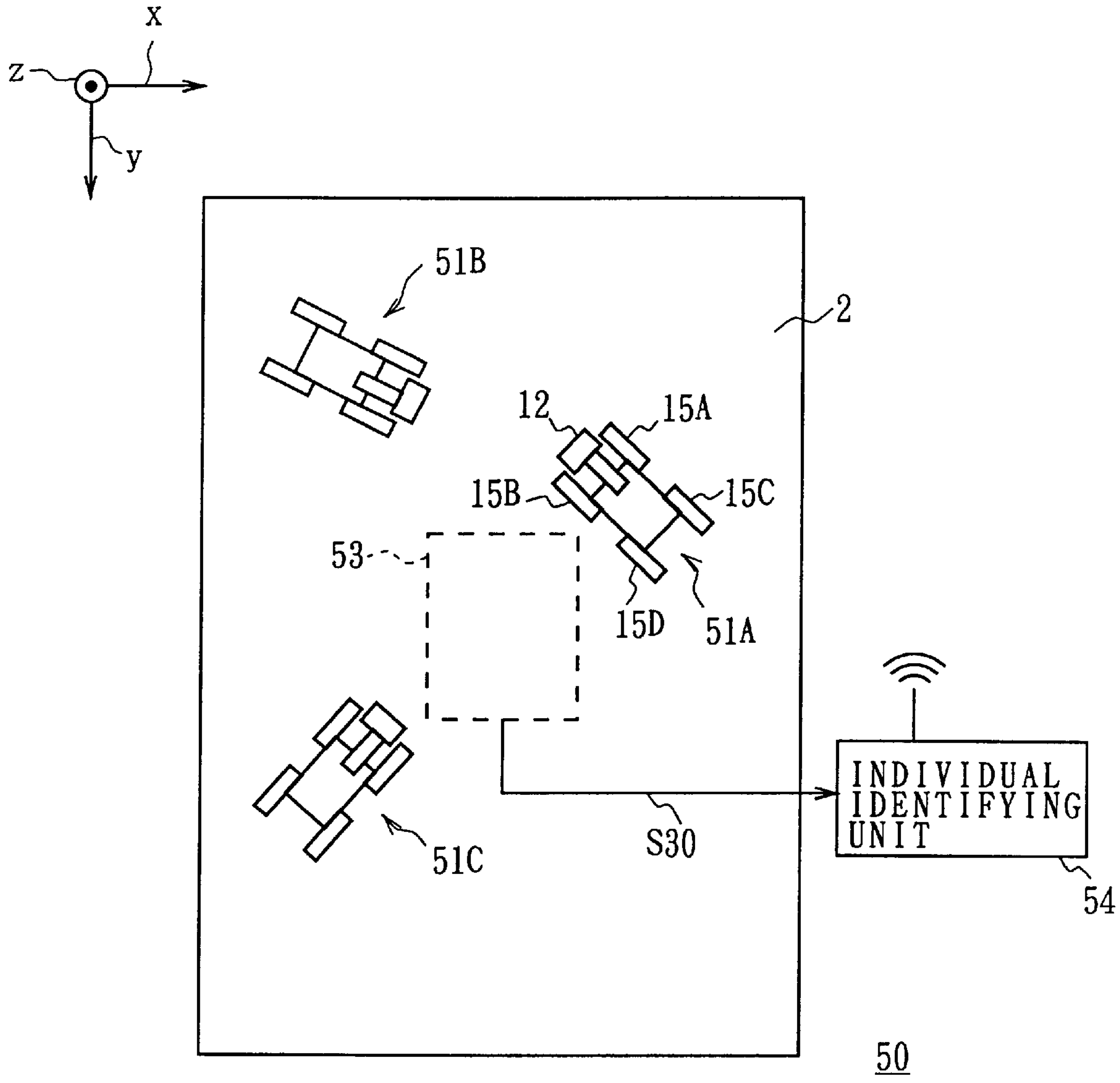
FIGS. 7 and 8 are plan views illustrating the whole configuration of an individual identifying system according to a second embodiment.
Figure 8:
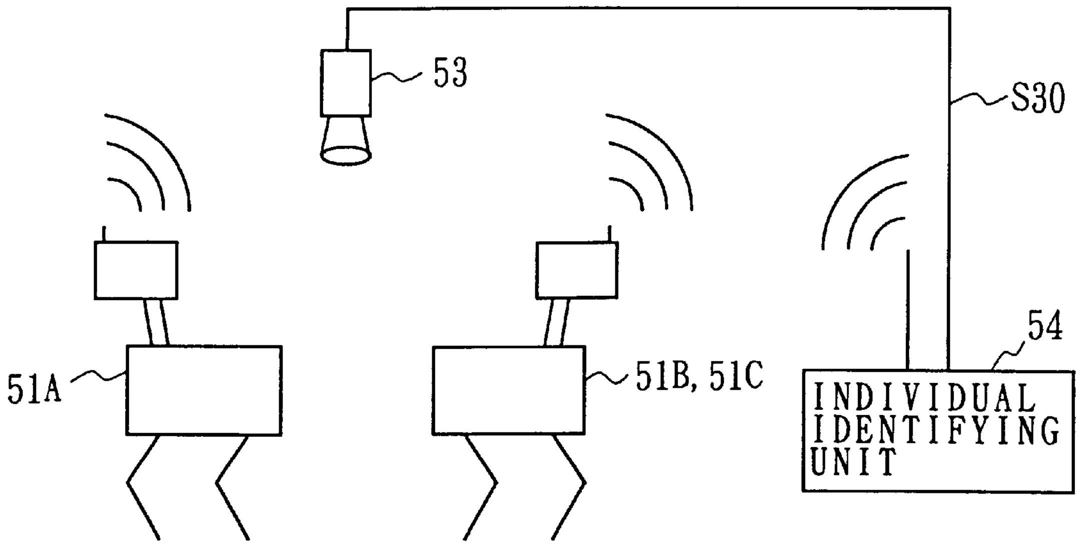
Figure 9:
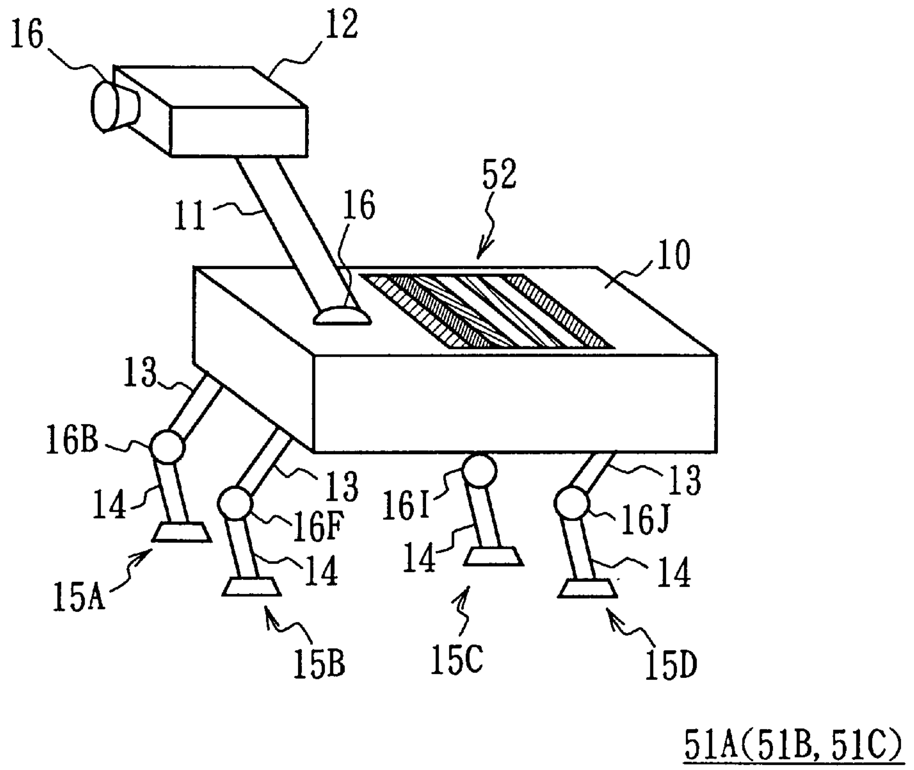
FIG. 9 is a schematic perspective view illustrating the structure of a robot according to the second embodiment.

(2) SECOND EMBODIMENT (2-1) Whole Configuration of Individual Identifying System According to Second Embodiment FIGS. 7 and 8 illustrate an individual identifying system 50 according to a second embodiment. As illustrated in FIG. 9 in which parts corresponding to those in FIG. 2A are designated by the same reference numerals, an identification seal 52 is put up on the upper surface of a body unit 10 of each of robots 51A to 51C.

Figure 10:
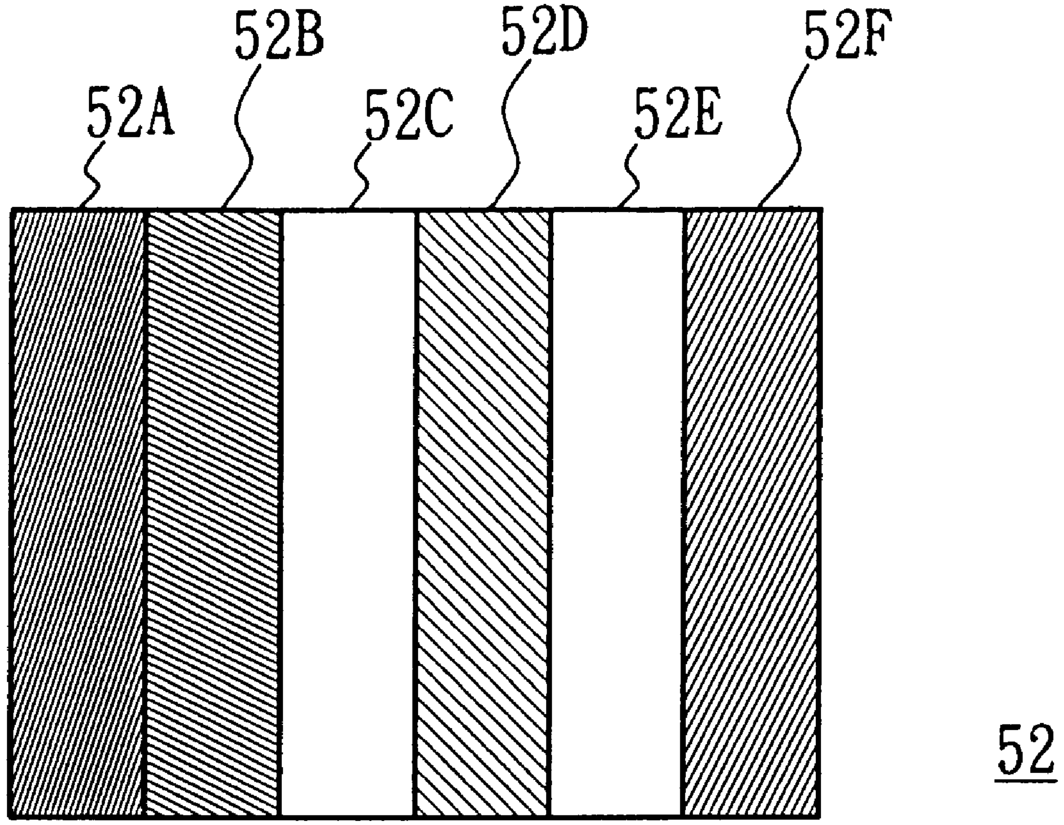
FIG. 10 is a plan view describing an identification seal.

In this embodiment, as illustrated in FIG. 10, the identification seal 52 of each of the robots 51A to 51C has its surface divided into a predetermined number (for example, six) of adjacent strip regions 52A to 52F, each of which is filled with any of a plurality of identifying colors. Also, a different combination of identifying colors (color pattern) is selected for each identification seal 52 for filling the respective strip regions 52A to 52F on the surface thereof. Thereby, the identifying apparatus can identify the robots 51A to 51C on the basis of the color patterns on the identification seals 52.

As can be also seen in FIGS. 7 and 8, a camera 53 is provided above a region 2 for shooting the entire region 2 within a single image. A video signal S30 outputted from the camera 53 is supplied to an individual identifying unit 54 disposed external to the region 2.

Figure 11:
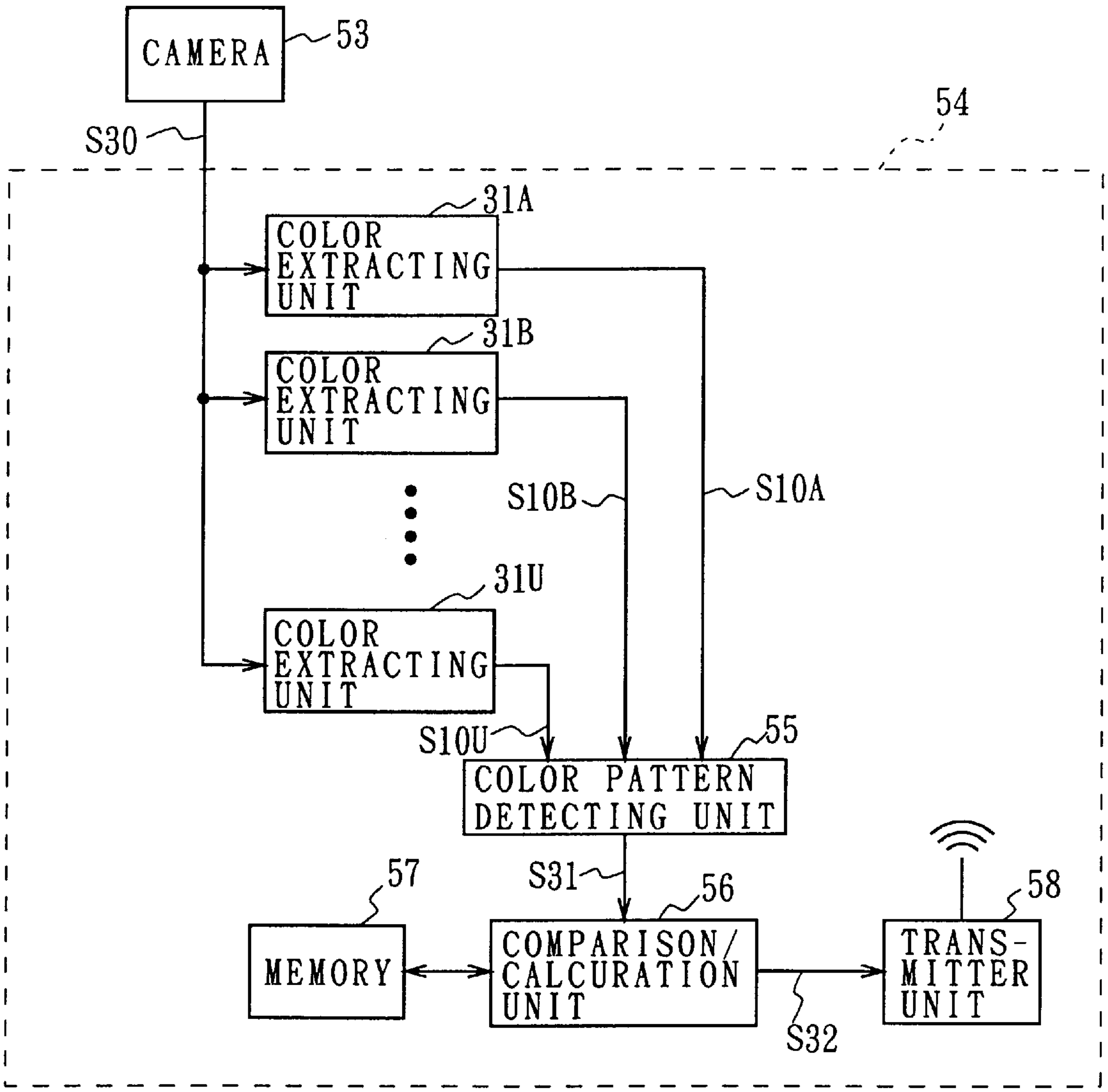
FIG. 11 is a block diagram illustrating the configuration of an individual identifying unit according to the second embodiment.

FIG. 11, in which parts corresponding to those in FIG. 4 are designated by the same reference numerals, illustrates the individual identifying unit 54. In this case, the individual identifying unit 54 is provided with a number of color extracting units 31A to 31U corresponding to the number of identifying colors (assume 16 colors). Color extraction signals S10A to S10U respectively outputted from the color extracting units 31A to 31U are respectively sent to a color pattern detecting unit 55.

The color pattern detecting unit 55 superimposes respective images represented by the respective color extraction signals S10A to S10U supplied thereto, scans the resulting image to detect a portion of the image in which a predetermined number of identifying colors are arranged in the form of stripe. Also, the color pattern detecting unit 55 determines the detected portion as the identification seal 52 of one of the robots 51A to 51, and then supplies a comparison/calculation unit 56 with an identification seal detection signal S31 including information on a color pattern of the identification seal 52 and information on the position of the identification seal 52 within the image in units of pixels. In this case, a number of identification seals 52 equal to the number of robots 51A to 51C located in the region 2 is detected, so that the color patterns and positions of the respective identification seals 52 are supplied to the comparison/calculation unit 56.

The comparison/calculation unit 56 detects ID's of respective identification seals 52 (i.e., identification of the respective robots 51A to 51C) within the image represented by the video signal S30 from the camera 53, based on the color patterns of the respective identification seals 52 derived on the basis of the identification seal detection signal S31 supplied thereto and a table previously stored in a memory 57 on color patterns of respective identification seals 52 and associated ID's. Thus, the comparison/calculation unit 56 transmits a robot position detection signal S32 including information on thus obtained ID's of the respective identification seals 52 and positional information on the identification seals 52 within the region 2 to the respective robots S1A to 51C moving within the region 2 through a transmitter unit 58 through radio waves.

Figure 12:
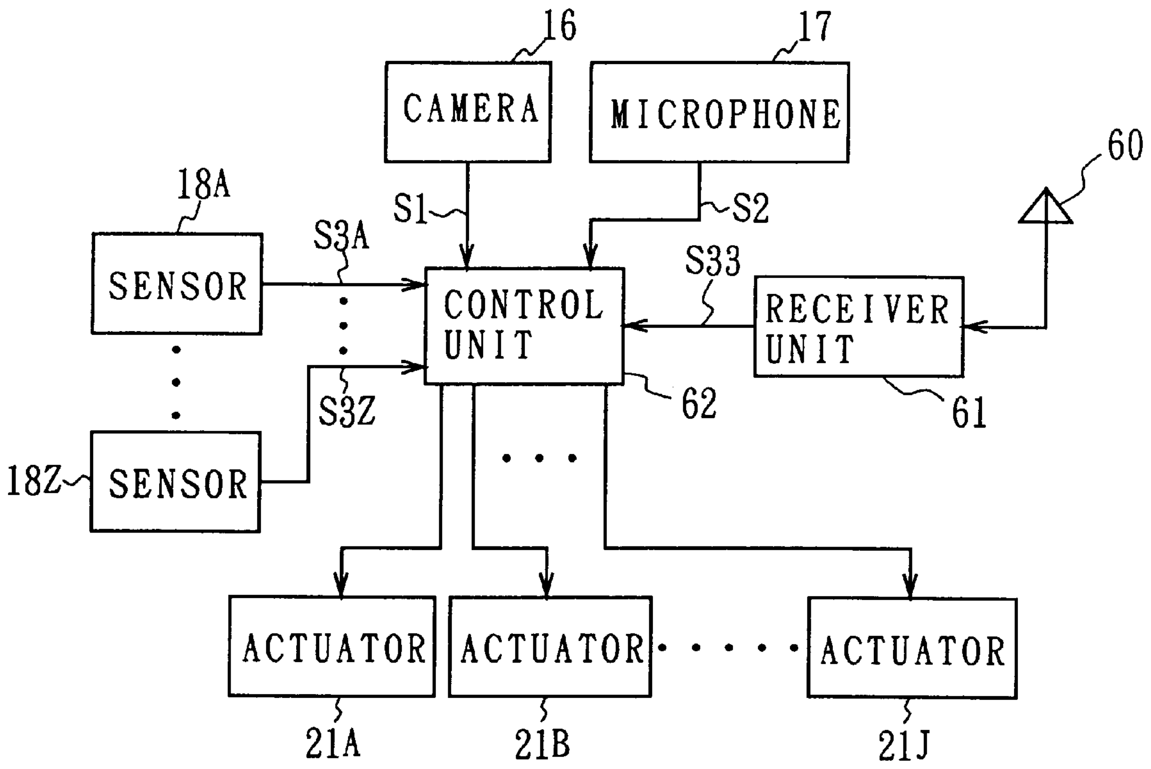
FIG. 12 is a schematic block diagram illustrating the configuration of the robot according to the second embodiment.

FIG. 12, in which parts corresponding to those in FIG. 3 are designated by the same reference numerals, illustrates each of the robots 51A to 51C. A receiver unit 61 receives the radio waves transmitted from the transmitter unit 58 of the individual identifying unit 54 through an antenna 60, and supplies a control unit 62 with a reception signal S33 including information on received ID's of the respective identification seals 52 (i.e., identifications of the respective robots 51A to 51C) and positional information on the identification seals 52 within the region 2.

In this event, the control unit 62 is supplied with a video signal S1 from the camera 16, with an audio signal S2 from a microphone 17, and with sensor signals S3A to S3Z from respective touch sensors 18A to 18Z.

Thus, the control unit 62 can recognize surrounding environments and the positions of the respective robots 51A to 51C including itself, based on the video signal S1, the audio signal S2, the respective sensor signals S3A to S3Z, and the reception signal S33 supplied thereto. Also, the control unit 62 determines its actions based on the recognition results, and drives respective actuators 21A to 21J based on the determination result.

In this way, the respective robots 51A to 51C can recognize their surrounding environments and the positions of all the robots 51A to 51C moving within the region 2, including itself, and can autonomously act based on the recognition results.

(2-2) Operation and Effects of Second Embodiment

In the individual identifying system 50, the camera 53 shoots the entire region 2 from above, and the respective color extracting units 31A to 31U and the color pattern detecting unit 55 in the individual identifying unit 54 disposed external to the region 2 detect the positions of respective identification seals 52 within an image on the basis of the obtained video signal S30. Then, the positions and ID's of the respective identification seals 52 within the image, which are detected from the detection results and color pattern information on the respective identification seals 52 stored in the memory 57, are transmitted to the respective robots 51A to 51C within the region 2 through the transmitter unit 58.

On the other hand, the respective robots 51A to 51C recognize surrounding situations and the positions of the respective robots 51A to 51C on the basis of the positional information on the respective robots 51A to 51C within the region 2 transmitted from the individual identifying unit 54, the video signal S1 supplied from the camera 16, the audio signal S2 supplied from the microphone 17, and the sensor signals S3A to S3Z respectively supplied from the touch sensors 18A to 18Z, so that each robot 51A to 51C can autonomously act based on the recognition results.

Thus, the individual identifying system 50 enables the respective robots 51A to 51C to reliably recognize absolute positions of the other robots 51A to 51C and itself within the region 2.

The individual identifying system 50 only requires the provision of the antenna 60 and the receiver unit 61 and the adhesion of the identification seal 53 as preparation needed to the respective robots 51A to S1C, so that the configurations of the robots 51A to 51C can be simple as compared with the robots 3A to 3C of the first embodiment (FIG. 2A).

Also, although the camera 53 for shooting the entire region 2 and the individual identifying unit 54 are additionally required, the entire system can also be simplified because only one set of the camera 53 and the individual identifying unit 54 is sufficient irrespective of the number of robots 51A to 51C.

Furthermore, in the individual identifying system 50, since the identification seal 52 is not painted in a single color but in a plurality of colors, a large number of robots 51A to 51C can be easily identified on the basis of combinations of different colors. In this case, a increased number of combinations can be provided even if only colors having largely different hues from each other, such as the primary colors, are used as the identifying colors, so that the individual identifying system 50 has the advantage of being less susceptible to illumination conditions and so on as compared with individual identification techniques which rely on subtle difference in color.

Further, in the individual identifying system 50, since the individual identifying unit 54 can collectively recognize the ID's and positions of the respective robots 51A to 51C within the region 2, the recognition results can be stored as records of activities of the respective robots 51A to 51C and utilized to evaluate or improve programs for controlling the respective robots 51A to 51C.

Further, since the individual identifying system 50 does not utilize visual senses of the robots 51A to 51C, the individual identifying system 50 can be applied even if the robots 51A to 51C have relatively low visual processing capabilities or if the robots 51A to 51C do not have any visual sense.

According to the foregoing configuration, the camera 53 shoots the entire region 2 in which the robots 51A to 51C is moving from above, and the individual identifying unit 54 detects the positions of respective identification seals 52 within the image based on the obtained video signal S30, detects the ID's of the respective identification seals 52 within the image from the detection results and color pattern information on the respective identification seals 52 stored in the memory 57, and transmits the detection results to the respective robots 51A to 51C within the region 2. Therefore, an individual identifying system and a robot which can reliably identify the respective robots 51A to 51C within the action region 2 can be realized in a simple configuration.

(3) THIRD EMBODIMENT

Figure 13:
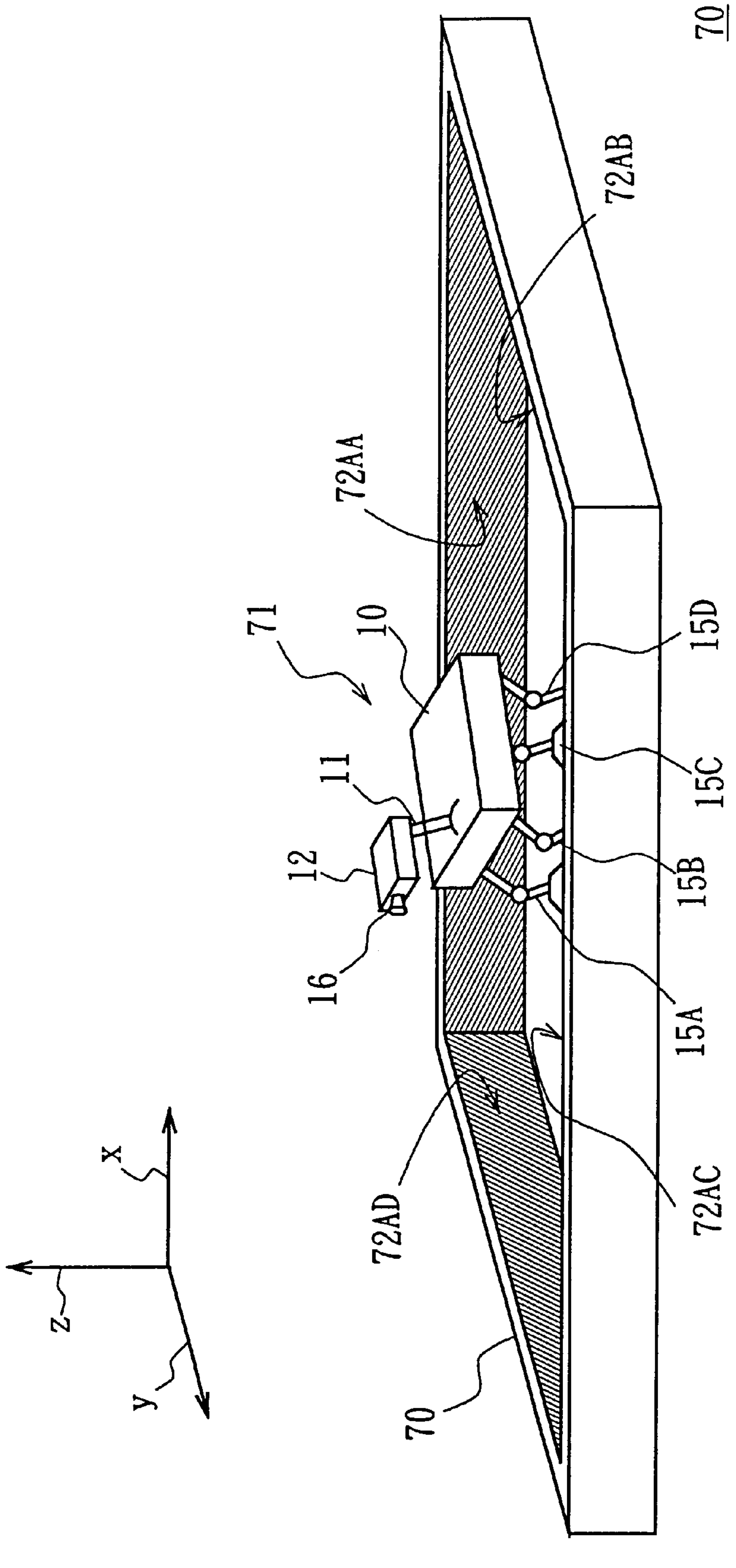
FIG. 13 is a schematic perspective view illustrating the whole configuration of a position identifying system according to a, third embodiment.

(3-1) Whole Configuration of Position Detecting System According to Third Embodiment FIG. 13, in which parts corresponding to those in FIG. 2A are designated by the same reference numerals, illustrates a position detecting system 70 to which the present invention is applied. An wall 72 having a predetermined height is provided along the periphery of an action region 2 of a robot 71.

In this embodiment, in an inside wall surface 72A of the wall 72, wall surfaces 72AA to 72AD, along respective sides of the region 2, are painted in different colors from each other. Thereby, the wall surfaces 72AA to 72AD can be readily identified on the basis of the painted colors.

Figure 15:
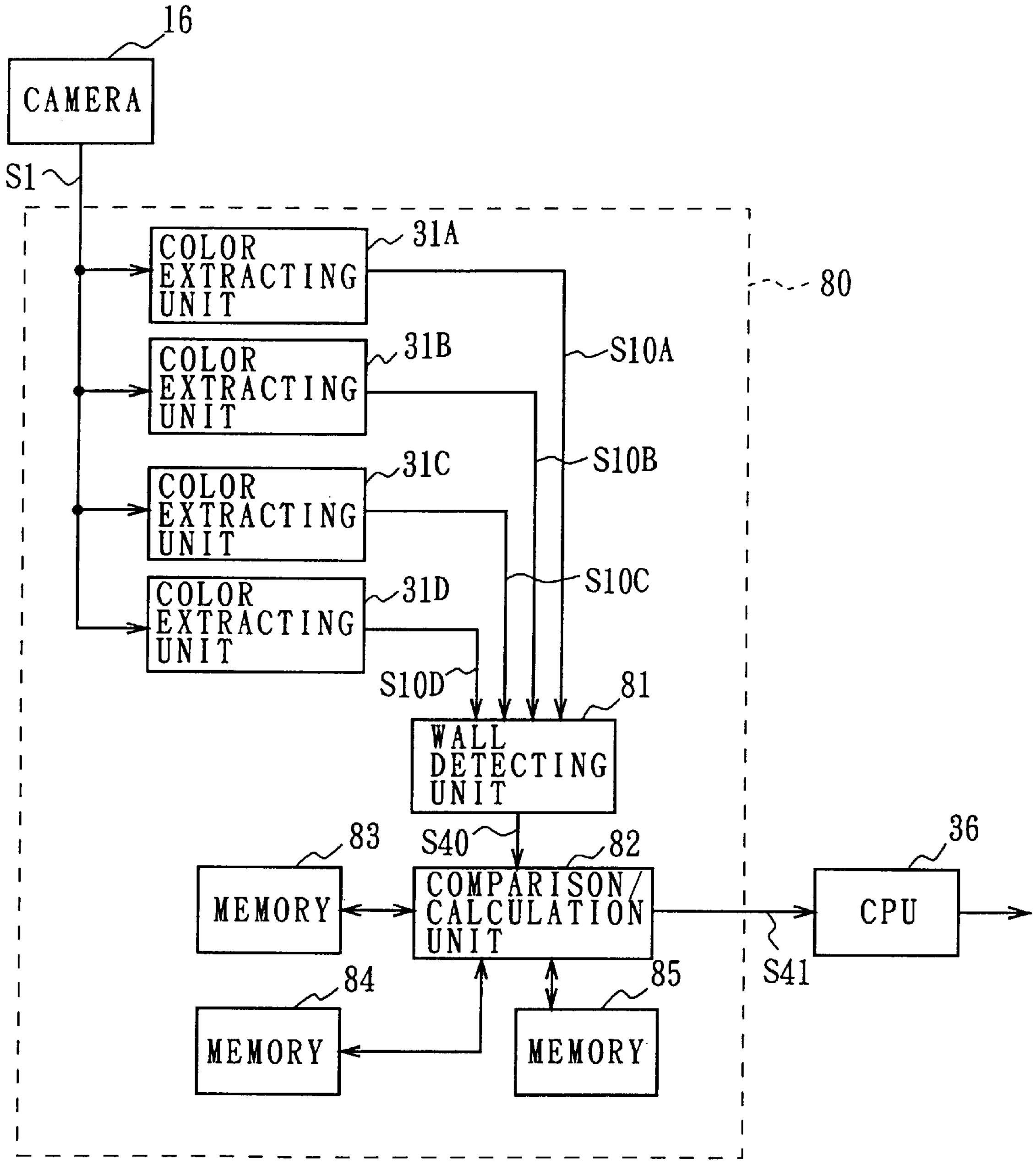
FIG. 15 is a block diagram illustrating the configuration of a position detecting unit according to the third embodiment.

On the other hand, the robot 71 is configured in a manner similar to the robots 3A to 3C (FIG. 2A, FIG. 3) of the first embodiment except that a wall identifying unit 80 is provided as shown in FIG. 15.

In this embodiment, the wall identifying unit 80 is provided with a number of color extracting units 31A to 31D equal to the number of the wall surfaces 72AA to 72AD along the respective sides of the region 2 (assume four). A video signal, S1 supplied from the camera 16 is inputted to the respective color extracting units 31A to 31D.

As a result, the color extracting units 31A to 31D respectively output color extraction signals S10A to S10D in which portions corresponding to pixels of a corresponding color out of pixels constituting an image represented by the video signal S1 is a logical "1" level and portions corresponding to pixels of other colors is a logical "0" level, to a wall detecting unit 81. The respective color extracting units 31A to 31D only extract an associated one of a plurality of identifying colors painted on the respective wall surfaces 72AA to 72AD.

The wall detecting unit 81 superimposes images represented by the color extraction signals S10A to S10D supplied thereto from the respective color extracting units 31A to 31D and scans the resulting image to determine that a horizontal elongated region in a single color is one of the wall surfaces 72AA to 72AD. Also, the wall detecting unit 81 detects a color painted on the determined wall surface 72AA to 72AD, and detects the height of the determined wall surface 72AA to 72AD within the image represented by the video signal S1 in units of pixels, in order to send thus detected color and height of the wall surface 72AA to 72AD within the image to a comparison/calculation unit 82 as a wall detection signal S40.

The comparison/calculation unit 82 searches for the ID of the wall surface 72AA to 72AD based on the color of the wall surface 72AA to 72AD obtained based on the wall detection signal S40 and a table previously stored in a first memory 83 on the respective colors of the wall surfaces 72AA to 72AD and associated ID's.

The comparison/calculation unit 82 also calculate the following expression (2) based on the height (designated by Hpic) of the wall surface 72AA to 72AD within the image revealed from the wall detection signal S40, and a reference value previously stored in a second memory 84 (the height (designated by Hstd) of the wall surface 72AA to 72AD in units of pixels within the image when the robot 71 is located one meter away from the wall surface 72AA to 72AD).

$$L2(L3) = \frac{Hstd}{Hpic}[\mathrm{m}] \tag{2}$$

Thereby, the comparison/calculation unit 82 calculates a distance L2 from the camera 16 to the wall surface 72AA to 72AD.

Further, after the camera 16 is subsequently directed to a different wall surface 72AA to 72AD (hereinafter, called the second wall surface) from the previous wall surface (hereinafter, called the first wall surface), the comparison/calculation unit 82 executes the similar processing to calculate the ID of the second wall surface 72AA to 72AD and a distance L3 to the second wall surface 72AA to 72AD.

Further, the comparison/calculation unit,82 detects its position within the region 2 based on the ID of the first wall surface 72AA to 72AD, the distance L2 to the first wall surface 72AA to 72AD, the ID of the second wall surface 72AA to 72AD, the distance L3 to the second wall surface 72AA to 72AD, obtained as mentioned above, and map information on the region 2, including the positions of the respective wall surfaces 72AA to 72AD along the respectively sides of the region 2, previously stored in a third memory 85. Then, the comparison/calculation unit 82 supplies information on the detected position as a position detection signal S41 to the highest ranked CPU 36 which governs all actions of the robot 71.

In this way, the robot 71 can recognize its position within the region 2 by the CPU 36 based on the position detection signal S41, and can autonomously act in accordance with surrounding situations based on the recognition result.

(3-2) Operation and Effects of Third Embodiment

In the foregoing configuration of the position detecting system 70, the robot 71 detects colors painted on first and second surrounding wall surfaces 72AA to 72AD based on the video signal S1 outputted from the camera 16, and the heights Hpic of the first and second wall surfaces 72AA to 72AD within the image represented by the video signal S1, and detects its position within the region 2 based on the detection results, the colors and ID's of the respective wall surfaces 72AA to 72AD previously stored in the first memory 83, the reference value Hstd previously stored in the second memory 84, and the map information previously stored in the third memory 85.

Thus, the position detecting system 70 enables the robot 71 to readily and accurately recognize its position within the region 2 based on the colors of two wall surfaces 72AA to 72AD and the heights Hpic of these wall surfaces 72AA to 72AD within the image.

Also, since the position detecting system 70 only requires to paint the respective wall surfaces 72AA to 72AD positioned along the respective sides of the region 2 colors different from each other, the system can be built in an extremely simple manner.

Further, since the position detecting system 70 does not use a method of transmitting any special signal such as radio waves, the position detecting system 70 can be used without requiring any consideration on influences on other devices located nearby or the radio wave rules. In addition, since any signal generator is not required on the floor surface of the region 2, the robot 71 will not be prevented from moving in any direction.

Further, since the position detecting system 70 does not employ symbols, marks, or the like drawn on the floor surface within the action region 2 of the robot 71, the floor surface can be painted for other purposes.

Furthermore, in the position detecting system 70, a wall surface 72AA to 72AD in front of the robot 71 can be shot by the camera 16 of the robot 71 only to be directed substantially in the horizontal direction, so that the camera 16 need not be directed in a predetermined direction for detecting the position of the robot 71 itself within the region 2. Also advantageously, the robot 71 can detect its position within the region 2 while capturing other robots 71 by the camera 16.

According to the foregoing configuration, the wall surfaces 72AA to 72AD are disposed along the respective sides of the action region 2 of the robot 71, where the wall surfaces 72AA to 72AD are painted in different colors from each other, while the robot 71 detects the colors of at least two wall surfaces 72AA to 72AD shot by the camera 16 on the basis of the video signal S1 outputted from the camera 16, and heights Hpic of the respective wall surfaces 72AA to 72AD within the image represented by the video signal S1. Then, the robot 71 detects its position within the region 2 based on the detection results, the identifying colors and ID's of the respective wall surfaces 72AA to 72AD previously stored in the first memory 83, the reference value Hstd previously stored in the second memory 84, and the map information on the region 2 previously stored in the third memory 85. Thus, the robot 71 can accurately detect its position within the region 2, thereby making it possible to realize a position detecting system and a robot capable of accurately detecting its position within the region 2.

(4) FOURTH EMBODIMENT (4-1) Theory

Generally, color can be represented by three attributes; hue, saturation, and intensity.

Figure 16A:
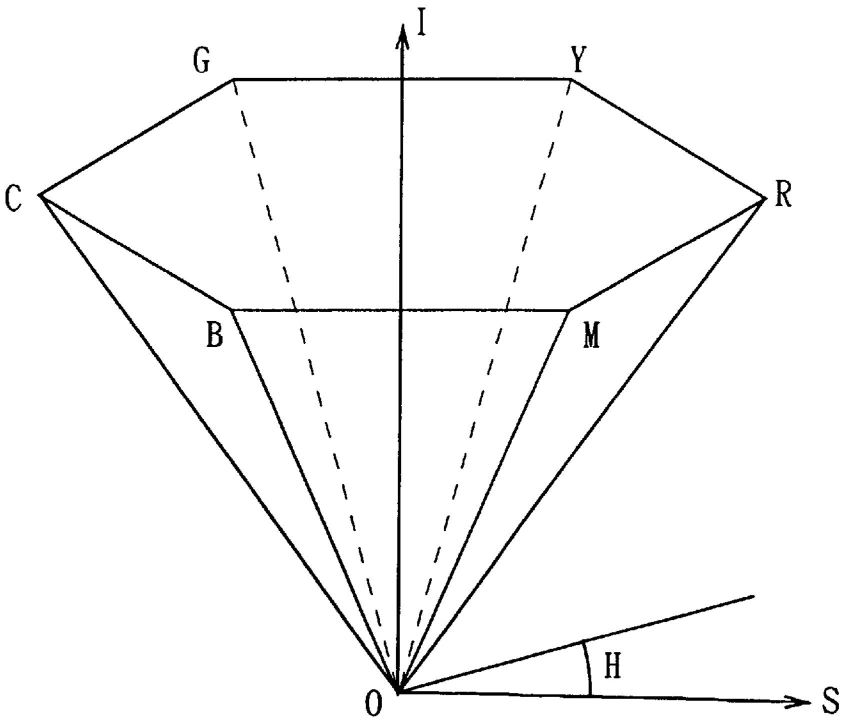
FIGS. 16A and 16B are schematic diagrams describing the HSI space.
Figure 16B:
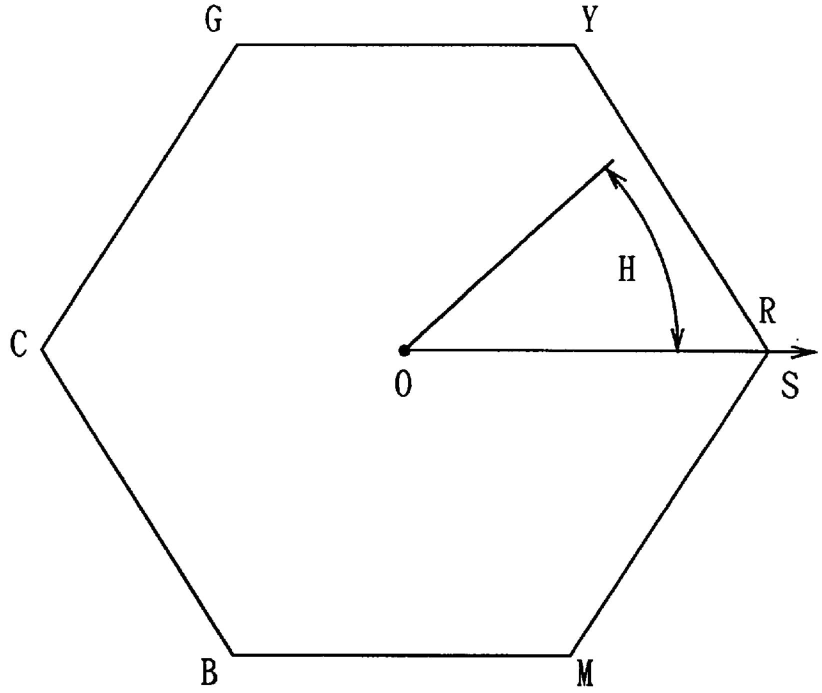

The relation among the hue, saturation (also, called a degree of saturation), and intensity, as shown in FIGS. 16A and 16B, can be represented by polar coordinates in which, in the case where one arbitrary point on the plane is assumed to the origin "O", it is assumed that the hue is an angle around the origin "O" on the plane, the saturation is a distance from the origin "O" on the plane, and the intensity is a distance from the origin "O" in a direction perpendicular to the plane. Note that, apexes of a hexagon shown in FIG. 16B respectively correspond to "R" (red), "Y" (yellow), "G" (green), "C" (cyanogen), "B" (blue), and "M" (magenta).

By the way, in a system for identifying objects by differences of colors painted on objects (the identifier 23 in the first embodiment, the identifying mark 52 in the second embodiment, and the wall surfaces 72AA to 72AD in the third embodiment) as the aforementioned first to third embodiments, even if colors are the same, color views vary due to illumination conditions, the direction of viewing an object, or the like. Therefore, for example, the first to third embodiments cope with the variation by allowing some latitude in the conditions for identifying colors.

However, in consequence of the way of selecting colors painted on the objects, when illumination conditions or the like changes, the robot may recognize a shot color as a different color because the shot color may belong to an identifying condition of different color. As a result, the object painted in the color may not be reliably identified.

As one method of preventing such the situation, for example, colors which are away from each other in distances in a predetermined color space are previously used as combinations of colors for identifying. And, the robot converts a format of a video signal outputted from the camera into a format of the color space to identify the colors.

Specifically, a plurality of colors of which hues are away from each other more than a predetermined angle (for example, 60°) in a color space (hereinafter, referred to as an HSI space) in which colors are represented by three attributes; hue, saturation, intensity. In addition, the robot converts the image format of the video signal outputted from the camera into the format (hereinafter, referred to as an HSI format) in which colors is represented by hue (H), saturation (S), intensity (I) in order to identify the color from the hue based on thus obtained video signal. Thus, the robot is not susceptible to illumination conditions when color identification, and further can efficiently avoid the error judgement of color identification.

(4-2) Configuration of Position Detecting System According to Fourth Embodiment

Figure 14:
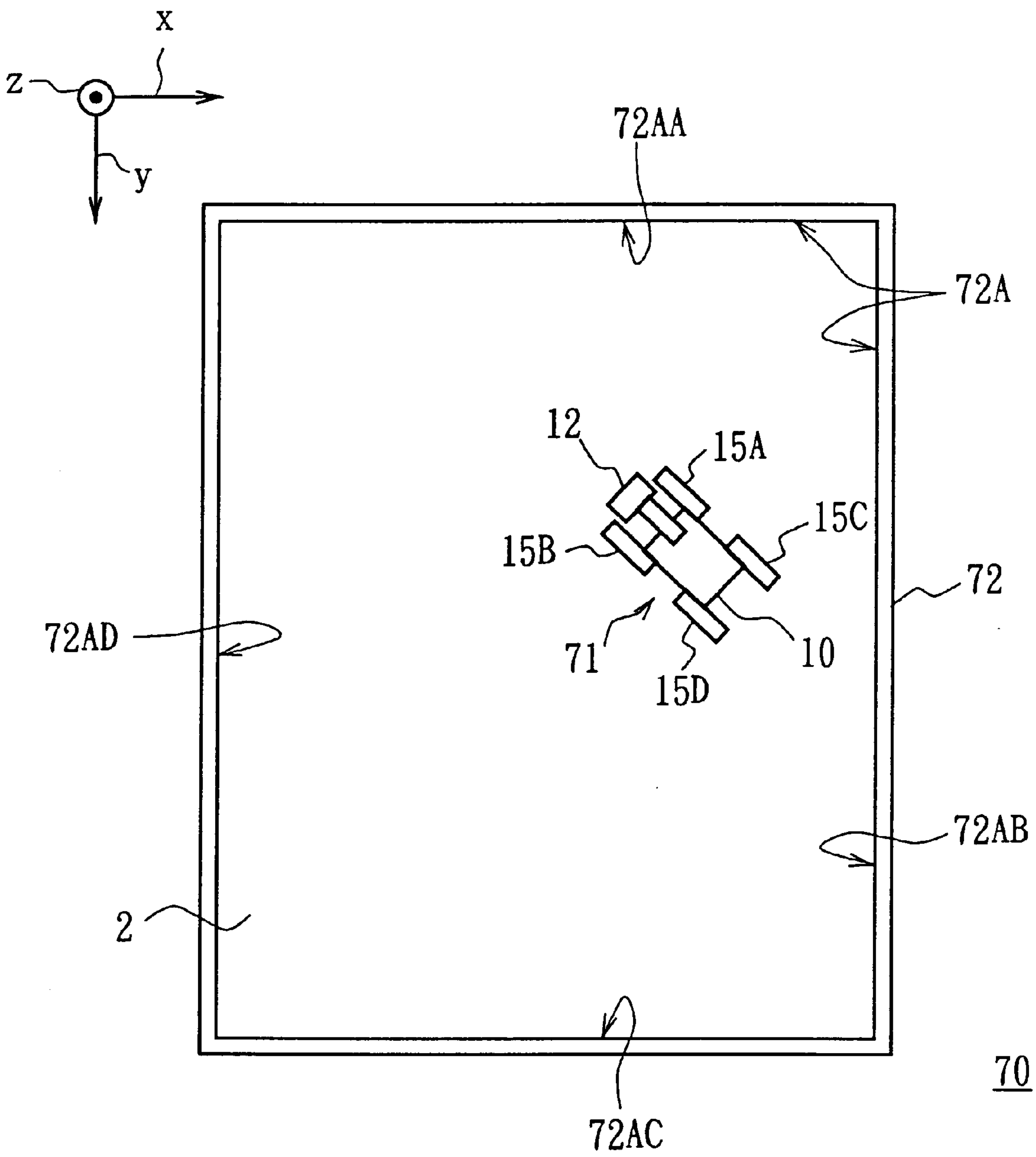
FIG. 14 is a plan view illustrating the whole configuration of the position identifying system according to the third embodiment.
Figure 17:
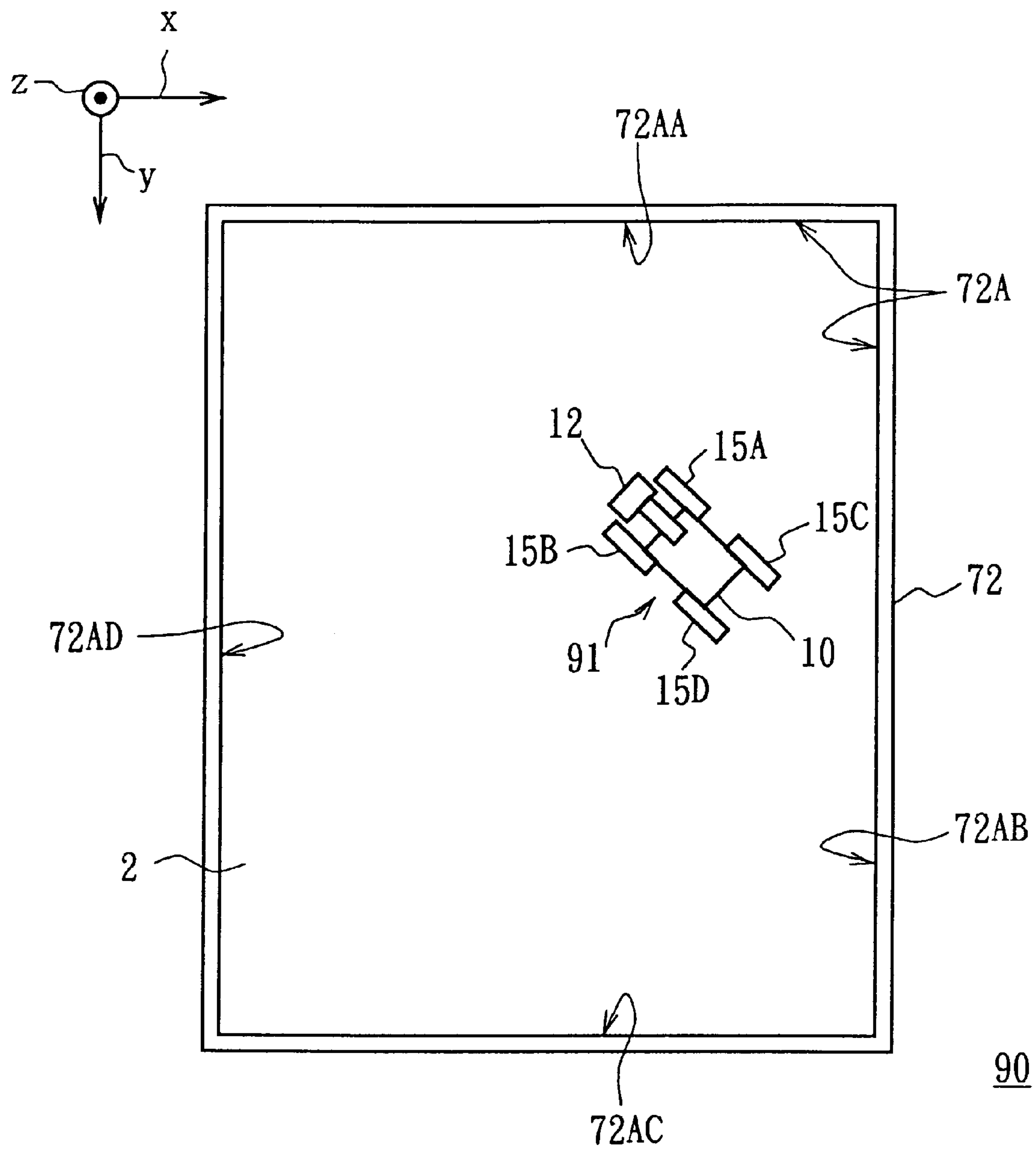
FIG. 17 is a plan view illustrating the whole configuration of a position identifying system according to a fourth embodiment.

FIG. 17, in which the same reference numerals are applied to parts corresponding to FIG. 14, illustrates a position detecting system 90 according to a fourth embodiment, where the region 2 and respective wall surfaces 72AA to 72AD of the wall 72 along respective sides of the region 2 are respectively pained in individual colors different from each other.

In this embodiment, five colors (for example, R, Y, G, C, and B) of which hues are away from each other more than 60° in the HSI space are selected as colors for being respectively painted on the region 2 and the respective wall surfaces 72AA to 72AD.

Figure 18:
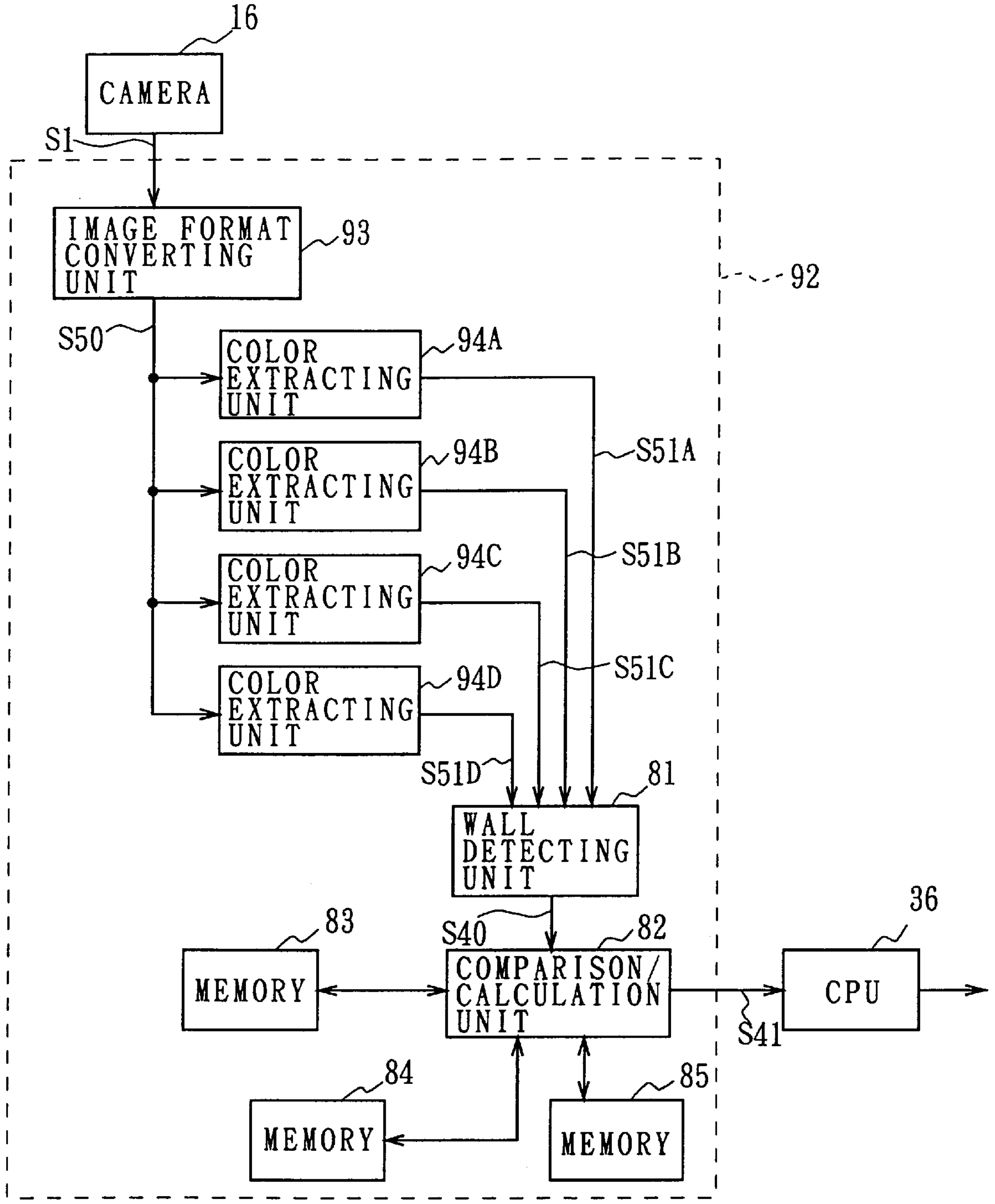
FIG. 18 is a block diagram illustrating the configuration of A a position detecting unit according to the fourth embodiment.

On the other hand, a robot 91 is the similar construction to the robot 71 (FIG. 14) of the third embodiment except that a position detecting unit 92 as shown in FIG. 18, in which the same reference numerals are applied to parts corresponding to FIG. 15, is provided in place of the position detecting unit 80 (FIG. 15) in the robot 71.

In this case, the position detecting unit 92 has an image format converting unit 93 and as many color extracting units 94A to 94D as that of the wall surfaces 72AA to 72AD. The image format converting unit 93 converts a video signal S1 supplied from the camera 16 into a video signal S50 of the HSI format to transmit the video signal S50 to the respective color extracting unit 94A to 94D.

Each of the color extracting unit 94A to 94D detects pixels having hue within a predetermined angle from designated hue in the polar coordinates shown in FIG. 16B as a pixel to be extracted, based on hue information on respective pixels included in the video signal S50. Then, the respective extracting units 94A to 94D generate color extraction signals S51A to S51D in which the portions corresponding to pixels to be extracted rises to a logical "1" level and the portions corresponding to pixels of other colors falls to a logical "0" level, based on the detection results, in order to send these to the wall detecting unit 81. Note that, the respective color extracting units 94A to 94D extract pixels of predetermined colors different from each other from a plurality of colors respectively painted on the wall surfaces 72AA to 72AD.

As a result, as described above in FIG. 15, the wall detecting unit 81 detects colors of the wall surfaces 72AA to 72AD shot by the camera 16 based on the color extraction signals S51A to S51D and the height Hpic within the image of the wall surfaces 72AA to 72AD in units of pixels, and further the comparison/calculation unit 82 detects its position within the region 2 based on the detection results in the similar way to the third embodiment and sends the detection result as a position detection signal S41 to the highest ranked CPU 36 which controls the action of the robot 91.

Accordingly, the robot 91 can recognize its position within the region 2 based on the position detection signal S41 by the CPU 36, and can automatically act based on the recognition result in accordance with the surrounding situation.

(4-3) Operation and Effect of Fourth Embodiment

According to the aforementioned configuration, in the position detecting system 90, in similar to the position detecting system 70 (FIG. 14) of the third embodiment, the robot 91 detects the colors of the first and second surrounding wall surfaces 72AA to 72AD based on a video signal S1 outputted from the camera 16 and heights Hpic of the first and second wall surfaces 72AA to 72AD within the image represented by the video signal S1, in order to detect its position within the region 2 based on the detection results, the colors and ID's of the respective wall surfaces 72AA to 72AD previously stored in the first memory 83, the reference value Hstd previously stored in the second memory 84, and the map information previously stored in the third memory 85.

Accordingly, the position detecting system 91 can obtain the same operation effects as the position detecting system 70 of the third embodiment.

In addition, the position detecting system 90 use colors of which hues are away from each other more than 60° in the HSI space as colors for being painted on the respective wall surfaces 72AA to 72AD of the wall 72 and the region 2 respectively, and further identifies colors after converting an image format of the video signal S1 outputted from the camera 16 into an HSI format as internal processing of the robot 91, so that variations of illumination conditions or the like for the wall surfaces 72AA to 72AD hardly affect the robot 91 in color identification. Thus, the robot 91 can efficiently avoid the error judgement of color identification.

According to the aforementioned configuration, in the position detecting system 70 (FIG. 40) of the third embodiment, colors of which hues are away from each other more than 60° in the HSI space are used as colors for being painted on the respective wall surfaces 72AA to 72AD of the wall 72 and the region 2 respectively, and the video signal S1 outputted from the camera 16 is converted into the video signal S50 of the HSI format as the internal processing of the robot 91 and then the color identification is executed based on the video signal S50, thereby the robot 91 can efficiently avoid the error judgement of color identification. Thus, the robot 91 can avoid error recognition of objects, thereby making it possible to realize a position detecting system and a robot apparatus which can accurately detect its position within the region 2.

(5) FIFTH EMBODIMENT

Figure 19:
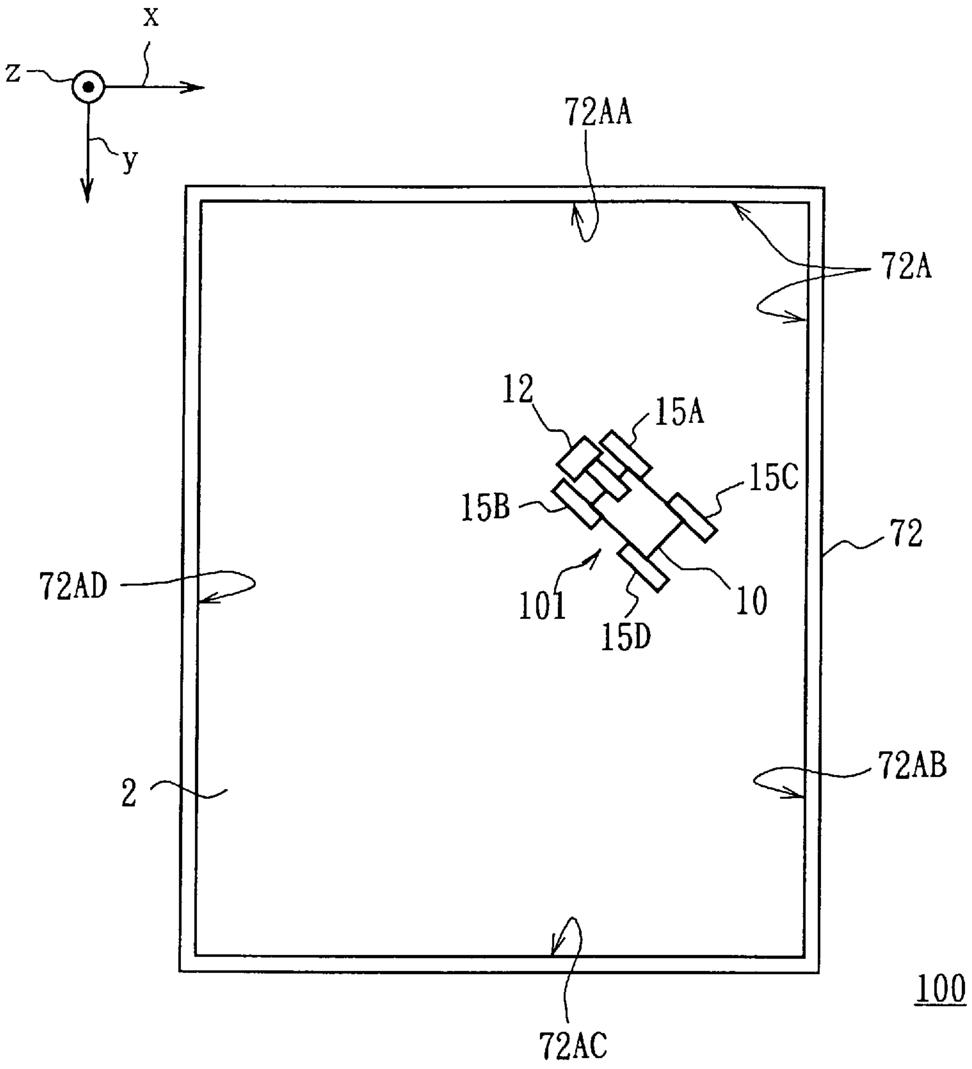
FIG. 19 is a plan view illustrating the whole configuration of the position identifying system according to a fifth embodiment.

(5-1) Configuration of Position Detecting System According to Fifth Embodiment FIG. 19, in which the same reference numerals are applied to parts corresponding to FIG. 17, illustrates a position detecting system 100 according to a fifth embodiment. The respective wall surfaces 72AA to 72AD of the wall 72 are painted in individual different colors of which hues are away from each other more than 60° in the HSI space.

Figure 20:
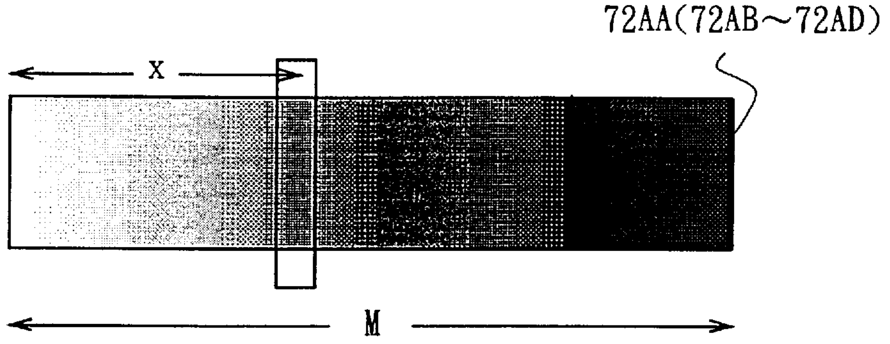
FIG. 20 is a schematic diagram illustrating condition of each wall surface according to the fifth embodiment.

In this embodiment, as illustrated in FIG. 20, colors of the respective wall surfaces 72AA to 72AD are painted so that saturation (degree of saturation) of one end of the respective wall surfaces 72AA to 72AD in a longitudinal direction is lowest and the saturation increases in a linear form as it moves from the one end to the other end. Specifically, when the saturation of the color of one end of the wall surfaces 72AA to 72AD is Smin, the saturation of the other end is Smax, and the length of the wall surface 72AA to 72AD in a longitudinal direction is M, the colors are painted so that the saturation Sx of the color at a position which is a distance x away from one end of the wall surface 72AA to 72AD satisfies the following expression (3).

$$Sx = \frac{(S\max - S\min) \times x}{M} + S\min \quad (3)$$

Figure 21:
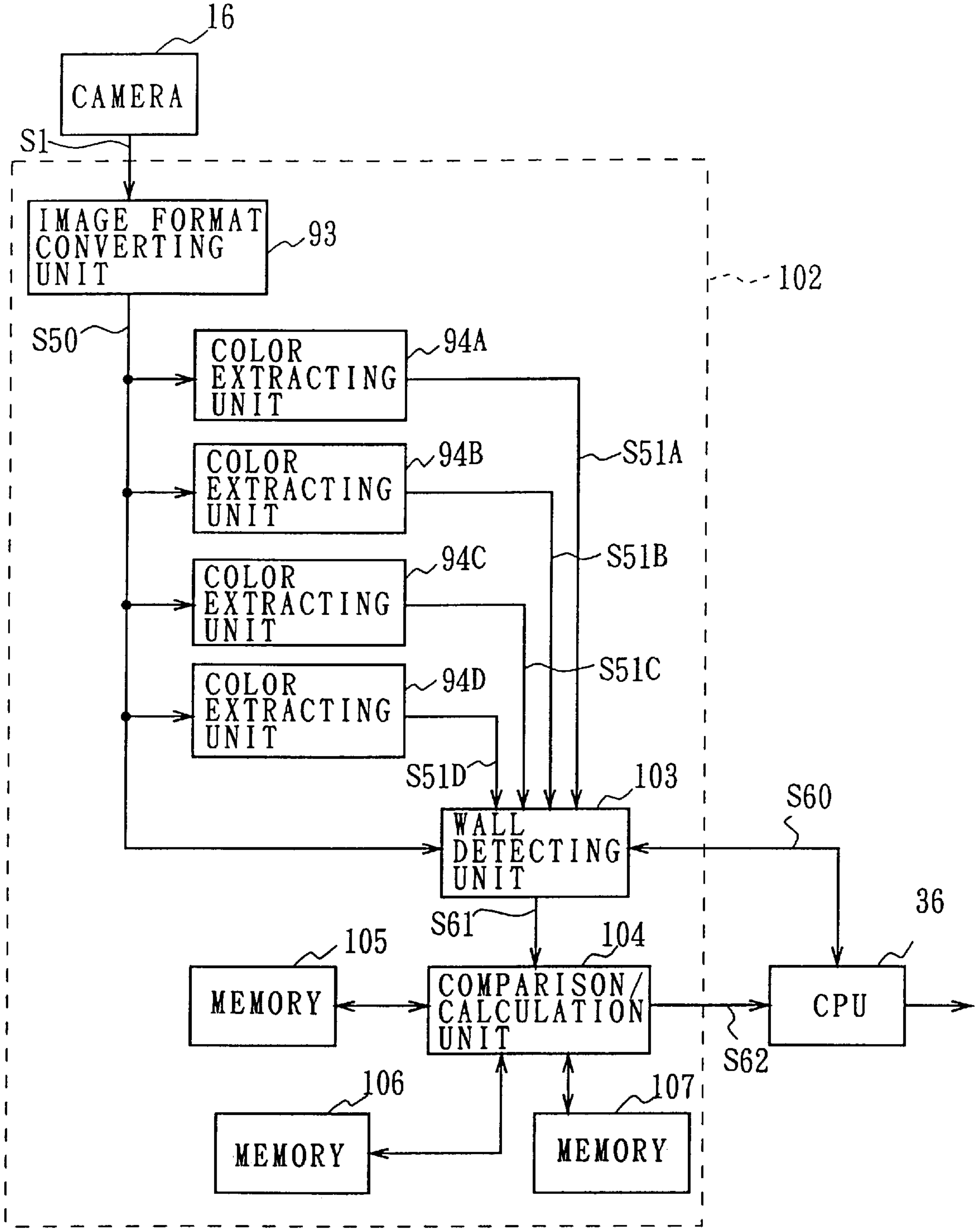
FIG. 21 is a block diagram illustrating the configuration of a position detecting unit according to the fifth embodiment.

On the other hand, a robot 101 has the similar structure to the robot 91 (FIG. 17) of the forth embodiment except that a position detecting unit 102 illustrated in FIG. 21, in which the same reference numerals are applied to parts corresponding to FIG. 18, is provided in the robot 91 in place of the position detecting unit 92 (FIG. 18).

In this case, the position detecting unit 102 provides with as many color extracting units 94A to 94D as the wall surfaces 72AA to 72AD along respective sides of the region 2. The image format converting unit 93 converts an image format of a video signal S1 outputted from the camera 16 into the HSI format, and then send thus obtained video signal S50 to the respective color extracting units 94A to 94D.

The respective color extracting units 94A to 94D extract pixels having a predetermined color from the image represented by the video signal S50 and respectively sends color extraction signals S51A to S51D in which the portions corresponding to the pixels rises to a logical "1" level and the portions corresponding to the pixels of other colors falls to a logical "0" level to a wall detecting unit 103.

The wall detecting unit 103 superimposes images represented by the color extraction signals S51A to S51D supplied thereto from the respective color extracting units 94A to 94D and scans the resulting image to detect a horizontal elongated region in the same color as one of the wall surfaces 72AA to 72AD, and then gives the detection result as a wall detection signal S60 to the highest ranked CPU 36 which controls the action of the robot.

In this time, the CPU 36 drives actuators of corresponding joint units to change the direction of the camera 16 (i.e., the head unit of the robot 101) in the right or left direction. And, the CPU 36 detects a wall surface 72AA to 72AD (the nearest wall surface) having most number of pixels within the images represented. by the video signal S50 based on the wall detection signal S60 supplied from the wall detecting unit 103, and adjusts the direction of the camera 16 so that the upper end or the lower end of the wall surface 72AA to 72AD within the image are level (that is, an optical axis of the camera 16 is perpendicular to the wall surface 72AA to 72AD).

In the situation where the optical axis of the camera 16 is perpendicular to the nearest wall surface 72AA to 72AD, the wall detecting unit 103 detects a color of the wall surface 72AA to 72AD based on the color extraction signals S51A to S51D supplied from the respective color extracting units 94A to 94D, and detects the saturation Sx of a color painted on the wall surface 72AA to 72AD at the center of the image represented by the video signal S50 based on the video signal S50 supplied from the image format converting unit 93, in order to send the detected color of the wall surface 72AA to 72AD and the detected saturation Sx of the color painted on the wall surface 72AA to 72AD at the center of the image to the comparison/calculation unit 104 as a color and saturation detection signal S61.

The comparison/calculation unit 104 detects the ID of the surface 72AA to 72AD based on the color of the wall surface 72AA to 72AD obtained based on the color and saturation detection signal S61 and the table on the colors and the ID's of the respective wall. surfaces 72AA to 72AD previously stored in the first memory 105.

The comparison/calculation unit 104 also calculates back to the expression (3) based on the saturation Sx of the wall surface 72AA to 72AD at the center of the image represented by the color and saturation signal S61, the respective saturation Smin and Smax at one end and the other end of the respective wall surfaces 72AA to 72AD previously stored in the second memory 106, and the length M of the respective wall surfaces 72AA to 72AD, in order to detect its position in a direction parallel to the wall surface 72AA to 72AD.

Thereafter, the camera 16 is directed toward a wall surface 72AA to 72AD (hereinafter, referred to as a second wall surface 72AA to 72AD) different from the wall surface 72AA to 72AD (referred to as a first wall surface 72AA to 72AD) by rotating by 90° under the control of the CPU 36, then the comparison/calculation unit 105 executes the similar processing to detect an ID of the second wall surface 72AA to 72AD and its position in a direction parallel to the second wall surface 72AA to 72AD.

In addition, the comparison/calculation 104 detects its position within the region based on thus obtained ID of the first wall surface 72AA to 72AD and its position in the direction parallel to the first wall surface 72AA to 72AD, thus obtained ID of the second wall surface 72AA to 72AD and its position in the direction parallel to the second wall surface 72AA to 72AD, and map information of the region 2 including positions of the respective wall surfaces 72AA to 72AD previously stored in the third memory 107, and then send the detection result as a position signal S62 to the CPU 36.

Accordingly, the robot 101 can recognize its position within the region 2 based on the position detection signal S62 by the CPU 36, and can automatically act according to surrounding situations based on the recognition result.

(5-2) Operation and Effect of Fifth Embodiment

According to the aforementioned configuration, in the position detecting system 100, the robot 101 detects colors of surrounding first and second wall surfaces 72AA to 72AD based on the video signal S1 outputted from the camera 16 and the saturation Sx at the center of the image represented by the video signal S1 of the colors, in order to detect its position within the region 2 based on the detection results, the colors and ID's of the respective wall surfaces 72AA to 72AD stored in the first memory 105, length M of the respective wall surfaces 72AA to 72AD and the saturation Smin and Smax of the colors of one end and the other end of the respective wall surfaces 72AA to 72AD respectively stored in the second memory 106, and the map information stored in the third memory 107.

Accordingly, in the position detecting system 100, the robot 101 can readily and accurately recognize its position within the region 2 based on the colors of two wall surfaces 72AA to 72AD and variation of the saturation of the colors.

Also, in the position detecting system 100, the respective wall surfaces 72AA to 72AD disposed along respective sides of the region 2 is only painted in different colors from each other with varying the saturation in a horizontal direction, so that a system can be built very simply.

Further, since the position detecting system 100 does not use a method of transmitting any special signal such as radio waves, the position detecting system 100 can be used without requiring any consideration on influences on other devices located nearby or the radio wave rules. In addition, since any signal generator is not required on the floor surface of the region, the robot 101 will not be prevented from moving in any direction.

Further, since the position detecting system 100 does not employ symbols, marks, or the like drawn on the floor surface within the action region 2 of the robot 101, the floor surface can be painted for other purposes.

Furthermore, in the position detecting system 100, a wall surface 72AA to 72AD in front of the robot 101 can be shot by the camera 16 of the robot 101 only by directing the camera 16 substantially in the horizontal direction, so that the camera 16 need not to be directed in a predetermined direction for detecting the position of the robot 101 itself within the region 2. Also advantageously, the robot 101 can detect its position within the region 2 while capturing other robots 101 by the camera 16.

According to the foregoing configuration, the respective wall surfaces 72AA to 72AD are painted in different colors from each other with varying the saturation in a horizontal direction, and the robot 101 detects colors of two wall surfaces 72AA to 72AD and saturation Sx of the colors at the center of the image when perpendicularly shooting these wall surfaces 72AA to 72AD, in order to detect its position within the region 2 based on the detection results, the colors and the ID's of the respective wall surfaces 72AA to 72AD stored in the first memory 105, length M of the respective wall surfaces 72AA to 72AD and the saturation Smin and Smax of the colors of one end and the other end of the respective wall surfaces stored in the second memory 106, and the map information stored in the third memory 107, thereby the robot 101 can accurately detect its position within the region 2. Thus, a position detecting system and a robot which can accurately detect its position within the region 2 can be realized.

Figure 22:
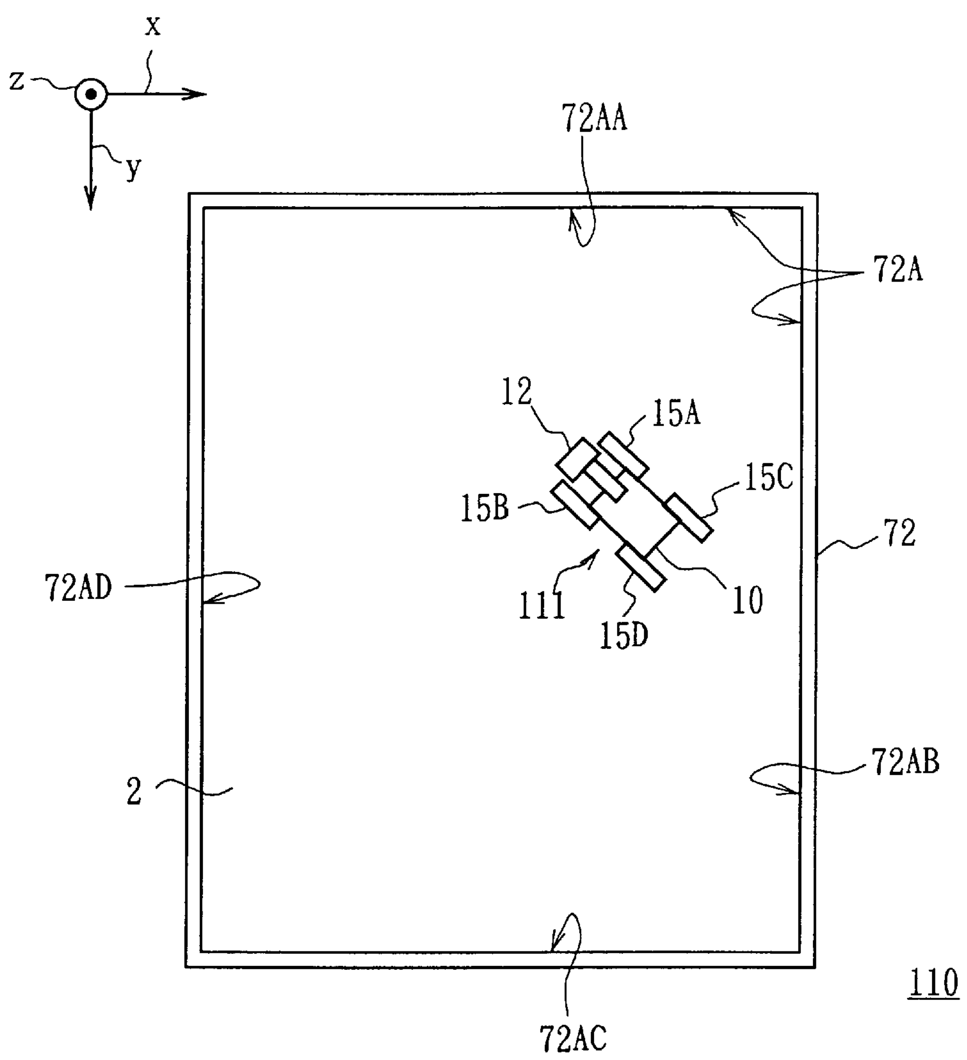
FIG. 22 is a plan view illustrating a whole configuration of a position identifying system according to a sixth embodiment.

(6) SIXTH EMBODIMENT (6-1) Configuration of Position Detecting System According to Sixth Embodiment FIG. 22, in which the same reference numerals are applied to parts corresponding to FIG. 19, illustrates a position detecting system 110 according to a sixth embodiment, where the respective wall surfaces 72AA to 72AD of the wall 72 are painted in individual colors which are different from each other and of which hues are away from each other more than 60° in the HSI space.

In addition, slant line 102 are drawn on the respective wall surfaces 72AA to 72AD using a color of which hue is away from hues of colors painted on the respective wall surface 72AA to 72AD more than 60° in the HSI space, from the vicinity of the lower end of one end to the vicinity of the upper end of the other end.

Figure 24:
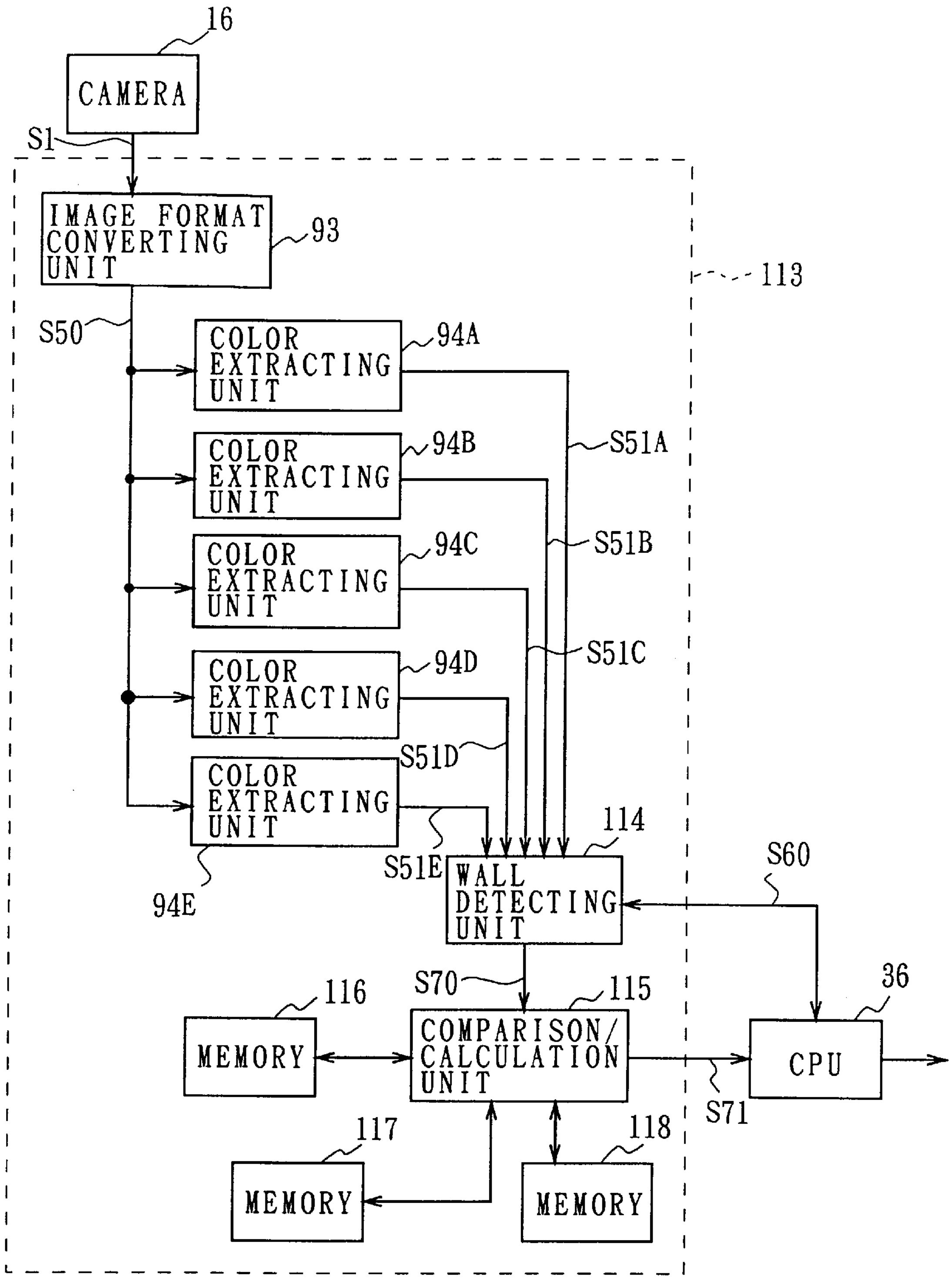
FIG. 24 is a block diagram illustrating the configuration of a position detecting unit according to the sixth embodiment.

On the other hand, a robot 111 is the similar configuration to the robot 91 (FIG. 17) of the fourth embodiment except that a position detecting unit 113 illustrated in FIG. 24, in which the same reference numerals are applied to parts corresponding to FIG. 18, is provided in the robot 91 in place of the position detecting unit 92 (FIG. 18).

In this embodiment, the position detecting unit 113 has a number of color extracting Units 94A to 94E one more than that of the wall surfaces 72AA to 72AD along respective sides of the region 2. The image format converting unit 93 converts an image format of a video signal S1 outputted from the camera 16 into the HSI format to send thus obtained video signal S50 to the respective color extracting units 94A to 94E.

the respective color extracting units 94A to 94E extract pixels of a corresponding predetermined color from an image represented by the video signal S50, and send respective color extraction signals S51A to S51E where portions corresponding to the pixels rises to a logical "1" level and portions corresponding to other pixels falls to a logical "0" level to the wall detecting unit 114. Note that, the respective extracting units 94A to 94E extract different colors from each other out of colors painted on the respective wall surfaces 72AA to 72AD and colors of the slant line 112.

The wall detecting unit 114 superimposes images represented by the color extraction signals S51A to S51E supplied thereto from the respective color extracting units 94A to 94E and scans the resulting image to determine that a horizontal elongated region in a single color is one of the wall surfaces 72AA to 72AD. Then, the wall detecting unit 114 gives the detection result as a wall detection signal S60 to the highest ranked CPU 36 which controls the action of the robot 111.

In this time, the CPU 36 drives actuators of corresponding joint units to move the direction of the camera 16 (i.e., the head of the robot 111) in a right or left direction, and detects a wall surface 72AA to 72AD (i.e., the nearest wall surface) having the most number of pixels within the image represented by the video signal S50 based on the wall detection signal S60 supplied from the wall detecting unit 114 and adjusts the direction of the camera 16 so that the upper end or the lower end of the wall surface 72AA to 72AD within the image is level (i.e., an optical axis of the camera 16 is perpendicular to the nearest wall surface 72AA to 72AD).

In the situation where the optical axis of the camera 16 is perpendicular to the nearest wall surface 72AA to 72AD, the wall detecting unit 114 detects a vertical length Ux above the slant line 112 of the wall surface 72AA to 72AD at the center of the image and a length Lx below the slant line 112 in units of pixels, and then send the detected length Ux above the slant line 112 of the wall surface 72AA to 72AD, the detected length Lx below the slant line 112, and a color of the wall surface 72AA to 72AD to the comparison/calculation unit 115 as a color and length detection signal S70.

The comparison/calculation unit 115 detects the ID of the wall surface 72AA to 72AD based on the color of the wall surface 72AA to 72AD obtained based on the color and length detection signal S70 and a table on the colors and ID's of the respective wall surfaces 72AA to 72AD previously stored in the first memory 116.

Also, the comparison/calculation unit 115 executes the calculation given by the following expression (4):

$$Rx1 = \frac{Ux}{Ux + Lx} \tag{4}$$

based on the length Ux above the slant line 112 of the wall surface 72AA to 72AD and the length Lx below the slant line 112 obtained based on the color and length detection signal S70. Thereby, the comparison/calculation unit 115 obtains a ratio Rx1 of the vertical length Ux above the slant line 112 with respect to the length (Ux+Lx) of the wall surface 72AA to 72AD at the center of the image represented by the video signal S50.

Then, the comparison/calculation unit 115 executes the calculation given by the following expression (5):

$$x = M \times \frac{Rx1 - Ra1}{Rb1 - Ra1} \tag{5}$$

based on the calculation result, the length M of the respective wall surfaces 72AA to 72AD stored in the second memory 117, the ratio Rx1 of the vertical length above the slant line 112 with respect to the length of one end of the respective wall surface 72AA to 72AD, and the ratio Rb1 of the length above the slant line 112 with respect to the length of the other end of the respective wall surfaces 72AA to 72AD. Thereby, the comparison/calculation unit 115 obtains a distance x from one end of the wall surface 72AA to 72AD to the portion shot at the center of the image of the wall surface 72AA to 72AD (the distance corresponds to a distance from one end of the wall surface 72AA to 72Ad to the robot 111 in a direction parallel to the wall surface 72AA to 72AD).

Figure 23:
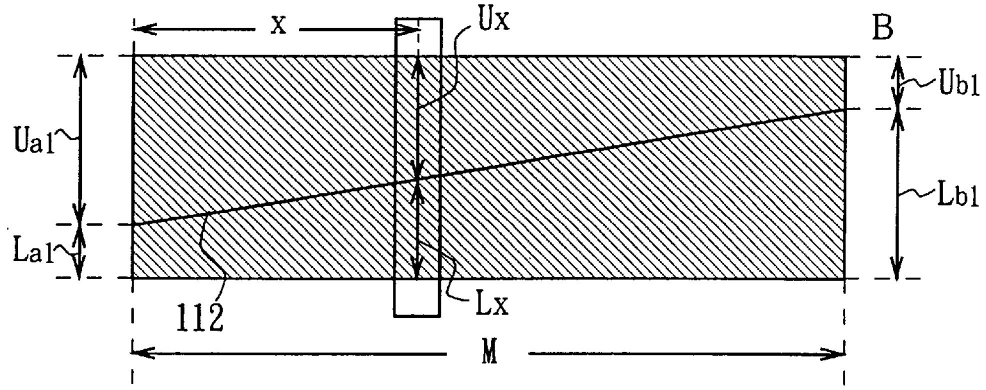
FIG. 23 is a schematic diagram illustrating condition of each wall surface according to the sixth embodiment.

Note that, as shown in FIG. 23, when a length of one end of the wall surface 72AA to 72AD above the slant line 112 is Ua1 and a length below the slant line 112 is La1, the ratio Ra1 of a length above the slant line 112 with respect to the length of one end of the wall surface 72AA to 72AD is obtained by the following expression (6):

$$Ra1 = \frac{Ua1}{Ua1 + La1} \tag{6}$$

Further, when a length of the other end of the wall surface 72AA to 72AD above the slant line 112 is Ub1 and a length below the slant line 112 is Lb1, the ratio Rb1 of a length above the slant line 112 with respect to the length of the other end of the wall surface 72AA to 72AD is obtained by the following expression (7):

$$Ra1 = \frac{Ub1}{Ub1 + Lb1} \tag{7}$$

Further, the camera 16 directs to a wall surface 72AA to 72AD (hereinafter, referred to as a second wall surface 72AA to 72AD) from the wall surface 72AA to 72AD (hereinafter, referred to as a first wall surface 72AA to 72AD) by turning 90° under the control of the CPU 36, and then the comparison/calculation unit 115 executes the same processing described above to detect its position in a direction parallel to the second wall surface 72AA to 72AD.

Further, the comparison/calculation unit 115 detects its position within the region 2 based on the ID of the first wall surface 72AA to 72AD and the position in the direction parallel to the first wall surface 72AA to 72AD, the ID of the second wall surface 72AA to 72AD and the position in the direction parallel to the second wall surface 72AA to 72AD, and the map information of the region including the respective wall surfaces 72AA to 72AD previously stored in the third memory 118, and send the detection result to the CPU 36 as a position detection signal S71.

Thereby, the robot 111 can recognize its position within the region 2 based on the position detection signal S71 by the CPU 36, and can automatically act according to the surrounding situations based on the recognition result.

(6-2) Operation and Effect of Sixth Embodiment

In the aforementioned configuration, in the position detecting system 110, the robot 111 detects the respective colors of the surrounding first and second wall surfaces 72AA to 72AD based on the video signal S1 outputted from the camera 16 and the ratio Rx1 of the length Ux above the slant line 112 with respect to the heights of the respective wall surfaces 72AA to 72AD at the center of the image represented by the video signal S1, in order to detect its position within the region 2 based on these detection results, the colors and the ID's of the respective wall surfaces 72AA to 72AD previously stored in the first memory 116, the length M of the respective wall surfaces 72AA to 72AD and the ratios Ra1 and Rb1 of the length Ua1 and Ub1 above the slant line 112 with respect to the heights of the one and the other ends of the respective wall surfaces 72AA to 72AD previously stored in the second memory 117, and the map information previously stored in the third memory 118.

Accordingly, in the position detecting system 110, the robot 111 can readily and accurately recognize its position within the region 2 based on the colors of two wall surfaces 72AA to 72AD and the slant line 112 drawn on these wall surfaces 72AA to 72AD.

Further, in the position detecting system 110, since the respective wall surfaces 72AA to 72AD disposed along the respective sides of the region 2 are only painted in different colors from each other and drawn the slant line 112, a system can be built simply.

Further, since the position detecting system 110 does not use a method of transmitting any special signal such as radio waves, the position detecting system 110 can be used without requiring any consideration on influences on other devices located nearby or the radio wave rules. In addition, since it is not required to provide a signal generator on the floor surface of the region, the robot 111 will not be prevented from moving in any direction.

Further, since the position detecting system 110 does not employ symbols, marks, or the like drawn on the floor surface within the action region 2 of the robot 111, the floor surface can be painted for other purposes.

Furthermore, in the position detecting system 110, a wall surface 72AA to 72AD in front of the robot 111 can be shot by the camera 16 of the robot 111 only by directing the camera 16 substantially in the horizontal direction, so that the camera 16 need not to be directed in a predetermined direction for detecting the position of the robot 111 itself within the region 2. Also advantageously, the robot 111 can detect its position within the region 2 while capturing the other robot by the camera 16.

According to the aforementioned configuration, the respective wall surfaces 72AA to 72AD are painted in different colors from each other and drawn with the slant line 112, while the robot 111 detects colors of two wall surfaces 72AA to 72AD and detects the respective ratio Rx1 of the vertical length Ux above the slant line 112 at the center of the image when vertically shooting these wall surfaces 72AA to 72AD, in order to detect its position within the region 2 based on the detection results, the colors and the ID's of the respective wall surfaces 72AA to 72AD previously stored in the first memory 116, the length M of the respective wall surfaces 72AA to 72AD and the ratios Ra1 and Rb1 of the length Ua1 and Ub1 above the slant line 112 with respect to the heights of one end and the other end of the respective wall surfaces 72AA to 72AD previously stored in the second memory 117, and the map information previously stored in the third memory 118. Thereby the robot 111 can accurately detect its position within the region 2, thus a position detecting system and a robot which can accurately detect its position within the region 2 can be realized.

Figure 25:
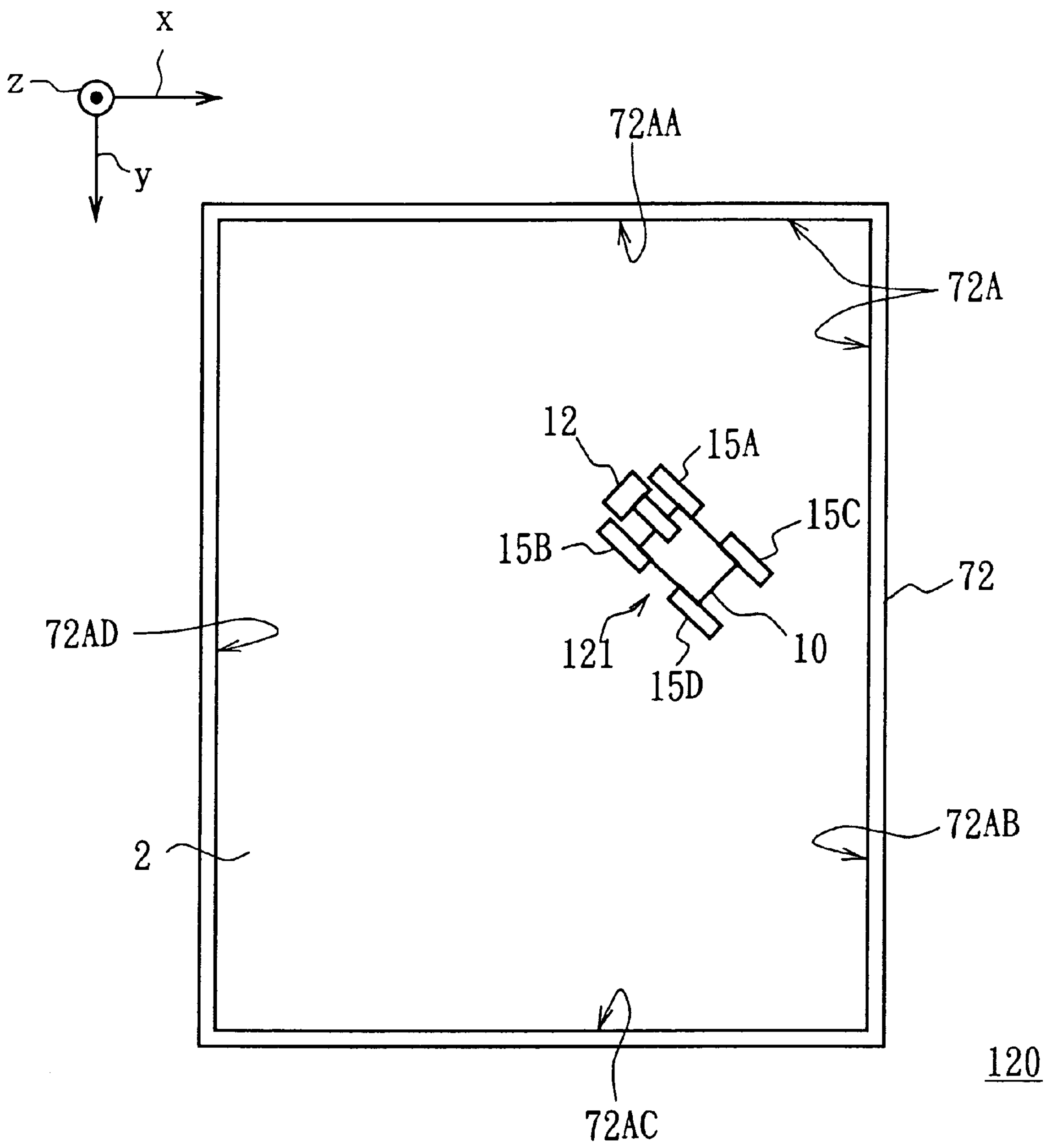
FIG. 25 is a plan view illustrating the whole configuration of a position identifying system according to a seventh embodiment.

(7) SEVENTH EMBODIMENT (7-1) Configuration of Position Detecting System according to Seventh Embodiment FIG. 25, in which the same reference numerals are applied to parts corresponding to FIG. 14, illustrates a position detecting system 120 according to a seventh embodiment, where the respective wall surfaces 72AA to 72AD of the wall 72 are painted in colors having hues which are away from each other more than 60° in the HSI space.

Figure 26:
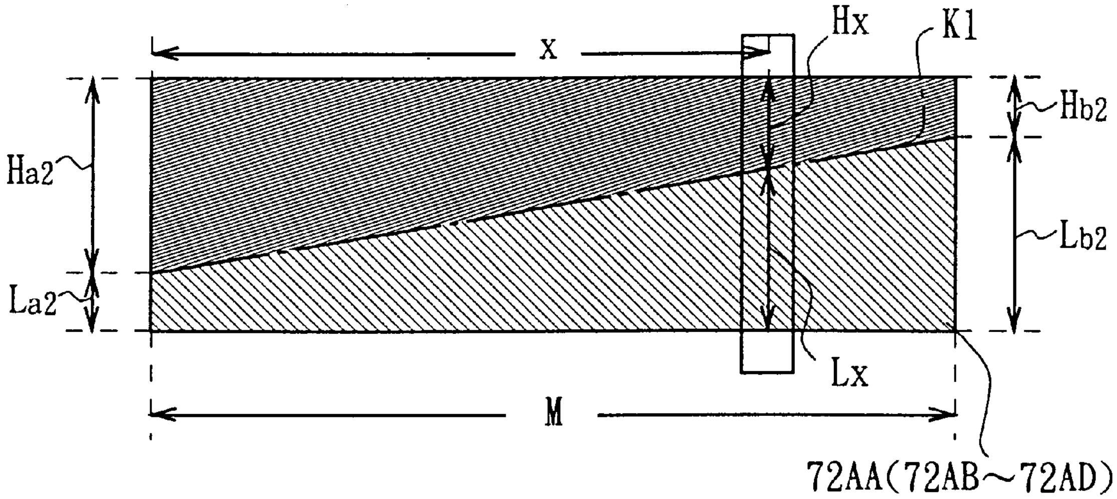
FIG. 26 is a schematic diagram illustrating condition of each wall surface according to the seventh embodiment.

Specifically, as illustrated in FIG. 26, in each of the wall surfaces 72AA to 72AD, as a temporary line K1 being a border which is a line from the vicinity of a lower end of one end in a longitudinal direction to the vicinity of a upper end of the other end in a longitudinal direction, the portion above the temporary line K1 of each of the wall surfaces 72AA to 72AD is painted in a color having a predetermined hue and large saturation, and the portion below the temporary line K1 is painted in a color having the same hue as that of the upper portion and small saturation.

Figure 27:
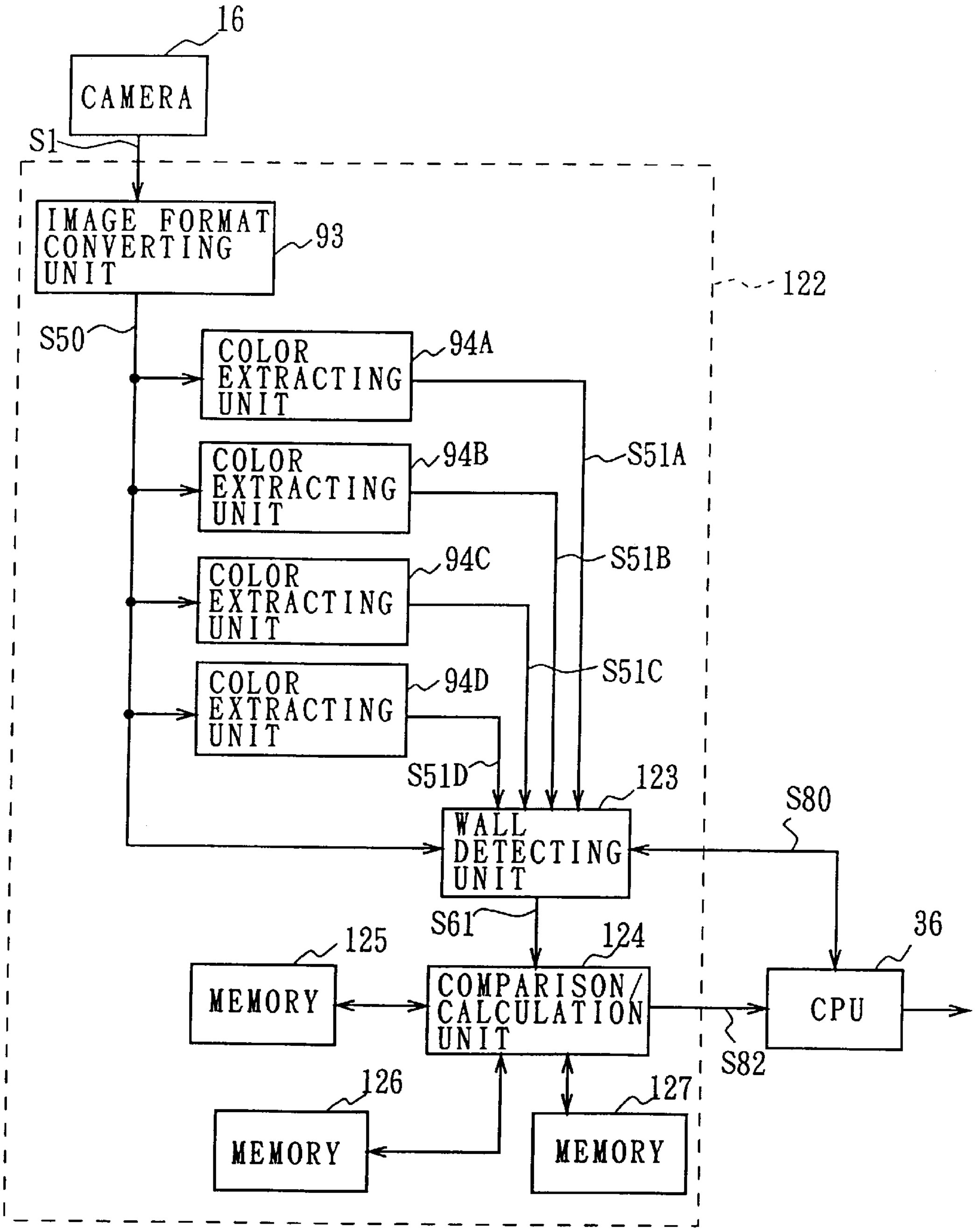
FIG. 27 is a block diagram illustrating the configuration of a position detecting unit according to the seventh embodiment.

On the other hand, the robot 121 has the similar construction to the robot 91 (FIG. 17) of the fourth embodiment expect that a position detecting unit 122 shown in FIG. 27, where the same reference numerals are applied to parts corresponding to FIG. 18, is provided in the robot 91 in place of the position detecting unit 92 (FIG. 18).

In this embodiment, the position detecting unit 122 has as many color extracting units 94A to 94D as the wall surfaces 72AA to 72AD along respective sides of the region 2. The image format converting unit 93 converts an image format of a video signal S1 outputted from the camera 16 into the HSI format, and respectively sends thus obtained video signal S50 to the respective color extracting unit 94A to 94D and the wall detecting unit 123.

The respective color extracting unit 94A to 94D, as described above, detects pixels having hues within a predetermined angle from a designated hue in the polar coordinates shown in FIG. 16B as pixels to be extracted based on hue information on each pixel included in the video signal S50, and generates color extraction signals S51A to S51D in which portions corresponding to pixels of a color to be extracted rises to a logical "1" level and portions corresponding to pixels of other colors falls to a logical "0" level based on the detection results, in order to send theses signals to the wall detecting unit 123.

Further, the wall detecting unit 123 superimposes images represented by the color extraction signals S51A to S51D supplied thereto from the respective color extracting unit 94A to 94D and scans the resulting image to determine that a horizontal elongated region in a single color is one of the wall surfaces 72AA to 72AD, and then gives the detection result as a wall detection signal S80 to the highest ranked CPU 36 which controls the action of the robot 121.

In this time, the CPU 36 drives actuators of corresponding joint units to change the direction of the camera 16 (i.e., the head unit of the robot) in a right or left direction. And, the CPU 36 detects a wall surface 72AA to 72AD (the nearest wall surface) having most number of pixels within an images represented by the video signal S50 based on the wall detection signal S80 supplied from the wall detecting unit 123 and adjusts the direction of the camera 16 so that the upper end or lower end of the wall surface 72AA to 72AD within the image are level (that is, an optical axis of the camera 16 is perpendicular to the wall surface 72AA to 72AD).

In the state where the optical axis of the camera 16 is perpendicular to the nearest wall surface 72AA to 72AD, the wall detecting unit 123 detects a vertical length Hx (FIG. 26) of a portion (that is, the portion above the temporary line K1, and hereinafter, referred to as a high saturation portion of the wall surface 72AA to 72AD) of the wall surface 72AA to 72AD painted in a color having large saturation at the center of the image represented by the video signal S50 and a vertical length Lx (FIG. 26) of a portion (i.e., the portion below the temporary line K1, and hereinafter, referred to as a low saturation portion of the wall surface 72AA to 72AD) of the wall surface 72AA to 72AD painted in a color having small saturation at the center of the image respectively in units of pixels, based on the color extraction signals S51A to S51D supplied from the respective extraction units 94A to 94D and saturation information on each pixel included in the video signal S50 supplied from the image format converting unit 93. Then the wall detecting unit 123 sends thus detected length Hx of the high saturation portion of the wall surface 72AA to 72AD, thus detected length Lx of the low saturation portion of the wall surface 72AA to 72AD, and a hue of the wall surface 72AA to 72AD to the comparison/calculation unit 124 as a wall surface detection signal S81.

The comparison/calculation unit 124 detects the ID of the wall surface 72AA to 72AD based on the hue of the wall surface 72AA to 72AD obtained based on the wall surface detection signal S81 and the table on the hues and the ID's of the respective wall surfaces 72AA to 72AD previously stored in the first memory 125.

Also, the comparison/calculation unit 124 executes the calculation given by the following expression (8):

$$Rx2 = \frac{Hx}{Hx + Lx} \quad (8)$$

based on length Hx and Lx of the high saturation portion and the low saturation portion of the wall surface 72AA to 72AD at the center of the image represented by the wall surface detection signal S81. Then, the comparison/calculation unit 124 executes the calculation given by the following expression (9):

$$x = \frac{(Rx2 - Ra2) \times M}{Rb2 - Ra2} \quad (9)$$

based on the calculated ratio Rx2 of the vertical length of the high saturation portion with respect to the height of the wall surface at the center of the image, and the ratio Ra2 of length of the high saturation portion with respect to the height of the wall surface 72AA to 72AD at one end of the respective wall surfaces 72AA to 72AD, the ratio Rb2 of length of the high saturation portion with respect to the height of the wall surface 72AA to 72AD at the other end of the respective surfaces 72AA to 72AD, and the length M of the respective wall surfaces 72AA to 72AD previously stored in the second memory 126. Thereby, the comparison/calculation unit 124 calculates a distance x (the distance corresponds to a distance from one end of the wall surface 72AA to 72AD to the robot 121 in a direction parallel to the wall surface 72AA to 72AD) from one end of the wall surface 72AA to 72AD to the portion shot at the center of the image of the wall surface 72AA to 72AD.

Note that, the ratio Ra2 of the vertical length of the high saturation portion with respect to the height of the wall surface 72AA to 72AD at one end of each wall surface 72AA to 72AD is obtained by the following expression (10):

$$Ra2 = \frac{Ha2}{Ha2 + La2} \quad (10)$$

assuming that the length of the high saturation portion is Ha2 and the length of the portion having low degree of saturation is La2 at one end of the wall surface 72AA to 72AD as shown in FIG. 26. Further, the ratio Rb2 of length of the high saturation portion with respect the height of the wall surface 72AA to 72AD at the other end of each wall surface 72AA to 72AD is obtained by the following equation (11):

$$Rb2 = \frac{Hb2}{Hb2 + Lb2} \quad (11)$$

assuming that length of the high saturation portion is Hb2 and length of low saturation portion is Lb2 at the other end of the wall surface 72AA to 72AD.

Further, the camera 16 directs toward to a wall surface 72AA to 72AD (hereinafter, referred to as a second wall surface 72AA to 72AD) different from the wall surface 72AA to 72AD (hereinafter, referred to as a first wall surface 72AA to 72AD) by turning 90° under the control of the CPU 36, and then the comparison/calculation unit 124 executes the same processing described above to detect the,ID of the second wall surface 72AA to 72AD and its position in a direction parallel to the second wall surface 72AA to 72AD.

Further, the comparison/calculation unit 124 detects its position within the region 2 based on the ID of the first wall surface 72AA to 72AD and the position in the direction parallel to the first wall surface 72AA to 72AD, the ID of the second wall surface 72AA to 72AD and the position in the direction parallel to the second wall surface 72AA to 72AD, and the map information of the region including positions of the respective wall surfaces 72AA to 72AD previously stored in the third memory 127, and send the detection result to the CPU 36 as a position detection signal S82.

Thereby, the robot 121 can recognize its position within the region 2 based on the position detection signal S82 by the CPU 36, and can automatically act according to the surrounding situations based on the recognition result.

(7-2) Operation and Effect of Seventh Embodiment

According to the aforementioned configuration, in the position detecting system 120, the robot 121 detects colors of surrounding first and second wall surfaces 72AA to 72AD based on the video signal S1 outputted from the camera 16, and the ratio Rx2 of the length Hx of the high saturation portion with respect to the heights of the respective wall surfaces 72AA to 72AD at the center of the image represented by the video signal S1, in order to detect its position within the region 2 based on these detection results, the colors and the ID's of the respective wall surfaces 72AA to 72AD stored in the first memory 125, the length M of the respective wall surfaces 72AA to 72AD and the ratios Ra2 and Rb2 of length Ha2 and Hb2 of the high saturation portions with respect to the heights of the wall surface 72AA to 72AD at one end and the other end of the respective wall surfaces 72AA to 72AD stored in the second memory 126, and the map information stored in the third memory 127.

Accordingly, in the position detecting system 120, the robot 121 can readily and accurately recognize its position within the region 2 based on the hues of two wall surfaces 72AA to 72AD and the high saturation portions of these wall surfaces 72AA to 72AD.

Further, in the position detecting system 120, since the respective wall surfaces 72AA to 72AD disposed along the respective sides of the region 2 are only painted in two colors which are different hues from each other and are great different saturation from each other with a predetermined pattern, a system can be built very simply.

Further, since the position detecting system 120 does not use a method of transmitting any special signal such as radio waves, the position detecting system 120 can be used without any consideration on influences on other devices located nearby or the radio wave rules. In addition, since it is not required to provide any signal generator on the floor surface of the region, the robot 121 will not be prevented from moving in any direction.

Further, since the position detecting system 120 does not employ symbols, marks, or the like drawn on the floor surface within the action region 2 of the robot 121, the floor surface can be painted for other purposes.

Furthermore, in the position detecting system 120, a wall surface 72AA to 72AD in front of the robot 121 can be shot by the camera 16 of the robot 121 only by directing the camera 16 substantially in the horizontal direction, so that the camera 16 need not to be directed in a predetermined direction for detecting the position of the robot 121 itself within the region 2. Also advantageously, the robot 121 can detect its position within the region 2 while capturing other robots by the camera 16.

According to the aforementioned configuration, different hues from each other are used for the respective wall surfaces 7AA to 72AD and the respective wall surfaces 72AA to 72AD are painted in two color which are the same hue and are different saturation from each other with a predetermined pattern. The robot 121 detects hues of two wall surfaces 72AA to 72AD and the vertical length Hx of the high saturation portion with respect to the height of the wall surface 72AA to 72AD at the center of the image when vertically shooting the wall surfaces 72AA to 72AD by the camera 16, in order to detect its position within the region 2 based on these detection results, the colors and ID's of the respective wall surfaces 72AA to 72AD stored in the first memory 125, the length H of the respective wall surfaces 72AA to 72AD and the ratios Ra2 and. Rb2 of the length Ha2 and Hb2 of the high saturation portion with respect to heights of the wall surfaces 72AA to 72AD at one end and the other end of the respective wall surfaces 72AA to 72AD stored in the second memory 126, and the map information stored in the third memory 127. Thereby, the robot 121 can accurately detect its position within the region 2, thereby a position detecting system and a robot can accurately detect its position within the region 2 can be realized.

(8) EIGHTH EMBODIMENT

Figure 28:
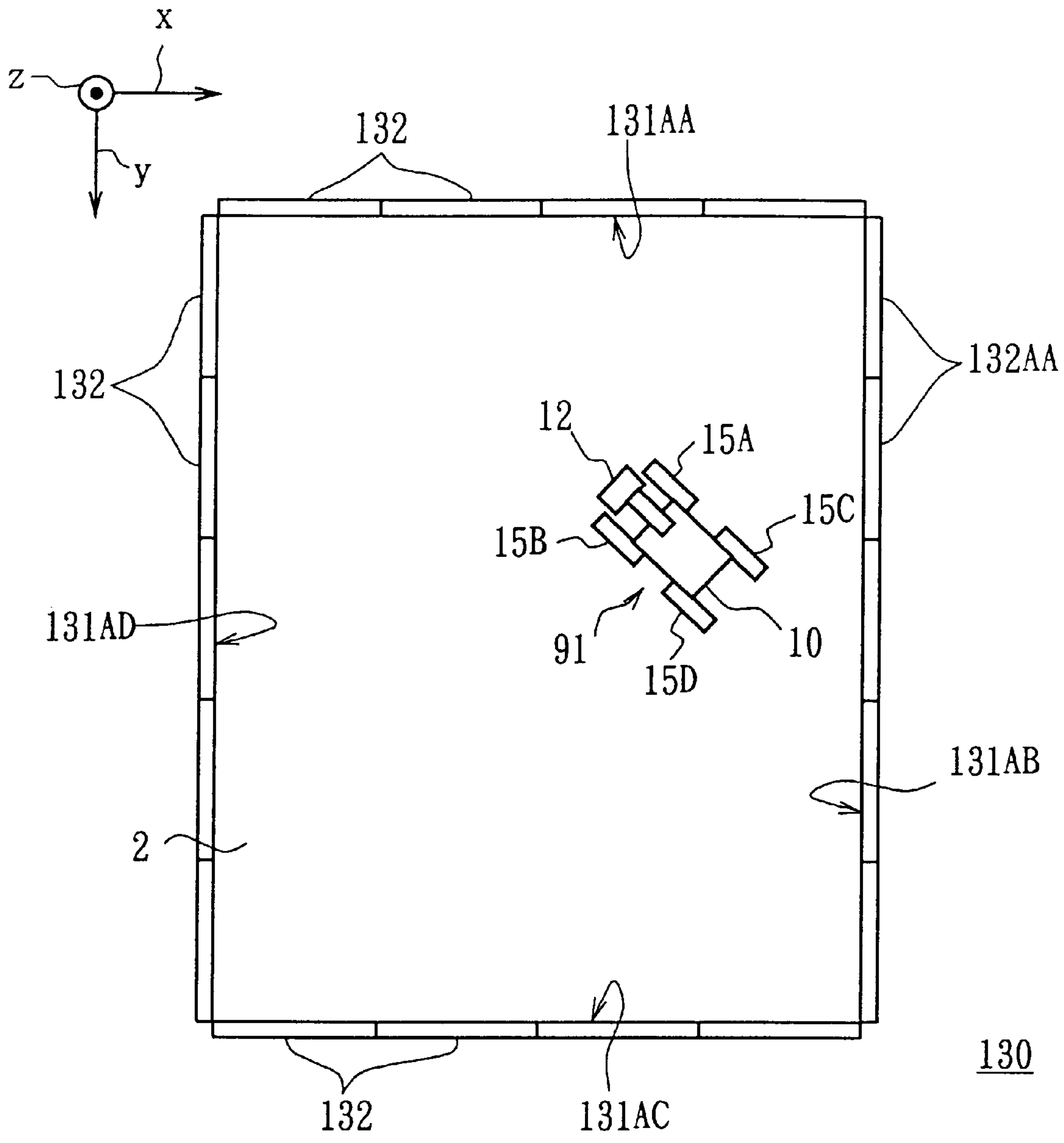
FIG. 28 is a plan view illustrating the whole configuration of a position identifying system according to an eighth embodiment.

(8-1) Configuration of Position Detecting System According to Eighth Embodiment FIG. 28, in which the same reference numerals are applied to parts corresponding to FIG. 17, illustrates a position detecting system 130 according to an eighth embodiment, which has the similar construction to the position detecting system 90 (FIG. 17) of the forth embodiment except that respective wall surfaces 131AA to 131AD disposed along respective sides of the region 2 are made of panel planes of a plurality of liquid crystal panels 132.

Figure 29:
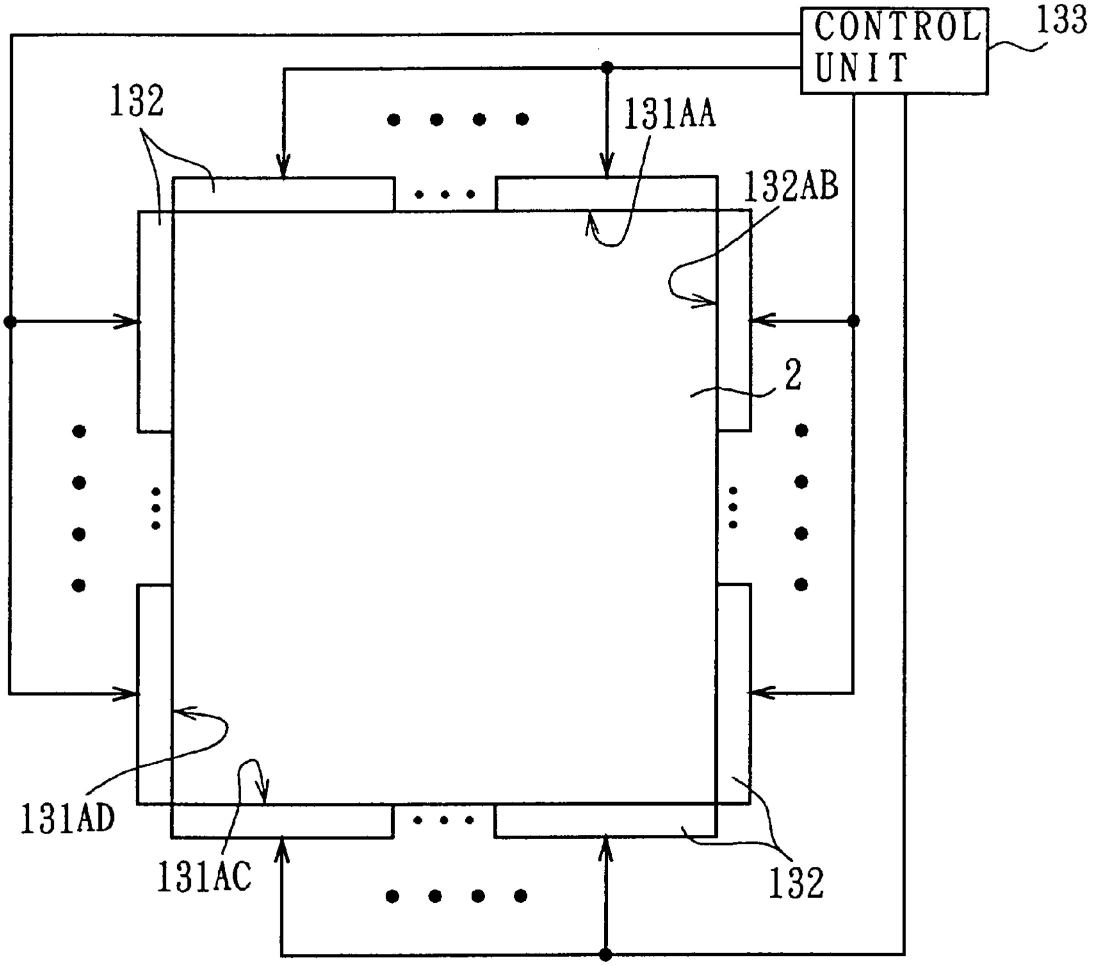
FIG. 29 is a plan view describing the configuration of the position identifying system according to the eighth embodiment.

In this embodiment, as shown in FIG. 29, the liquid crystal panels 132 are controlled by the control unit 133 so that the liquid crystal panels 132 along the same side of the region 2 emit lights having the same color, and the liquid crystal panels 132 along different sides of the region 2 emit lights having different colors from each other of which hues are away from each other more than 60° in the HSI space, toward the inside of the region 2.

Accordingly, in the position detecting system 130, the robot 91 can readily recognize the wall surfaces 131AA to 131AD based on the colors of the respective wall surfaces 131AA to 131AD in similarly to the position detecting system 90 (FIG. 17) of the fourth embodiment.

(8-2) Operation and Effect of Eighth Embodiment

According to the aforementioned configuration, in the position detecting system 130, as described above in FIG. 18, the robot 91 detects the colors of the surrounding first and second wall surfaces 131AA to 131AD and the heights of the first and second wall surfaces 131AA to 131AD within the image represented by the video signal S1, on the basis of the video signal S1 outputted from the camera 16, in order to detect its position within the region 2 based on the detection results, the colors and ID's of the respective wall surfaces 131AA to 131AD previously stored in the first memory 83, the reference value Hstd previously stored in the second memory 84, and the map information previously stored in the third memory 85.

Accordingly, the position detecting system 130 can obtain the same operation effects as the position detecting system 90 (FIG. 17) of the fourth embodiment.

In addition, since the respective wall surfaces 131AA to 131AD emit predetermined lights by itself, the position detecting system 130 makes it possible to hardly receive the influence of external environment such as illuminations when color identification within the robot 91 as compared with the case of utilizing the reflection of light at the respective wall surfaces 72AA to 72AD as described in the fourth embodiment.

Further, since the respective wall surfaces 131AA to 131AD are made of panel surfaces of the liquid crystal panels 132, the position detecting system 130 has an advantage that the colors. of the respective wall surfaces 131AA to 131AD are freely changed in accordance with the type or the operation contents of the robot 91.

According to the aforementioned configuration, as compared with the position detecting system 90 (FIG. 17) of the fourth embodiment, the respective wall surfaces 131AA to 131AD along respective sides of the region 2 are made of panel planes of a plurality of liquid crystal panels 132 and the liquid crystal panels 132 is controlled so as to emit lights toward the inside of the region 2; the liquid crystal panels along the same side of the region 2 emits lights having the same color and the liquid crystal panels along different sides of the region 2 from each other emit lights having different colors from each other of which hues are away from each other more than 60° in the HSI space. Thereby, the system is hard to receive the affection of change of external environment when color identification within the robot 91, thus a position detecting system and a robot which can accurately detect its position within the region 2 can be realized.

(4) OTHER EMBODIMENTS

Note that, while in the first to eighth embodiments, the present invention is applied to the autonomously mobile robots 3A to 3C, 51A to 51C, 71, 91, 101, 111, 121, however, the present invention is not limited thereto and the present invention can be applied to a variety of other robots or other moving objects.

Figure 30:
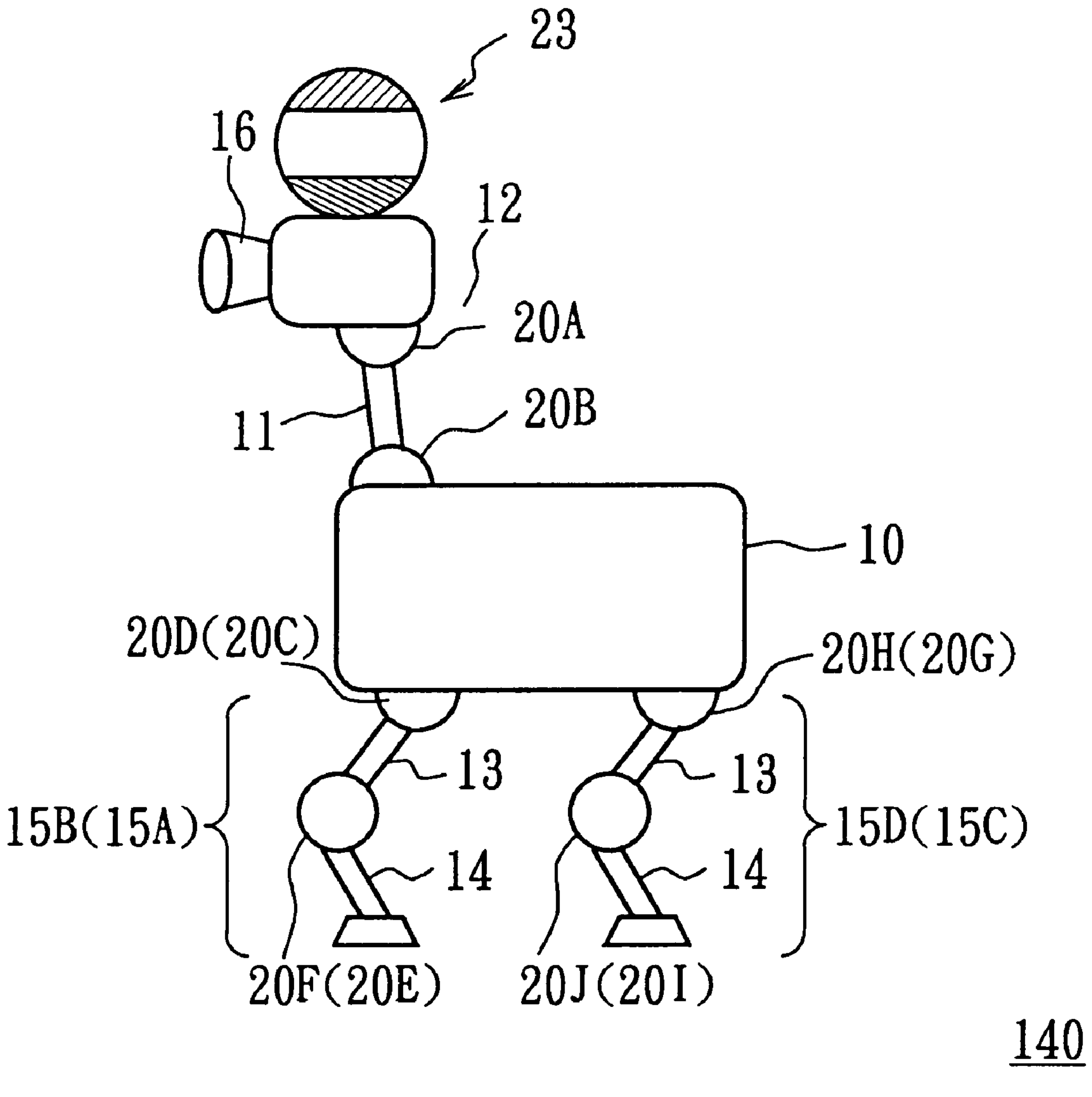
FIG. 30 is a schematic side view illustrating another embodiment.

Also, while in the aforementioned first embodiment, the identifiers 23 are attached on the respective robots 3A to 3C by the supporting rods 22 as illustrated in FIG. 2A. The present invention, however, is not limited thereto and the identifier 23 can be positioned on the head unit 12 of the robot 140, for example, as illustrated in FIG. 30. In essence, a variety of other positions can be applied as the position for attaching the identifier 23 as long as the identifier 23 is attached at a position on the robot 3A to 3C which is readily viewable from the other robots 3A to 3C.

Figure 31A:
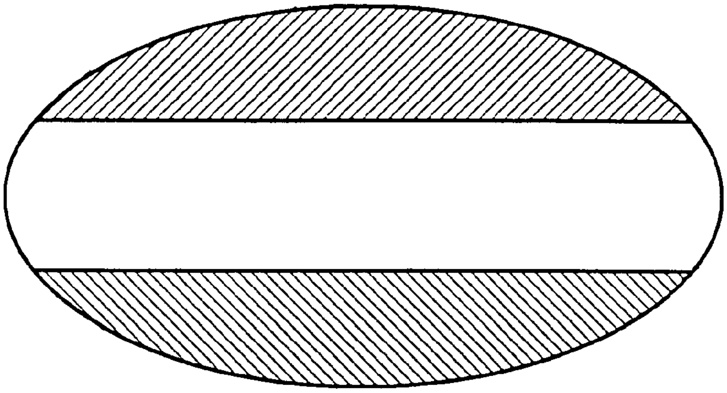
FIGS. 31A and 31B are a side view and a perspective view illustrating another embodiment.
Figure 31B:
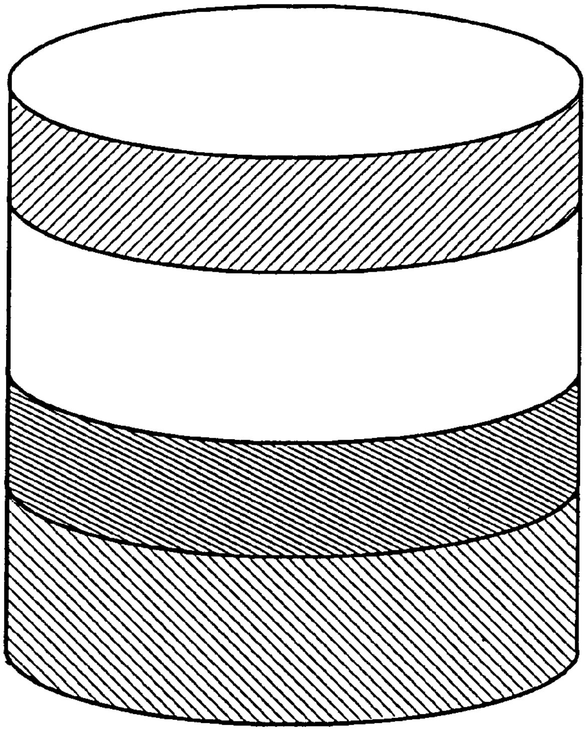

Further, while in the first embodiment, the identifier 23 is formed in a spherical shape, however, the present invention is not limited thereto and a variety of other shapes such as a spheroidal shape illustrated in FIG. 31A or a cylindrical shape illustrated in FIG. 31B can be applied to the identifier 23. It should be noted however that when the shape of the identifier 23 is selected to be a body of rotation having the center axis perpendicular to a moving direction of the robots 3A to 3C, with its surface divided into a plurality of strip regions, extending in parallel with the moving direction of the robots 3A to 3C, each of which is painted in a predetermined color to form a predetermined color pattern, the identifier can be viewed as an object having the same shape and the same color pattern from any direction when the region 2 is flat, so that the identifier can be more readily identified.

Further, while in the first embodiment, the identifier 23 having the surface divided into three color regions, however, the present invention is not limited thereto and the surface of the identifier 23 can be divided into any other number of different color regions. In addition, while in the first embodiment, sixteen colors are prepared as the colors for identifying, however, the present invention is not limited thereto and any other number of identifying colors can be used.

Further, while in the first embodiment, the camera 16 is used as a shooting means for shooting the identifiers 23 having different color patterns from each other, attached on the other robots 3A to 3C, however, the present invention is not limited thereto any of various other shooting means can be replaced with the camera.

Further, while in the first embodiment, a color pattern detecting means for detecting a color pattern of an identifier 23 shot by the camera 16 based on image information (video signal S1) supplied from the camera 16 is composed of a plurality of the color extracting units 31A to 31U illustrated in FIG. 6 and the color pattern detecting unit 32. However, the present invention is not limited thereto and a variety of other configurations can be applied.

Further, while in the first embodiment, an identifying means is composed of the comparison/calculation unit 33 and the first memory 34 for identifying robots 3A to 3C respectively having an identifier 23 shot by the camera 16 based on a color pattern of the identifier 23 detected by the color pattern detecting unit 32 and the previously stored color pattern information on the identifiers 23 of the respective robots 3A to 3C. However, the present invention is not limited thereto and a variety of other configurations can be applied. In this case, a variety of other storage means can be used in place of the first memory 34.

Further, while in the first embodiment, a size detecting means is composed of a plurality of the color extracting units 31A to 31U and the color pattern detecting unit 32 for detecting the diameter of the identifier 23 (alternatively, any other part of the identifier 23 can be detected) within the image represented by the video signal S1 supplied from the camera 16. However, the present invention is not limited thereto and a variety of other configurations can be applied.

Further, while in the first embodiment, a calculating means is composed of the comparison/calculation unit 33 and the second memory 35 for calculating the distance L1 from the camera 16 to the identifier 23 based on the size of the identifier 23 detected by the color pattern detecting unit 32 and a previously stored reference value. However, the present invention is not limited thereto and a variety of other configuration can be applied. In this case, a variety of other storage means can be used in place of the second memory 35.

Further, while in the first embodiment, the reference value for calculating the distance L1 from the camera 16 to the identifier 23 is selected to be the diameter of the identifier 23 in units of pixels measured when the camera 16 is located one meter away from the identifier 23. However, the present invention is not limited thereto and any of various other values can be applied to the reference value.

Further, in the aforementioned first embodiment, the respective identifiers 23 are painted in a plurality of colors with an individual color pattern. However, the present invention is not limited thereto and color patterns of the respective identifiers 23 can be combined with a plurality of colors which are away from each other by a predetermined first distance in a predetermined color space (for example, the HSI space described using FIG. 16, an RGB space in which a color is represented by the respective levels of red, green, and blue, and a YUV space in which a color is represented by a luminance level, and first and second color difference levels) (i.e., colors which are away from each other by a first distance in a predetermined color space can be used as colors for identification).

In this case, in the individual identifying unit 30 of the respective robot 3A to 3C, a converting means (i.e., the image format converting unit 93 of fourth embodiment) for converting the video signal S1 supplied form the camera 16 into a video signal of an image format according to the color space, and a plurality of color extracting means (i.e., color extracting units 94A to 94D of fourth embodiment) for respectively extracting pixels having designated colors different from each other from an image represented by a video signal outputted from the converting means can be provided in place of the color extracting units 31A to 31U, so that the color pattern detecting means composed of the converting means, the plurality of color extracting means, and the color pattern detecting unit 32 (FIG. 4) can detect a color pattern of the identifier 23 shot by the camera 16. Thereby, the robots 3A to 3D can previously prevent the error judgement of a color painted on the identifier 23, thus an individual identifying system and a robot which can accurately identify the robots 3A to 3C can be realized. Note that, in this case, in the case where an image format of the video signal S1 outputted from the camera 16 corresponds to the aforementioned color space, the converting means can be omitted.

Further, in this case, colors painted on the identifiers 23 can be selected so that adjacent colors are away from each other by a second distance longer than the first distance in the aforementioned color space. Thereby, an individual identifying system and a robot which can accurately recognize the robot 3A to 3C can be realized.

Further, while in the aforementioned first embodiment, the identifiers 23 do not emit light, however, the present invention is not limited thereto and the identifier 23 can contain emitting means such as a light bulb inside transparent bulb and the identifier 23 can emit light having the corresponding color pattern by painting the surface of the bulb in the corresponding color pattern. Thereby, occurrence of error identification of color by identifying means can be decreased, thus an individual identifying system and a robot which can accurately recognize the robots 3A to 3C can be realized.

Figure 32:
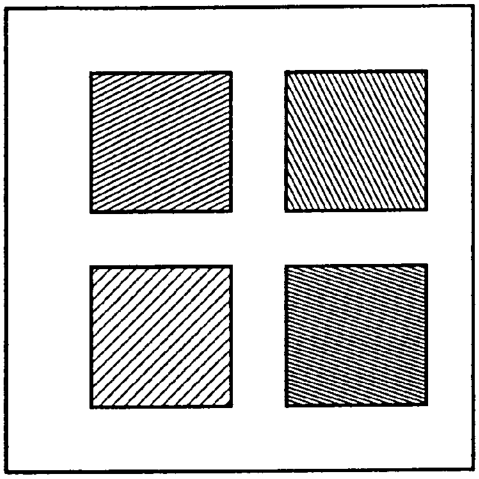
FIGS. 32 to 36 are plan views illustrating another embodiment.

Further, while in the aforementioned second embodiment, the identification seal 52 has a color pattern, as illustrated in FIG. 10, by dividing the surface thereof into a plurality of strip regions filled with different colors from each other. However, the present invention is not limited thereto and the surface of the identification seal 52 can be patterned as illustrated in FIG. 32. In essence, a variety of other shapes can be applied to the color pattern of the identification seal 52 as long as the surface of the identification seal 52 is patterned with a plurality of colors.

Figure 33:
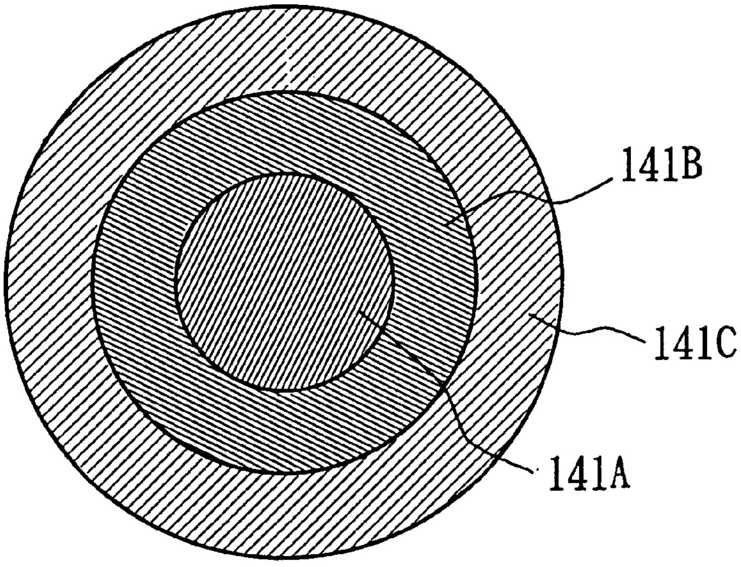

In this case, for example, as illustrated in FIG. 33, a a predetermined number of colors can be selected from a plurality of identifying colors to fill a plurality of concentric annular regions 141A to 141C to form a color pattern.

Figure 34A:
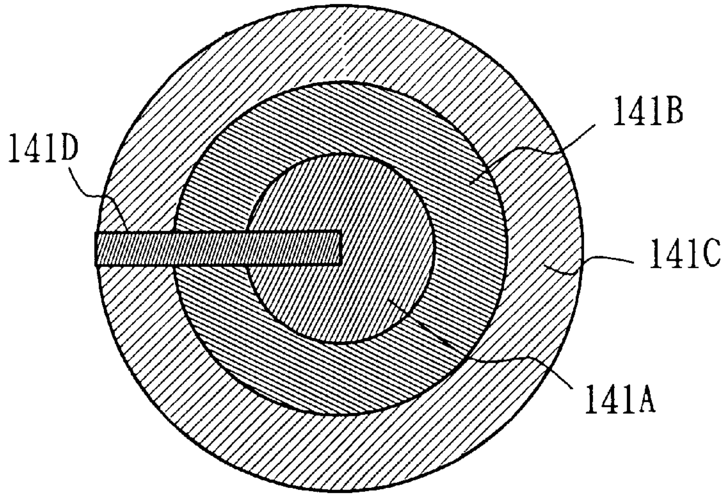
Figure 34B:
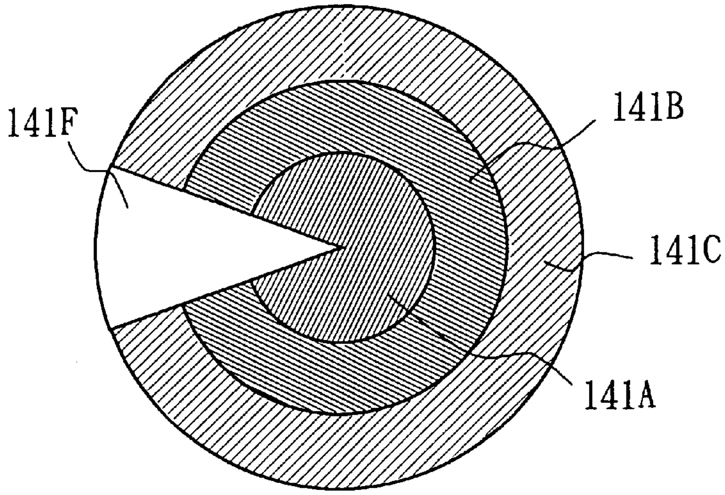
Figure 34C:
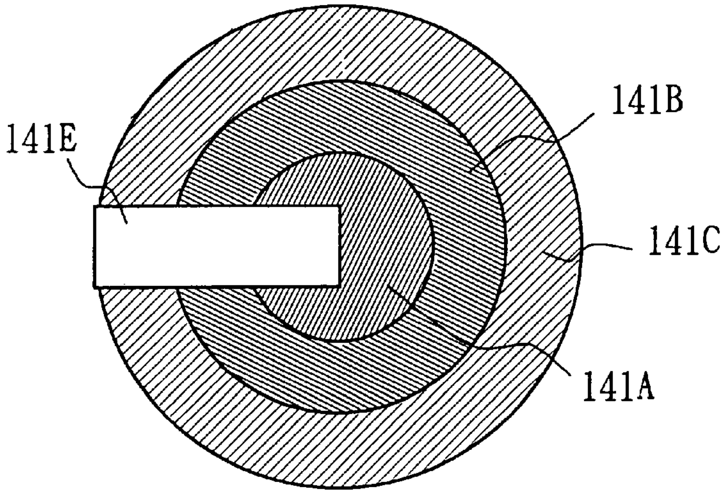

In addition, a linear region 141D extending in a predetermined direction across the respective regions 141A to 141C and filled with a predetermined color, or another region such as a blank rectangular region 141E or a blank sector region 141F can be provided, as illustrated in FIGS. 34A to 34C. In this case, if it is previously set such that a region in a predetermined shape such as the linear region 141D, the rectangular region 141E, or the sector region 141F is directed toward a forward direction, a backward direction, or the like of the robots 51A to 51C, the direction of each robot 51A to 51C can also be detected on the basis of the direction of the region.

Further, while in the second embodiment, color patterns different from each other are attached to the respective robots 51A to 51C which is implemented by the identification seal 52 having the surface patterned by a combination of predetermined colors. However, the present invention is not limited thereto and the respective robots 51A to 51C can be provided with predetermined color patterns different from each other, for example, by directly painting a portion on the upper surfaces of the robots 51A to 51C (or any other predetermined positions which can be shot by the camera 53). In addition, a variety of other methods can be applied to the means for giving color patterns different from each other to the respective robots 51A to 51C.

In this case, emitting means for emitting light having color patterns different from each other can be provided in each robot 51A to 51C (i.e., an emitting object such as a light bulb is provided under a transparent film and the transparent film is painted in a corresponding color pattern). Thereby, occurrence of error identification of color by the identifying means can be decreased, thus an individual identifying system and a robot which can accurately recognize the robots 3A to 3C can be realized.

Further, while in the second embodiment, a position detecting means composed of the comparison/calculation unit 56 and the memory 57 for detecting the positions of the respective robots 51A to 51C within the region 2 based on the positions of color patterns of the respective robots 51A to 51C within an image represented by image information (video signal S1) supplied from the camera 53. However, the present invention is not limited thereto and a variety of other configurations can be applied. In this case, a variety of other storage means can be used in place of the memory 57.

Further, while in the second embodiment, information on the positions of the respective robots 51A to 51C detected by the individual identifying unit 54 is transmitted to the respective robots 51A to 51C through electric waves, however, the present invention is not limited thereto and a variety of other transmitting means including wireless means such as infrared rays or the like, a wired means, and so on can be applied.

Further, in the aforementioned second embodiment, each identifying seal 52 is painted in a plurality of colors with a individual color pattern. However, the present invention is not limited thereto and the color pattern of the identifying seal 52 can be combined with a plurality of colors which are away from each other by a predetermined first distance in a predetermined color space (for example, the HSI space, RGB space, or YUV space) (for example, colors which are away from each other by the first distance in a predetermined color space is used as colors for identification).

In this case, in the individual identifying unit 54, a converting means (i.e., image format converting unit 93 of fourth embodiment) for converting the video signal S30 supplied form the camera 16 into a video signal of an image format according to the color space, and a plurality of color extracting means (i.e., color extracting units 94A to 94D.of fourth embodiment) for respectively extracting pixels having designated colors different from each other from an image represented by the video signal outputted from the converting means can be provided in place of the color extracting units 31A to 31U, so that the color pattern detecting means composed of the converting means, the plurality of color extracting means, and the color pattern detecting unit 55 (FIG. 11) can detect a color pattern of an identifying seals 52 shot by the camera 53. Thereby, the identifying unit 54 can previously prevent the error judgement of a color painted on the identifying seal 52, thus an individual identifying system which can accurately identify the robots 3A to 3C can be realized. Note that, in this case, in the case where an image format of the video signal S1 outputted from the camera 16 corresponds to the aforementioned color space, g the converting means can be omitted.

Further, in this case, colors painted on the identifying seal 52 can be selected so that adjacent colors are away from each other by the second distance longer than the first distance in the aforementioned color space. Thereby, an individual identifying system which can accurately recognize the robots 3A to 3C can be realized.

Further, while in the aforementioned third embodiment, the wall surfaces 72AA to 72AD along the respective sides of the region 2 which are painted in different colors from each other, however, the present invention is not limited thereto and the wall surfaces 72AA to 72AD along the respective sides of the region 2 can be divided into a plurality of regions parallel to the Z-direction and thus divided regions can be painted in different colors from each other.

Further, while in the aforementioned first to third embodiments, the color extracting units 31A to 31U each configured as illustrated in FIG. 6, however, the present invention is not limited thereto and a variety of other configurations can be applied as long as the color extracting unit is provided with a separating means for separating a supplied video signal into a luminance signal and color difference signals (the separating circuit 41 in the embodiments), a level detecting means for sequentially detecting a luminance level and color difference levels of each pixel within an image represented by the video signal, based on the luminance signal and the color difference signals (the analog/digital converting circuits 42, 43A, 43B in the embodiments), and a determining means for determining whether or not each pixel has a predetermined color based on the luminance level and the color difference levels detected by the level detecting means and previously stored upper limit values and lower limit values of the color difference levels for each luminance level (the first to fourth memories 44A to 44D, the first to fourth comparing circuits 45A to 45D, and the determining circuit 48 in the embodiments).

Further, while in the aforementioned third to eighth embodiment, the camera 16 is applied as a shooting means for shooting corresponding predetermined wall surface 72AA to 72AD, 131AA to 131AD (i.e., front wall surface 72AA to 72AD, 131AA to 131AD) out of a plurality of wall surfaces 72AA to 72AD which are along respective sides of the region 2 and painted in different colors from each other, however, the present invention is not limited thereto and a variety of shooting means can be applied.

Further, while in the aforementioned third to eighth embodiments, a color and relative position detecting means is composed of the plurality of color extracting units 31A to 31D, 94A to 94E, the wall detecting unit 8, 103, 114, 123, the comparison/calculation unit 82, 104, 115, 124, and first and second memories 83, 84, 105, 106, 116, 117, 125, 126 for detecting a color of a wall surface 72AA to 72AD, 131AA to 131AD shot by the camera 16 and a relative position (a distance L2 from the wall surface 72AA to 72AD or a distance x from one end of the wall surface 72AA to 72AD, 131AA to 131AD in a direction parallel to the wall surface 72AA to 72AD, 131AA to 131AD) with respect to the wall surface 72AA to 72AD based on image information (video signal S1) outputted from the camera 16. However, the present invention is not limited thereto and a variety of configurations can be applied. In this case, a variety of storage means can be applied in place of the first and second memories 83, 84, 105, 106, 116, 117, 125, 126.

Further, in the aforementioned third to eighth embodiments, a position detecting means is composed of the comparison/calculation unit 82, 104, 115, 124, and the third memory 85, 107, 118, 127 for detecting its position within the region 2 based on a color of a wall surface 72AA to 72AD, 131AA to 131AD shot by the camera 16 and the relative position with respect to the wall surface 72AA to 72AD, 131AA to 131AD, the previously stored colors of all wall surfaces 72AA to 72AD, 131AA to 131AD, and the previously stored map information of the region 2 including the positions of all wall surfaces 72AA to 72AD, 131AA to 131AD. However, the present invention is not limited thereto and a variety of storage means can be applied in place of the third memory 85, 107, 118, 127.

Further, in the aforementioned third to eighth embodiments, the robots 71, 91, 101, 111, 121 respectively detect their position within the region 2 from two wall surfaces 72AA to 72AD, 131AA to 131AD. However, the present invention is not limited thereto and the robot can detect its position within the region 2 from three or more wall surfaces 72AA to 72AD, 131AA to 131AD.

Further, in the aforementioned fourth to eighth embodiments, colors for identification of which angles around the origin "O" are away from each other more than 60° in the polar coordinates shown in FIG. 16B in the HSI space are selected. However, the present invention is not limited thereto and colors of which angles around the origin "O" are away from each other more than angle besides the angle in the polar coordinates shown in FIG. 16B can be used. In addition, colors for identification which are away from each other in a color space (RGB space or YUV space) other than the HSI space can be used.

Further, in the aforementioned fourth to eighth embodiments, colors of which angles around the origin 0 are away from each other more than 60° in the polar coordinates shown in FIG. 16B in the HSI space are simply selected for identification. However, the present invention is not limited thereto and colors of which angles are away from each other more than 60° in the HSI space can be attached to adjust wall surfaces (for example, in FIG. 16B, yellow (Y) is attached to the wall surface 72AA, cyanogen (C) to the wall surface 72AS, red (R) to the wall surface 72AD, blue (B) to the wall surface 72AD). Thereby, the robot 91, 101, 111, 121 can previously prevent error judgement when determining the colors of the wall surfaces 72AA to 72AD, 131AA to 131AD, thus a position detecting system and a robot which can accurately detect its position within the region 2 can be built.

Further, in the aforementioned fifth embodiment, the saturation of color for being painted on each of the wall surfaces 72AA to 72AD are changed into a linear form. However, the present invention is not limited thereto and the saturation can be changed into a non-linear form. In this case, it needs not to exist portions having the same saturation in one wall surface 72AA to 72AD.

Further, in the aforementioned fifth embodiment, the length M of the respective wall surfaces 72AA to 72AD and the saturation Smin, Smax of one end and the other end of the respective wall surfaces 72AA to 72AD are stored in the second memory 106 as predetermined data on variations of saturation of the respective wall surfaces 72AA to 72AD. However, the present invention is not limited thereto and other data can be applied as data to be stored in the second memory 106 as long as the comparison/calculation unit 104 can use data to detect its position within the region 2 based on the data, the saturation Sx painted on the wall surfaces 72AA to 72AD at the center of an image represented by a video signal S50 detected by the wall detecting unit 103.

Figure 35:
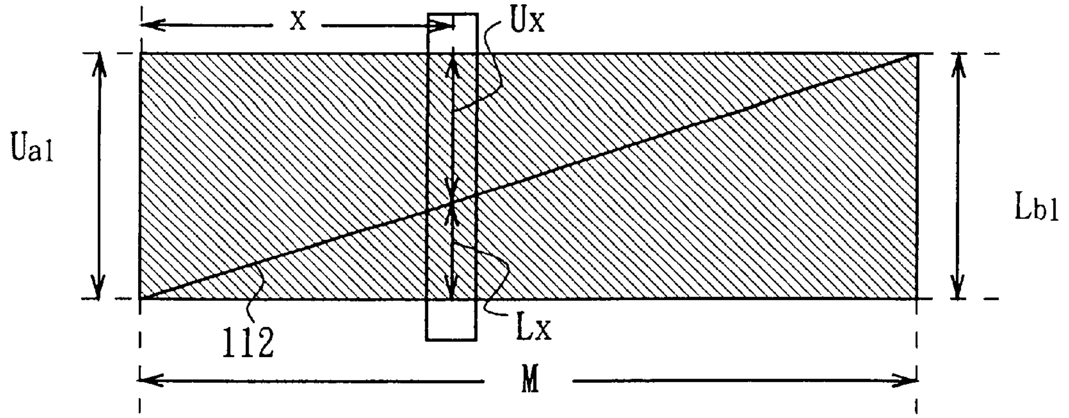

Further, in the aforementioned sixth embodiment, the slant line 112 are drawn on each the wall surface 72AA to 72AD from the vicinity of lower end of the wall surface 72AA to 72AD to the vicinity of the upper end. However, the present invention is not limited thereto and as shown in FIG. 35, the slant line 112 can be drawn on each wall surface 72AA to 72AD from the one lower end of the wall surface 72AA to 72AD to the other upper end. In addition, slant line can be drawn with other ways.

Further, in the aforementioned sixth embodiment, the length M of the respective wall surfaces 72AA to 72AD, the length Ua1, Ub1, La1, Lb1 above and below the slant line 112 at one end and the other end of the respective wall surfaces 72AA to 72AD are stored in the second memory 117 as predetermined data on variation of ratio of portion above the slant line 112 with respect to the heights of the respective wall surfaces 72AA to 72AD. However, the present invention is not limited thereto and other data to be stored in the second memory 117 can be applied as long as the comparison/calculation unit 115 can use the data to detect its position within the region 2 based on the data and the ratio Rx of portion above the slant line 112 (lower part can be used) with respect to the height of the wall surface 72AA to 72AD at the center of the image represented by the video signal S50 detected by the wall detecting unit 115.

Figure 36:
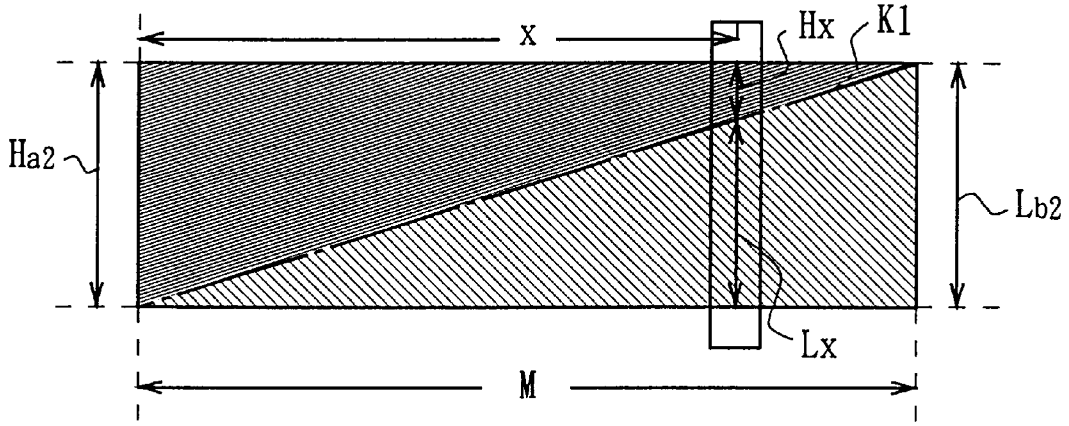

Further, in the aforementioned seventh embodiment, the temporal line K1 for dividing the upper part and lower part of the wall surface 72AA to 72AD is drawn through the vicinity of upper end of one end of the wall surface 72AA to 72AD and the vicinity of lower end of the other end. However, the present invention is not limited thereto and as shown in FIG. 36, the temporal line K1 (slant line can be also used) can divide upper part and lower part of the respective wall surface 72AA to 72AD in such a manner that the temporal line K1 is drawn through the lower end of one end of the wall surface 72AA to 72AD and the upper end of the other end. In addition, the temporal line K1 or a slant line can be drawn with other ways.

Further, in the seventh embodiment, the ratio Rx of the length Hx of high saturation portion with respect to the height of the wall surface 72AA to 72AD are changed into a linear form. However, the present invention is not limited thereto and the ratio can be changed into a non-linear from. However, in this case, it needs not to exist portions in which the ratio Rx of the length Hx of high saturation portion with respect to the height of the wall surface 72AA to 72AD are the same in one of wall surfaces 72AA to 72AD.

Further, in the aforementioned seventh embodiment, the length M of the respective wall surfaces 72AA to 72AD and the length Ha2, La2, Hb2, Lb2 of the high saturation portion and the low saturation portion at one end and the other end of the respective wall surfaces 72AA to 72AD are stored in the second memory 126 as predetermined data on variation of the ratio Rx of the length Hx of the high saturation portion with respect to the height of the wall surface 72AA to 72AD. However, the present invention is not limited thereto and other data can be used as data for being stored in the second memory 126 as long as the comparison/calculation unit 124 can detect its position within the region 2 based on the data and the ratio RX of the length Hx of high saturation portion with respect to the wall surface 72AA to 72A at the center of the image represented by the video signal S50 detected by the wall detecting unit 123.

Further, in the third to eighth embodiments, the robot 91 detects a distance from the wall surface 72AA to 72AD, 131AA to 131AD as a relative position with respect to the wall surface 72AA to 72AD. In the fourth to eighth embodiments, the robot 101, 111, 121 detects a distance from one end of the wall surface 72AA to 72AD in a direction parallel to the wall surface 72AA to 72AD as a relative position with respect surface 72AA to 72AD. However, the present invention is not limited thereto and other relative position can be detected.

Further, in the aforementioned eighth embodiment, the respective wall surfaces 131A to 131AD are made of panel planes of the liquid crystal panel display 132. However, the present invention is not limited thereto and the respective wall surfaces 131AA to 131AD can be made of display surfaces of a display other than the liquid crystal panel display 132 (i.e., a cathode ray tube (CRT) or the like). In addition, a concave part is provided on the normal wall surfaces 72AA to 72AD (FIG. 13) and a film having a predetermined color is attached above the concave part, and a light source can be set into the concave part so as to emit light of the color attached to the wall surface 72AA to 72AD toward the region 2. In conclusion, a variety of configurations can be applied as the configuration of the emitting means as long as emitting means for emitting light having a color attached to the wall surface constitutes the wall surface or the emitting means is provided on the wall surface.

Further, in the aforementioned eighth embodiment, the respective liquid crystal panel displays 132 simply emit lights having different colors from each other for respective wall surfaces 131AA to 131AD. However, the present invention is not limited thereto and attached colors or slant line as the fifth to seventh embodiments can be displayed on the respective liquid crystal panel display 132 and the robot 91 can be assembled as the fifth to seventh embodiments.

Further, in the aforementioned fourth to seventh embodiments, the image format converting unit 93 is provided for converting an image format of the video signal S1 outputted from the camera 16 into an image format according to the HSI space. However, the present invention is not limited thereto and in the case where the image format of the video signal S1 outputted from the camera 16 is an image format corresponding to a color space used at the time of selecting colors of the respective wall surfaces 72AA to 72AD, the image format converting unit 93 can be omitted.

According to the present invention as described above, in an identifying apparatus and method and a robot apparatus for identifying moving objects moving within a predetermined region or other objects within the region, the moving objects or other objects are provided with identifiers having color patterns different from each other, shooting means provided in the respective moving objects or robot apparatuses shot other moving objects or identifiers of other moving objects, a color pattern of an identifier shot by the shooting means are detected based on first image information outputted from the shooting means, and the identifier of other objects shot by the shooting means are identified based on the detection result and previously stored color information of respective identifiers. Thereby an identifying apparatus and method capable of reliably identifying a moving object in a simple configuration and a robot apparatus capable of reliably identifying another object in a simple configuration can be realized.

Also, in an identifying method and apparatus for identifying a plurality of moving objects moving within a predetermined region, a shooting means for shooting the entire region is disposed at a predetermined position, and the moving objects are added color patterns different from each other at respective predetermined positions thereof, wherein color patterns of the respective moving objects are detected on the basis of first image information outputted from the shooting means, and the respective moving objects are identified on the basis of the detection results and previously stored color pattern information on the respective moving objects, thereby making it possible to realize an identifying apparatus and method capable of reliably identifying moving objects in a simple configuration.

Further, in a position detecting apparatus and method and a robot apparatus for detecting the position of a moving object moving within a predetermined region or the position of itself within the region, a plurality of walls having surfaces painted in different colors from each other are provided along the periphery of the region, a shooting means disposed in the moving object or the robot apparatus shoots the wall surfaces such that a relative position of a moving object of a robot with respect to the color of a wall surface shot based on the obtained first image information and the wall and the position of the moving object or the robot apparatus within the region is detected based on the detection results, thereby making it possible to realize a position detecting apparatus and method and a robot apparatus capable of accurately detecting the position of a moving object or itself within the region.

Further, a color extracting apparatus comprises a level detecting means for sequentially detecting a luminance level and color difference levels of each pixel within an image represented by a video signal based on a luminance signal and color difference signals separated from the video signal, and a determining means for determining whether or not each pixel has a predetermined color based on the luminance level and the color difference levels of the pixel detected by the level detecting means and previously stored upper limit values and lower limit values of the color difference levels for each luminance level, thereby making it possible to realize a color extracting apparatus capable of accurately extracting a desired color.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An identifying apparatus for identifying a plurality of moving objects having identifiers having color patterns different from each other, said apparatus comprising:

shooting means for shooting said identifier disposed on said moving object;

color pattern detecting means for detecting said color pattern of said identifier shot by said shooting means based on first image information supplied from said shooting means; and identifying means for identifying said moving object having said identifier shot by said shooting means, based on the detection result of said color pattern detecting means and previously stored color pattern information on said identifier for each said moving object.

2. An identifiable mobile identifying apparatus comprising:

an identifier having different color patterns from each other;

shooting means for shooting said identifiers disposed on other said mobile objects;

color pattern detecting means for detecting said color pattern of said identifier shot by said shooting means based on first image information supplied from said shooting means; and identifying means for identifying said mobile object having said identifier shot by said shooting means, based on the detection result of said color pattern detecting means and previously stored color pattern information on said identifier for each said mobile object.

3. The identifying apparatus according to claim 1 or 2, comprising:

size detecting means for detecting the size of said identifier within an image represented by said first image information supplied from said shooting means; and calculating means for calculating a distance to said identifier, based on the detection result of said detecting means and previously stored reference value.

4. An identifying apparatus for identifying a plurality of moving objects having identifiers having color patterns different from each other, said apparatus comprising:

shooting means for shooting said identifier disposed on said moving object;

color pattern detecting means for detecting said color pattern of said identifier shot by said shooting means based on first image information supplied from said shooting means; and identifying means for identifying said moving object having said identifier shot by said shooting means, based on the detection result of said color pattern detecting means and previously stored color pattern information on said identifier for each said moving object, wherein said identifier is a rotation body having the center axis perpendicular to a moving direction of said mobile object, with its surface divided into a plurality of strip regions, extending in parallel with said moving direction of said mobile object, each of which is painted in a predetermined color by said predetermined color pattern.

5. An identifying apparatus for identifying a plurality of moving objects having identifiers having color patterns different from each other, said apparatus comprising:

shooting means for shooting said identifier disposed on said moving object;

color pattern detecting means for detecting said color pattern of said identifier shot by said shooting means based on first image information supplied from said shooting means; and identifying means for identifying said moving object having said identifier shot by said shooting means, based on the detection result of said color pattern detecting means and previously stored color pattern information on said identifier for each said moving object, wherein each of said color patterns is formed by combining a plurality of colors which are away from each other by a predetermined first distance in a predetermined color space; and said color pattern detecting means converts said first image information supplied from said shooting means into second image information according to said corresponding color space, and then detects said color pattern of said identifier shot by said shooting means based on said second image information.

6. The identifying means according to claim 5, wherein each of said color patterns is formed by selecting said combination of colors so that adjacent colors are away from each other by a second distance longer than said first distance in said color space.

7. The identifying apparatus according to claim 1 or 2, wherein each of said identifiers emits light having said corresponding color pattern.

8. An identifying apparatus for identifying mobile objects moving within a predetermined region, comprising:

shooting means, provided in each said mobile object, for shooting identifiers which are disposed on other said mobile objects and which have color patterns different for each mobile object;

color pattern detecting means for detecting said color pattern of said identifier shot by said shooting means, based on first image information supplied from said shooting means; and identifying means for identifying said mobile object having said identifier shot by said shooting means, based on the detection result of said color pattern detecting means and previously stored color pattern information on said identifier for each said mobile object.

9. The identifying apparatus according to claim 8, comprising size detecting means for detecting the size of said identifier within an image represented by said first image information supplied from said shooting means; and calculating means for calculating a distance to said identifier, based on the detection result of said detecting means and a previously stored reference value.

10. An identifying apparatus for identifying mobile objects moving within a predetermined region, comprising:

shooting means, provided in each said mobile object, for shooting identifiers which are disposed on other said mobile objects and which have color patterns different for each mobile object;

color pattern detecting means for detecting said color pattern of said identifier shot by said shooting means, based on first image information supplied from said shooting means; and identifying means for identifying said mobile object having said identifier shot by said shooting means, based on the detection result of said color pattern detecting means and previously stored color pattern information on said identifier for each said mobile object, wherein said identifier is a rotation body having the center axis perpendicular to a moving direction of said mobile object, with its surface divided into a plurality of strip regions, extending in parallel with said moving direction of said mobile object, each of which is painted in a predetermined color by said predetermined color pattern.

11. An identifying apparatus for identifying mobile objects moving within a predetermined region, comprising:

shooting means, provided in each said mobile object, for shooting identifiers which are disposed on other said mobile objects and which have color patterns different for each mobile object;

color pattern detecting means for detecting said color pattern of said identifier shot by said shooting means, based on first image information supplied from said shooting means; and identifying means for identifying said mobile obect having said identifier shot by said shooting means, based on the detection result of said color pattern detecting means and previously stored color pattern information on said identifier for each said mobile object, wherein each of said color patterns is formed by a combination of a plurality of colors which are away from each other by a predetermined first distance in a predetermined color space; and said color pattern detecting means converts said first image information supplied from said shooting means into second image information according to said corresponding color space, and then detects said color pattern of said identifier shot by said shooting means based on said second image information.

12. An identifying method for identifying mobile objects moving within a predetermined region, comprising:

a first step of providing identifiers having different color patterns from each other on said respective mobile objects;

a second step of shooting said identifiers of other said mobile objects by shooting means provided on each of said mobile objects;

a third step of detecting said color pattern of said identifier shot by said shooting means, based on first image information outputted from said shooting means; and a fourth step of identifying said identifier shot by said shooting means, based on said color pattern of said detected identifier and previously stored color pattern information on each said identifier.

13. The identifying method according to claim 12 comprising:

a detecting step of detecting size of said identifier within an image represented by said first image information outputted from said shooting means; and a calculating step of calculating a distance to said identifier based on the detected size of said identifier and previously stored reference value.

14. An identifying method for identifying mobile objects moving within a predetermined region, comprising:

a first step of providing identifiers having different color patterns from each other on said respective mobile objects;

a second step of shooting said identifiers of other said mobile objects by shooting means provided on each of said mobile objects;

a third step of detecting said color pattern of said identifier shot by said shooting means, based on first image information outputted from said shooting means; and a fourth step of identifying said identifier shot by said shooting means, based on said color pattern of said detected identifier and previously stored color pattern information on each said identifier, wherein said identifier is a rotation body having the center axis perpendicular to a moving direction of said mobile object, with its surface divided into a plurality of strip regions, extending in parallel with said moving direction of said mobile object, each of which is painted in a predetermined color by said predetermined color pattern.

15. An identifying method for identifying mobile objects moving within a predetermined region, comprising:

a first step of providing identifiers having different color patterns from each other on said respective mobile objects;

a second step of shooting said identifiers of other said mobile objects by shooting means provided on each of said mobile objects;

a third step of detecting said color pattern of said identifier shot by said shooting means, based on first image information outputted from said shooting means; and a fourth step of identifying said identifier shot by said shooting means, based on said color pattern of said detected identifier and previously stored color pattern information on each said identifier, wherein each of said color patterns is formed by combining a plurality of colors which are away from each other by a predetermined first distance in a predetermined color space; and said third step converts said first image information supplied from said shooting means into second image information according to said corresponding color space, and then detects said color pattern of said identifier shot by said shooting means based on said second image information.

16. The identifying method according to claim 15, wherein each of said color patterns is formed by selecting said combination of colors so that adjacent colors are away from each other by a second distance longer than said first distance in said color space.

17. The identifying method according to claim 12, wherein each of said identifiers emits light having said corresponding color pattern.

18. A robot apparatus, comprising:

shooting means for shooting identifiers, provided on other objects, having color patterns different from each other;

color pattern detecting means for detecting said color pattern of said identifier shot by said shooting means, based on first image information supplied from said shooting means; and identifying means for identifying said identifier shot by said shooting means, based on the detection result of said color pattern detecting means and previously stored color pattern information on each said identifier.

19. The robot apparatus according to claim 18, comprising:

size detecting means for detecting size of said identifier within an image represented by said first image information supplied from said shooting means; and calculating means for calculating a distance to said identifier, based on the detection result of said detecting means and a previously stored reference value.

20. A robot apparatus, comprising:

shooting means for shooting identifiers, provided on other objects, having color patterns different from each other; color pattern detecting means for detecting said color pattern of said identifier shot by said shooting means, based on first image information supplied from said shooting means; and identifying means for identifying said identifier shot by said shooting means, based on the detection result of said color pattern detecting means and previously stored color pattern information on each said identifier, wherein each of said color patterns is formed by combining a plurality of colors which are away from each other by a predetermined first distance in a predetermined color space; and said color pattern detecting means converts said first image information supplied from said shooting means into second image information according to said corresponding color space, and then detects said color pattern of said identifier shot by said shooting means based on said second image information.

21. An identifiable mobile identifying apparatus comprising:

an identifier having different color patterns from each other;

shooting means for shooting said identifiers disposed on other said mobile objects;

color pattern detecting means for detecting said color pattern of said identifier shot by said shooting means based on first image information supplied from said shooting means; and identifying means for identifying said mobile object having said identifier shot by said shooting means, based on the detection result of said color pattern detecting means and previously stored color pattern information on said identifier for each said mobile object, wherein said identifier is a rotation body having the center axis perpendicular to a moving direction of said mobile object, with its surface divided into a plurality of strip regions, extending in parallel with said moving direction of said mobile object, each of which is painted in a predetermined color by said predetermined color pattern.

22. An identifiable mobile identifying apparatus comprising:

an identifier having different color patterns from each other;

shooting means for shooting said identifiers disposed on other said mobile objects;

color pattern detecting means for detecting said color pattern of said identifier shot by said shooting means based on first image information supplied from said shooting means; and identifying means for identifying said mobile object having said identifier shot by said shooting means, based on the detection result of said color pattern detecting means and previously stored color pattern information on said identifier for each said mobile object, wherein each of said color patterns is formed by combining a plurality of colors which are away from each other by a predetermined first distance in a predetermined color space; and said color pattern detecting means converts said first image information supplied from said shooting means into second image information according to said corresponding color space, and then detects said color pattern of said identifier shot by said shooting means based on said second image information.

23. The identifying means according to claim 22, wherein each of said color patterns is formed by selecting said combination of colors so that adjacent colors are away from each other by a second distance longer than said first distance in said color space.

* * * * *